(12) United States Patent
Yamamoto et al.

(10) Patent No.: US 9,784,878 B2
(45) Date of Patent: Oct. 10, 2017

(54) FOREIGN-OBJECT DETECTING DEVICE, WIRELESS ELECTRIC-POWER TRANSMITTING DEVICE, AND WIRELESS ELECTRIC-POWER TRANSMISSION SYSTEM

(71) Applicant: Panasonic Corporation, Osaka (JP)

(72) Inventors: Atsushi Yamamoto, Kyoto (JP); Hiroshi Kanno, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 365 days.

(21) Appl. No.: 14/679,627

(22) Filed: Apr. 6, 2015

(65) Prior Publication Data

US 2015/0311725 A1 Oct. 29, 2015

(30) Foreign Application Priority Data

Apr. 24, 2014 (JP) .................................. 2014-090451
Dec. 24, 2014 (JP) .................................. 2014-261194

(51) Int. Cl.
*H01F 27/42* (2006.01)
*G01V 3/10* (2006.01)
(Continued)

(52) U.S. Cl.
CPC .............. *G01V 3/101* (2013.01); *G01V 3/104* (2013.01); *H02J 50/10* (2016.02); *H02J 50/60* (2016.02);
(Continued)

(58) Field of Classification Search
CPC ..................................................... G01V 3/101
See application file for complete search history.

(56) References Cited

U.S. PATENT DOCUMENTS

2009/0026844 A1 1/2009 Iisaka et al.
2011/0089938 A1 4/2011 Schmidt
(Continued)

FOREIGN PATENT DOCUMENTS

JP 2007-074334 3/2007
JP 2009-033782 2/2009
JP 2011-234496 11/2011

OTHER PUBLICATIONS

The Extended European Search Report dated Sep. 29, 2015 for the related European Patent Application No. 15162161.2.

*Primary Examiner* — Daniel Puentes
(74) *Attorney, Agent, or Firm* — Wenderoth, Lind & Ponack, L.L.P.

(57) ABSTRACT

A foreign-object detecting device includes a first coil, a second coil arranged adjacent to the first coil and having the same winding direction as that of the first coil, and foreign-object detecting circuitry. The foreign-object detecting circuitry outputs a first detection signal to an outside or inside terminal of the first coil, outputs a second detection signal having an inverted phase to an outside or inside terminal of the second coil, causes one of the first and second detection signal to flow clockwise, causes the other detection signal to flow counterclockwise to generate a combined magnetic field across a center of the first and a center of the second coil, measures an amount of change in an impedance value of the first or second coils, and determines that a foreign object is present within the combined magnetic field, based on the amount of change.

22 Claims, 26 Drawing Sheets

(51) Int. Cl.
 *H04B 5/00* (2006.01)
 *H02J 50/10* (2016.01)
 *H02J 50/60* (2016.01)

(52) U.S. Cl.
 CPC ......... *H04B 5/0037* (2013.01); *H04B 5/0081* (2013.01)

(56) References Cited

U.S. PATENT DOCUMENTS

| | | |
|---|---|---|
| 2013/0038281 A1 | 2/2013 | Sakakibara et al. |
| 2013/0119773 A1 | 5/2013 | Davis |
| 2013/0193771 A1 | 8/2013 | Teggatz |
| 2013/0193959 A1 | 8/2013 | Zibold et al. |
| 2013/0307346 A1* | 11/2013 | Arisawa .................. H01F 38/14 307/104 |
| 2014/0070764 A1 | 3/2014 | Keeling |

* cited by examiner

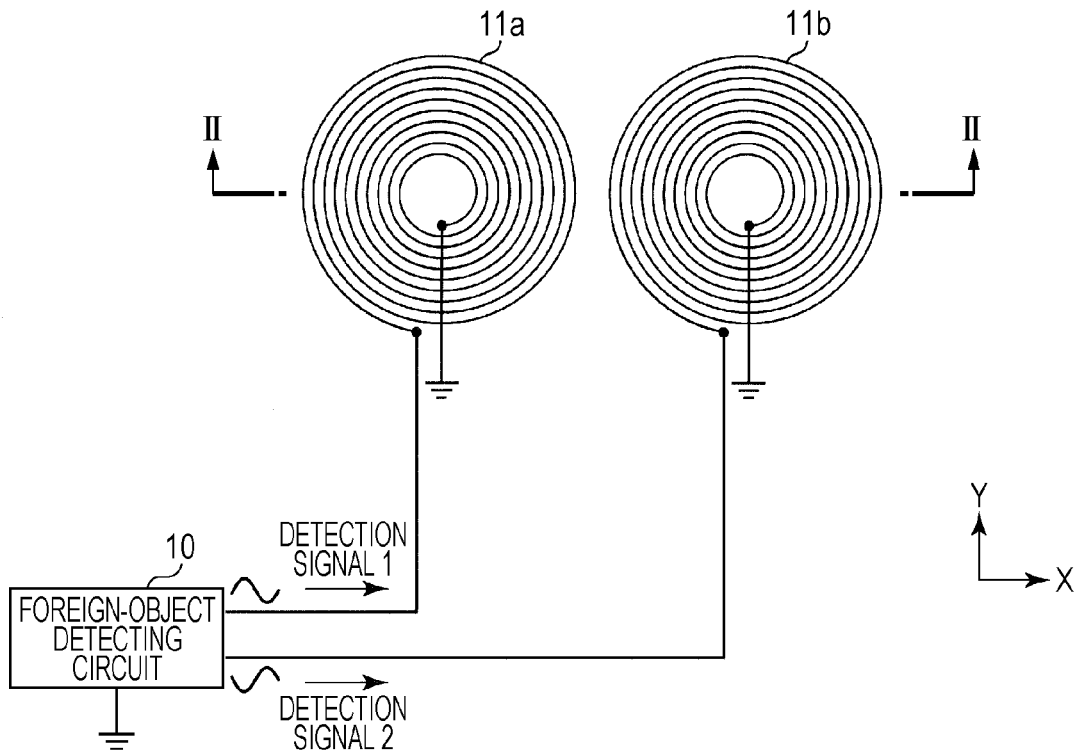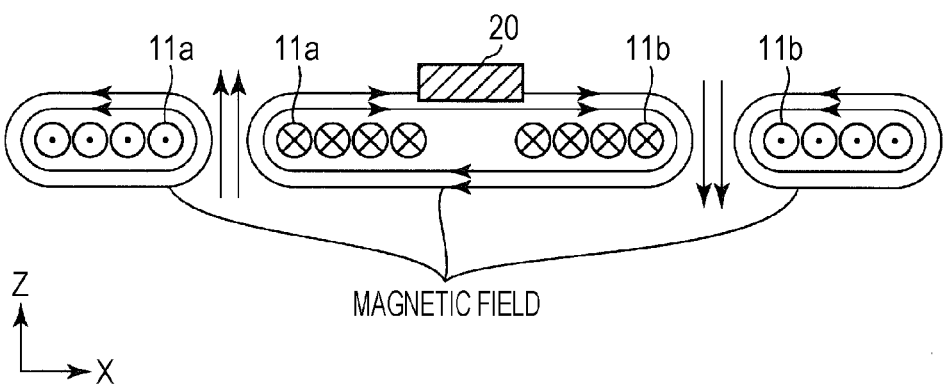

FOREIGN-OBJECT DETECTING DEVICE, WIRELESS ELECTRIC-POWER TRANSMITTING DEVICE, AND WIRELESS ELECTRIC-POWER TRANSMISSION SYSTEM

BACKGROUND

1. Technical Field

The present disclosure relates to a foreign-object detecting device that detects a foreign object, such as metal and the human body (animal), for example, in the vicinity of a wireless electric-power transmitting device in a wireless electric-power transmission system. The present disclosure further relates to a wireless electric-power transmitting device and a wireless electric-power transmission system having such a foreign-object detecting device.

2. Description of the Related Art

In recent years, various types of mobile equipment, such as mobile phones, have been in widespread use, and the amounts of electric power consumed by the mobile equipment continue to increase because of improved functionality and performance and diversified content. When the amount of electric power consumed by mobile equipment that operates on a battery having a predetermined capacity increases, the operating time of the mobile equipment is reduced. As a technology for compensating for the limitation of the battery capacity, a wireless electric-power transmission system has been attracting attention. In the wireless electric-power transmission system, using electromagnetic induction between an electric-power transmission coil in a wireless electric-power transmitting device (also referred to as an "electric-power transmitting device") and an electric-power reception coil in a wireless electric-power receiving device (also referred to as an "electric-power receiving device"), electric power is wirelessly transmitted from the electric-power transmitting device to the electric-power receiving device. In particular, in a wireless electric-power transmission system using a resonance-type electric-power transmission coil and electric-power reception coil, a high transmission efficiency can be maintained even when the position of the electric-power transmission coil and the position of the electric-power reception coil are displaced from each other. Thus, such a wireless electric-power transmission system is expected to be applied to various fields. In addition, the area in which charging is possible can be further increased by increasing the size of the electric-power transmission coil or configuring an array of a plurality of coils.

Related art is disclosed in, for example, Japanese Patent No. 4525710 (hereinafter referred to as "Patent Document 1"), Japanese Patent No. 4780447 (hereinafter referred to as "Patent Document 2"), and Japanese Unexamined Patent Application Publication No. 2011-234496 (hereinafter referred to as "Patent Document 3").

In such related art, however, there are demands for a foreign-object detecting device that can detect a foreign object with high accuracy.

SUMMARY

In one general aspect, the techniques disclosed here feature a foreign-object detecting device includes a first coil, a second coil arranged adjacent to the first coil and having the same winding direction as that of the first coil, and foreign-object detecting circuitry. The foreign-object detecting circuitry outputs a first detection signal to an outside or inside terminal of the first coil, outputs a second detection signal having an inverted phase to an outside or inside terminal of the second coil, causes one of the first and second detection signal to flow clockwise, causes the other detection signal to flow counterclockwise to generate a combined magnetic field across a center of the first and a center of the second coil, measures an amount of change in an impedance value of the first or second coils, and determines that a foreign object is present within the combined magnetic field, based on the amount of change.

detecting circuitry within the combined magnetic field across the center of the first coil and the center of the second coil.

According to one aspect of the present disclosure, it is possible to provide a foreign-object detecting device that can detect a foreign object with high accuracy.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a block diagram illustrating a foreign-object detecting device according to a first embodiment;

FIG. 2 is a view illustrating a cross section of detection coils, taken along line II-II in FIG. 1, and magnetic fields that are generated;

DETAILED DESCRIPTION (Findings Underlying Present Disclosure)

Figure 3:
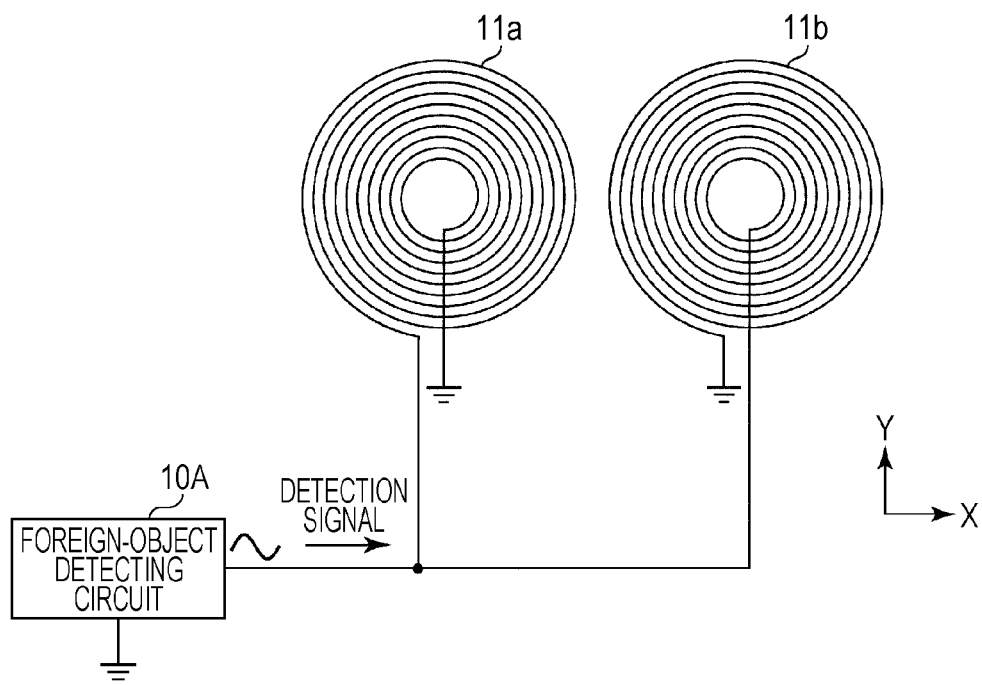
FIG. 3 is a diagram illustrating a foreign-object detecting device according to a first modification of the first embodiment.

The present inventors have found that the wireless electric-power transmission system described in section "Description of the Related Art" causes problems described below.

First, the definition of a "foreign object" will be described. In the present disclosure, the term "foreign object" refers to an object, such as a metal object or the human body (animal), that generates heat due to electric power transmitted between an electric-power transmission coil and an electric-power reception coil in a wireless electric-power transmission system, when the object is present in the vicinity of the electric-power reception coil or the electric-power transmission coil.

In the wireless electric-power transmission system, when a foreign object is present in a space in which electric power is wirelessly transmitted, a danger that the foreign object generates heat increases. Now, consider a case in which the foreign object is a metal object. When electric power is wirelessly transmitted from the electric-power transmission coil to the electric-power reception coil, electrical current that flows in the electric-power transmission coil generates a magnetic field. The generated magnetic field causes eddy current to flow on the surface of the foreign object, so that the foreign object generates heat. The generated heat can cause a temperature increase of a few tens of degrees or more. For example, in the Wireless electric Power Consortium (WPC) standard (Qi standard), the upper limit of the temperature increase is specified. Thus, when electric power is wirelessly transmitted, it is desirable to ensure that no foreign object enters between the electric-power transmission coil and the electric-power reception coil. In order to increase the safety, it is also desirable that the presence or absence of a foreign object above the electric-power transmission coil be detected before electric-power transmission is started. It is desired that only when no foreign object is present, an electric-power transmission operation be initiated to eliminate the danger of heat generation in advance.

In addition, for example, in order to further increase the area in which a smartphone or the like is charged, there are demands for an increased range in which the electric-power transmission coil can transmit electric power, for example, by increasing the size of the electric-power transmission coil. In conjunction with the demands, it is desired to increase the range in which a foreign object can be detected with high accuracy.

Patent Document 1 discloses a technology in which one coil is used as both an electric-power transmission coil and a detection coil and a pulse is transmitted from the detection coil. Patent Document 1 further discloses determining the presence or absence of a foreign object by detecting a change in the voltage of the detection coil, the change being caused by a reflection wave of the pulse.

In order to increase the range in which a foreign object can be detected, Patent Document 2 discloses two or more detection coils arranged side by side to perform foreign-object detection. Also, in order to detect a foreign object, Patent Document 2 discloses a configuration in which transmission coils (detection coils) and reception coils that are stacked are used and electrical currents having mutually opposite phases are supplied to the transmission coils and the reception coils. This is adapted so that signals transmitted from the transmission coils are not directly received by the reception coils to allow reflection waves from a foreign object to be received with high sensitivity to perform foreign-object detection.

Patent Document 3 discloses an electric-power transmission coil in a wireless electric-power transmission system, not a detection coil that detects a foreign object. The electric-power transmission coil is configured as an electric-power transmission coil unit having a configuration in which conducting wires (also called "windings") of two adjacent electric-power transmission coils are connected so that magnetic fields that are generated have opposite phases. With the electric-power transmission coil unit, leakage of an electromagnetic field at a position far from the electric-power transmission coil unit can be reduced during electric-power transmission.

However, as a result of investigating the magnetic field distributions of the detection coils in Patent Documents 1 and 2, the present inventors have found that, in Patent Documents 1 and 2, it is difficult to increase the range in which a foreign object can be detected with high accuracy. Details will be described below.

First, a description will be given of Patent Document 1.

The detection coil disclosed in Patent Document 1 is a planar coil having a winding that is wound in a plane orthogonal to an axis passing through the center of the winding of the detection coil.

Figure 32:
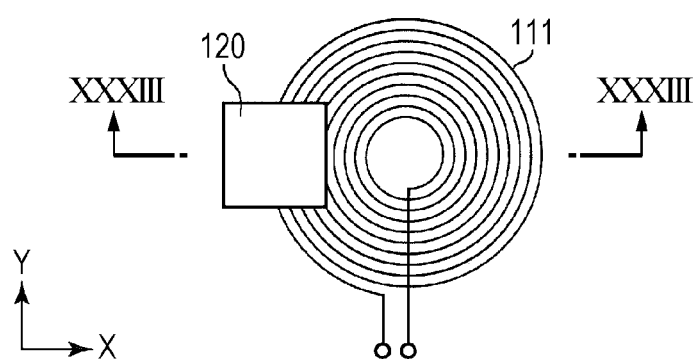
FIG. 32 is a top view illustrating a detection coil in a foreign-object detecting device according to Patent Document 1.
Figure 33:
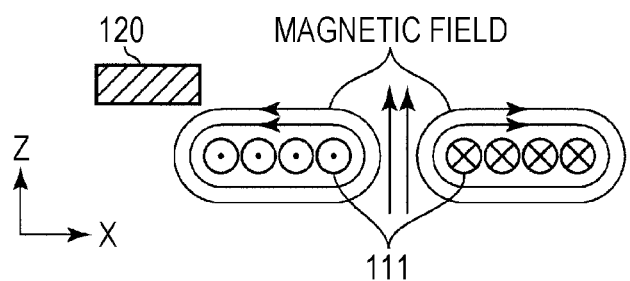
FIG. 33 is a view illustrating a cross section of the detection coil, taken along XXXIII-XXXIII in FIG. 32, and a magnetic field that is generated.

FIG. 32 is a top view illustrating a detection coil 111 in a foreign-object detecting device according to Patent Document 1. FIG. 33 is a schematic view illustrating a cross section of the detection coil 111, taken along line XXXIII-XXXIII illustrated in FIG. 32, and analysis of a magnetic field distribution in the vicinity of the cross section. A foreign object 120 that is present in the vicinity of the detection coil 111 interacts with a magnetic field generated around the detection coil 111 and the foreign object 120 is detected by change of at least one of the frequency and the amplitude of a signal flowing through the detection coil 111. Thus, the range in which the foreign object 120 can be detected using the detection coil 111 is approximately the range in which the winding of the detection coil 111 is wound. It is easy to detect the foreign object 120 at the center of the winding of the detection coil 111, whereas it is difficult to detect the foreign object 120 outside the circumference of the winding of the detection coil 111, as illustrated in FIGS. 32 and 33. Consequently, in Patent Document 1, since the magnetic field outside the circumference of the winding cannot be increased, it is difficult to increase the range in which a foreign object can be detected with high accuracy.

Next, a description will be given of Patent Document 2.

In the plane flexible antenna disclosed in Patent Document 2, groups of detection coils (stacks of planar coils), which are planar coils, are adjacently arranged side by side. With this arrangement, this plane flexible antenna can increase the range in which a foreign object can be detected. In this case, since the stacked detection coils included in one group of detection coils are connected in parallel, they can be collectively regarded as a single coil, for the sake of simplicity. Thus, each group of detection coils is treated below as a single detection coil.

Figure 34:
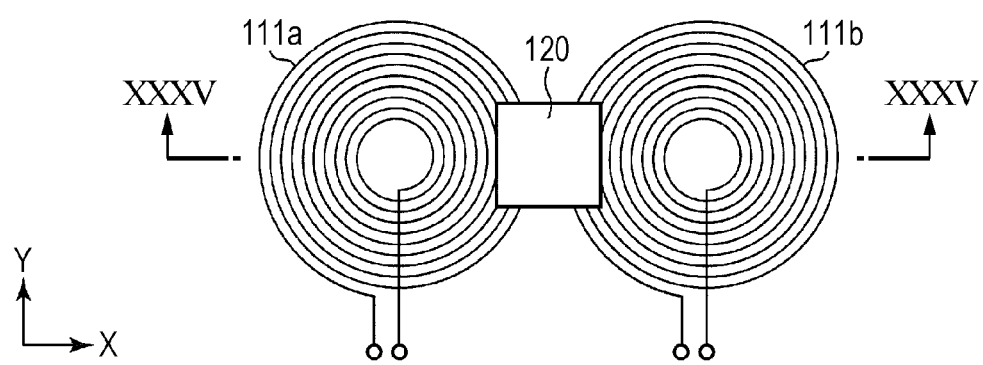
FIG. 34 is a top view illustrating detection coils of a foreign-object detecting device according to Patent Document 2.

FIG. 34 is a top view of two detection coils 111a and 111b, which are two adjacently arranged detection coils selected from the detection coils arranged side by side in the plane flexible antenna according to Patent Document 2.

Figure 35:
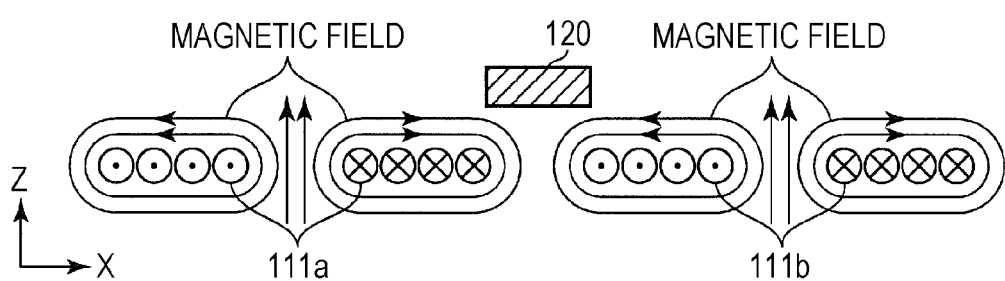
FIG. 35 is a view illustrating a cross section of detection coils, taken along line XXXV-XXXV in FIG. 34, and magnetic fields that are generated.

FIG. 35 is a view illustrating a cross section of the detection coils 111a and 111b, taken along line XXXV-XXXV in FIG. 34, and analysis of a magnetic field distribution in the vicinity of the cross section.

We have found that magnetic fields between the two adjacent detection coils 111a and 111b in FIG. 35 are very weak. The reason is that since the directions of signals that flow in the two detection coils are the same (i.e., have the same phase), the magnetic fields between the two adjacent detection coils repel each other. Thus, in Patent Document 2, it is difficult to detect the foreign object 120 between the two adjacent detection coils 111a and 111b.

In view of the foregoing, we have found that, in Patent Documents 1 and 2, it is difficult to increase the range in which a foreign object can be detected with high accuracy.

In light of the above-described consideration, the present inventors have found a new problem. That is, even when a foreign-object detecting device in which a plurality of detection coils are adjacently arranged like that in Patent Document 2 is used in order to increase the range in which a foreign object can be detected with high accuracy, any foreign object that is present between two adjacent detection coils cannot be detected.

Patent Document 3 discloses an electric-power transmission coil used in a wireless electric-power transmission system, not a detection coil for detecting a foreign object. The electric-power transmission coil is an electric-power transmission coil unit having a configuration in which conducting wires of two adjacent electric-power transmission coils are connected so that magnetic fields that are generated have opposite phases. The electric-power transmission coil unit is intended to reduce leakage of an electromagnetic field at a position far from the electric-power transmission coil unit during electric-power transmission.

In a wireless electric-power transmission system, when the distance between an electric-power transmission coil and an electric-power reception coil is set to a certain distance, it is desired that electric power be stably transmitted to the electric-power reception coil while minimizing changes in a magnetic field released from the electric-power transmission coil.

The electric power of electric-power transmission is, for example, 1 W to 50 kW. If a foreign object enters between two electric-power transmission coils during electric-power transmission, the foreign object can generate heat.

The electric power of signals transmitted from the detection coil during operation can be, for example, 10 mW to 100 mW. Since the electric power of signals transmitted from the detection coil is significantly smaller than the electric power for electric-power transmission (e.g., 1/100 or less of the electric power for electric-power transmission), there is no danger due to a foreign object generating heat. Since the purpose of the electric-power transmission coil and the purpose of the detection coil are naturally different from each other, the amounts of electric power to be output therefrom differ greatly from each other. For example, if electric-power transmission is performed without detecting a foreign object, the foreign object may generate heat, as described above.

Thus, Patent Document 3 has not taken into account sensing a foreign object that is present between two adjacent detection coils.

Accordingly, there are demands for a foreign-object detecting device that can detect a foreign object present between two adjacent detection coils and that can increase the range in which a foreign object can be detected with high accuracy.

In light of the above-described consideration, the present inventors have conceived aspects disclosed hereinafter.

The foreign-object detecting device according to one aspect of the present disclosure includes: a first coil having a first conducting wire that is wound and that has two terminals, one of the terminals being an outside terminal provided at an outer side and the other terminal being an inside terminal provided at an inner side; a second coil arranged adjacent to the first coil and having a second conducting wire that is wound in the same direction as a winding direction of the first coil and that has two terminals, one of the terminals being an outside terminal provided at an outer side and the other terminal being an inside terminal provided at an inner side; and a foreign-object detecting circuitry. The foreign-object detecting circuitry outputs a first detection signal to the outside terminal of the first coil and outputs a second detection signal to the outside terminal of the second coil or outputs a first detection signal to the inside terminal of the first coil and outputs a second detection signal to the inside terminal of the second coil, the first detection signal having a first predetermined waveform and the second detection signal having a second predetermined waveform having a polarity inverted relative to a polarity of the first predetermined waveform; causes one of the first detection signal output to the first coil and the second detection signal output to the second coil to flow clockwise and causes the other detection signal to flow counterclockwise to generate a combined magnetic field across the first coil and the second coil; measures an amount of change in an impedance value of one of the first coil and the second coil, the change corresponding to a change in the combined magnetic field across a center of the first coil and a center of the second coil which is caused by the presence or absence of a foreign object; and determines that a foreign object is present across a center of the first coil and a center of the second coil, when the amount of change in the impedance value exceeds a predetermined value.

According to the aspect described above, the foreign-object detecting device includes the second coil that is arranged adjacent to the first coil and that is wound in the same direction as the winding direction of the first coil.

The foreign-object detecting circuitry outputs a first detection signal to the outside terminal of the first coil and outputs a second detection signal to the outside terminal of the second coil or outputs a first detection signal to the inside terminal of the first coil and outputs a second detection signal to the inside terminal of the second coil, the first detection signal having a first predetermined waveform and the second detection signal having a second predetermined waveform having a polarity inverted relative to a polarity of the first predetermined waveform. The foreign-object detecting circuitry causes one of the first detection signal output to the first coil and the second detection signal output to the second coil to flow clockwise and causes the other detection signal to flow counterclockwise. The foreign-object detecting circuitry generates a combined magnetic field across a center of the first coil and a center of the second coil. With this arrangement, the magnetic fields between the two adjacent detection coils couple to each other. Accordingly, it is possible to strengthen the magnetic field across a center of the first coil and a center of the second coil.

The foreign-object detecting circuitry measures an amount of change in an impedance value of one of the first coil and the second coil, the change corresponding to a change in the combined magnetic field which is caused by the presence or absence of a foreign object. The foreign-object detecting circuitry determines that a foreign object is present within the combined magnetic field across the center of the first coil and the center of the second coil, when the amount of change in the impedance value exceeds a predetermined value. With this arrangement, not only are a plurality of coils arranged to increase the range in which a foreign object is detected, but also the magnetic field between two adjacent detection coils is strengthened to detect a foreign object that is present between the adjacent first and second coils.

As result, it is possible to increase the range in which a foreign object can be detected with high accuracy.

Also, since a detection coil that has been used heretofore can be used, it is possible to suppress increases in the component count, the dimensions, and the manufacturing cost.

The "impedance value" as used herein refers to the voltage value, the current value, the frequency value, or the like of at least one of the first coil and the second coil. The impedance value may also be an inductance value determined from the voltage value, the current value, the frequency value, or the like or a determined value, such as the value of a coupling coefficient or a Q value.

Also, the amount of change in the impedance value refers to a difference between an impedance value detected when no foreign object is present in the vicinity of the first coil or the second coil and the impedance value detected by the foreign-object detecting circuitry.

Although the amount of change in the impedance value is measured in this case, for example, the amount of change in the values of, for example, the frequencies and/or the amplitudes of reflection signals that return as a result of outputting of the first detection signal and the second detection signal may also be measured.

The definitions of the impedance value, changes in the impedance value, and the amount of change in the values of, for example, the frequencies and/or the amplitudes of reflection signals are similarly applied to the description disclosed hereinafter.

First Embodiment

A foreign-object detecting device according to a first embodiment of the present disclosure will be described below with reference to the accompanying drawings.

FIG. 1 is a block diagram illustrating a foreign-object detecting device according to the first embodiment. The foreign-object detecting device includes detection coils 11a and 11b and a foreign-object detecting circuitry 10. The detection coils may hereinafter be referred to simply as "coils". In the detection coils 11a and 11b, conducting wires are wound in close proximity to each other on one plane.

As illustrated in FIG. 1, the detection coils 11a and 11b have respective wound conducting wires. Each conducting wire has an outside terminal (indicated by a dot mark) provided at an outer side of the corresponding detection coil 11a or 11b and an inside terminal (indicated by a dot mark) provided at an inner side of the corresponding detection coil 11a or 11b. The outside terminal is a terminal that receives a detection signal of a foreign-object detecting circuitry from outside of the corresponding detection coil or a terminal connected to ground. The outside terminal may be arranged at any position between an outer portion of the detection coil and the foreign-object detecting circuitry or ground. The inside terminal is a terminal that receives a detection signal of the foreign-object detecting circuitry from inside of the detection coil or a terminal connected to ground. The inside terminal may be arranged at any position between an inner portion of the detection coil and the foreign-object detecting circuitry or ground. The outside terminal and the inside terminal may be contact points that are directly connected to the foreign-object detecting circuitry and/or contact points that are directly connected to ground. In such a case, there are cases in which the terminals are not clearly seen, as in FIG. 1. In the description of the following aspect, when the outside terminal and the inside terminal are contact points that are directly connected to the foreign-object detecting circuitry and/or contact points that are directly connected to ground, descriptions of terminals (indicated by dot marks) are not given.

The foreign-object detecting circuitry 10 transmits detection signals having a predetermined waveform ("transmission" may hereinafter be referred to as "output") to the two mutually adjacent detection coils 11a and 11b, receives reflection signals resulting from reflection of the detection signals by the two mutually adjacent detection coils 11a and 11b, and determines the presence or absence of a foreign object in the vicinity of the two mutually adjacent detection coils 11a and 11b, based on the reflection signals. The detection signals include a first detection signal that flows to one of the two mutually adjacent detection coils 11a and 11b and a second detection signal that flows to the other of the two mutually adjacent detection coils 11a and 11b. When one of the first and second detection signals flows clockwise on a plane including the detection coils 11a and 11b, the other of the first and second detection signals flows counterclockwise on the plane including the detection coils 11a and 11b. That is, the detection signals in directions that are opposite to each other flow in the two mutually adjacent detection coils 11a and 11b.

In FIG. 1, the winding directions of the detection coils 11a and 11b are the same on one plane. In FIG. 1, the foreign-object detecting circuitry 10 generates detection signals 1 and 2 having polarities that are inverted relative to each other and simultaneously transmits the detection signals 1 and 2 to the two mutually adjacent detection coils 11a and 11b.

The detection signals 1 and 2 may be alternating-current signals, respectively. The detection signals 1 and 2 may also be pulse signals, respectively. The pulse signals may have a single polarity or two polarities. For instance, when the detection signals 1 and 2 have sine waves, the foreign-object detecting circuitry 10 generates the detection signals 1 and 2 such that they have, for example, a phase difference of 180 degrees each other.

FIG. 2 is a schematic view illustrating a cross section of the detection coils 11a and 11b, taken along line II-II in FIG. 1, and magnetic fields that are generated. The foreign-object detecting circuitry 10 observes the reflection signals from the detection coils 11a and 11b to thereby determine the presence or absence of a foreign object 20 in the vicinity of the detection coils 11a and 11b. As illustrated in FIG. 2, based on the detection signals 1 and 2 transmitted from the foreign-object detecting circuitry 10, the detection coils 11a and 11b generate magnetic fields in the vicinity thereof. At a one moment, since a counterclockwise electrical current flows to the detection coil 11a, and a clockwise electrical current flows to the detection coil 11b, electrical currents in the same +Y direction flows to the conducting wire of the +X side (the right side) of the detection coil 11a and the conducting wire of the −X side (the left side) of the detection coil 11b. As a result, a combined magnetic field is generated across the two detection coils 11a and 11b. In this case, when a foreign object 20 is present between the detection coils 11a and 11b, the magnetic fields is partly blocked, so that changes occur in the reflection signals.

In other words, when a foreign object 20 is present within the combined magnetic field across the center of the coil 11a (also referred to as "the first coil") and the center of the coil 11b (also referred to as "the second coil"), the combined magnetic field across a center of the first coil and a center of the second coil is partly blocked, so that changes occur in the reflection signals.

When the foreign object 20 generates capacitance between the detection coils 11a and 11b, the capacitance causes the inductances of the detection coils 11a and 11b to change, and the frequencies of the reflection signals also change correspondingly. When the inductances of the detection coils 11a and 11b decrease, the frequencies of the reflection signals increase, and when the inductances of the detection coils 11a and 11b increase, the frequencies of the reflection signals decrease. Also, when the foreign object 20 generates heat due to induced current, the energy of the detection signals 1 and 2 is consumed, and the amplitudes of the reflection signals decrease. Changes in the reflection signals can be detected by direct measurement of the reflection signals or measurement of a combined signal of the transmitted detection signal and the received reflection signal. The foreign-object detecting circuitry 10 pre-measures the frequencies and/or the amplitudes of the reflection signals when no foreign object 20 is present in the vicinity of the detection coils 11a and 11b and stores the measured frequencies and/or amplitudes as reference values. Upon receiving reflection signals having frequencies and/or amplitudes that are different from the reference values, the foreign-object detecting circuitry 10 determines that a foreign object 20 is present.

Although the presence of a foreign object is determined according to changes in the frequencies and/or the amplitudes of the received reflection signals, the presence of a foreign object may also be determined according to changes in the impedance value, as described above. This also applies to the aspects disclosed hereinafter.

In the foreign-object detecting device illustrated in FIG. 1, the foreign-object detecting circuitry 10 generates the detection signals 1 and 2 having polarities that are opposite to each other in order that the detection signals in the opposite directions flow to the two mutually adjacent detection coils 11a and 11b. Alternatively, a foreign-object detecting circuitry 10A that generates a single detection signal may also be used, as described below with reference to FIGS. 3 to 5. The detection signal generated by the foreign-object detecting circuitry 10A is, for example, an alternating-current signal or a pulse signal.

FIG. 3 is a diagram illustrating a foreign-object detecting device according to a first modification of the first embodiment. Detection coils 11a and 11b have the same winding direction on one plane. The foreign-object detecting circuitry 10A generates one detection signal, transmits the detection signal to one of the two mutually adjacent detection coils 11a and 11b as a first detection signal, and transmits the same detection signal to the other of the two mutually adjacent detection coils 11a and 11b as a second detection signal. The two mutually adjacent detection coils 11a and 11b are wired to the foreign-object detecting circuitry 10A so that, when one of the first and second detection signals flows clockwise on the plane including the detection coils 11a and 11b, the other of the first and second detection signals flows counterclockwise on the plane including the detection coils 11a and 11b. According to the foreign-object detecting device illustrated in FIG. 3, the wiring of the detection coil 11a with the foreign-object detecting circuitry 10A and the wiring of the detection coil 11b with the foreign-object detecting circuitry 10A are made different from each other, so that the detection signals in the directions that are opposite to each other flow to the two mutually adjacent detection coils 11a and 11b. According to the foreign-object detecting device illustrated in FIG. 3, the detection signal transmitted from the foreign-object detecting circuitry 10A is distributed to two, and the same detection signal is transmitted to the two detection coils 11a and 11b to thereby generate a combined magnetic field between the detection coils 11a and 11b, and a foreign object that is present between the detection coils 11a and 11b is detected.

Figure 4:
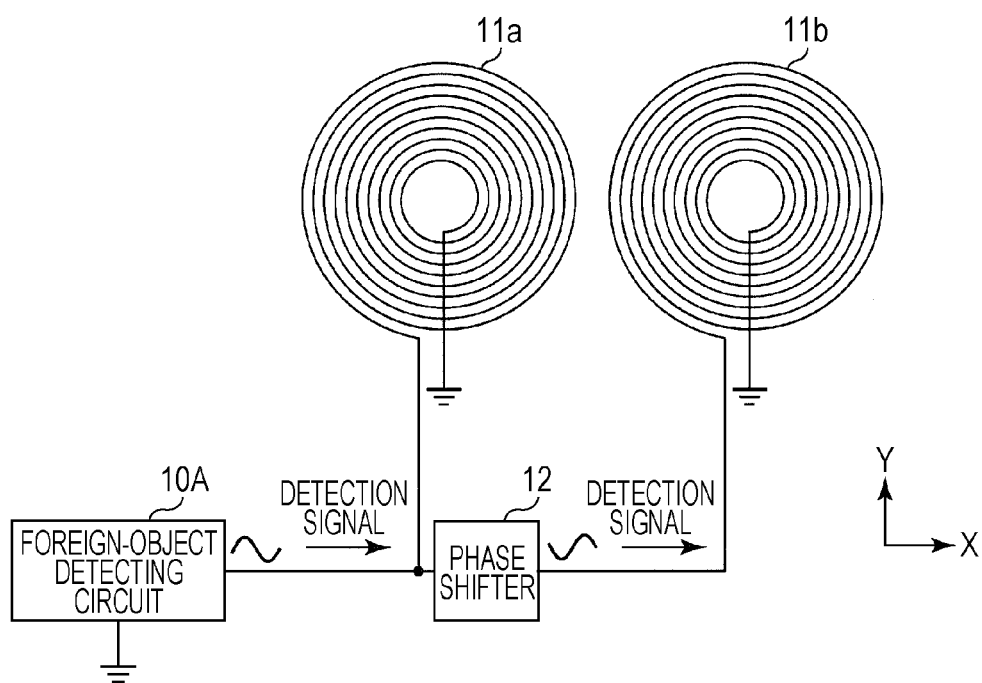
FIG. 4 is a diagram illustrating a foreign-object detecting device according to a second modification of the first embodiment.

FIG. 4 is a diagram illustrating a foreign-object detecting device according to a second modification of the first embodiment. The foreign-object detecting device illustrated in FIG. 4 further has at least one phase shifter 12. The detection coils 11a and 11b have the same winding direction on one plane. The foreign-object detecting circuitry 10A generates one detection signal, directly transmits the detection signal to one of the two mutually adjacent detection coils 11a and 11b as a first detection signal, and transmits the same detection signal to the other of the two mutually adjacent detection coils 11a and 11b via the phase shifter 12 as a second detection signal. When the detection signal generated by the foreign-object detecting circuitry 10A is a cyclic signal having a waveform whose phase is inverted between the first half and the second half of each cycle (e.g., an alternating-current signal having a sine wave or the like), the phase shifter 12 may be used to generate a detection signal having a phase that is substantially (180 degrees) opposite to that of the detection signal generated by the foreign-object detecting circuitry 10A. According to the foreign-object detecting device illustrated in FIG. 4, since the phase shifter 12 is used, the detection signals in the directions that are opposite to each other flow to the two mutually adjacent detection coils 11a and 11b. According to the foreign-object detecting device illustrated in FIG. 4, the detection signal transmitted from the foreign-object detecting circuitry 10A is divided into two, a detection signal whose phase is delayed by 180 degrees by the phase shifter 12 is transmitted to the detection coil 11b to thereby form a combined magnetic field between the detection coils 11a and 11b, and a foreign object that is present between the detection coils 11a and 11b is detected.

Figure 5:
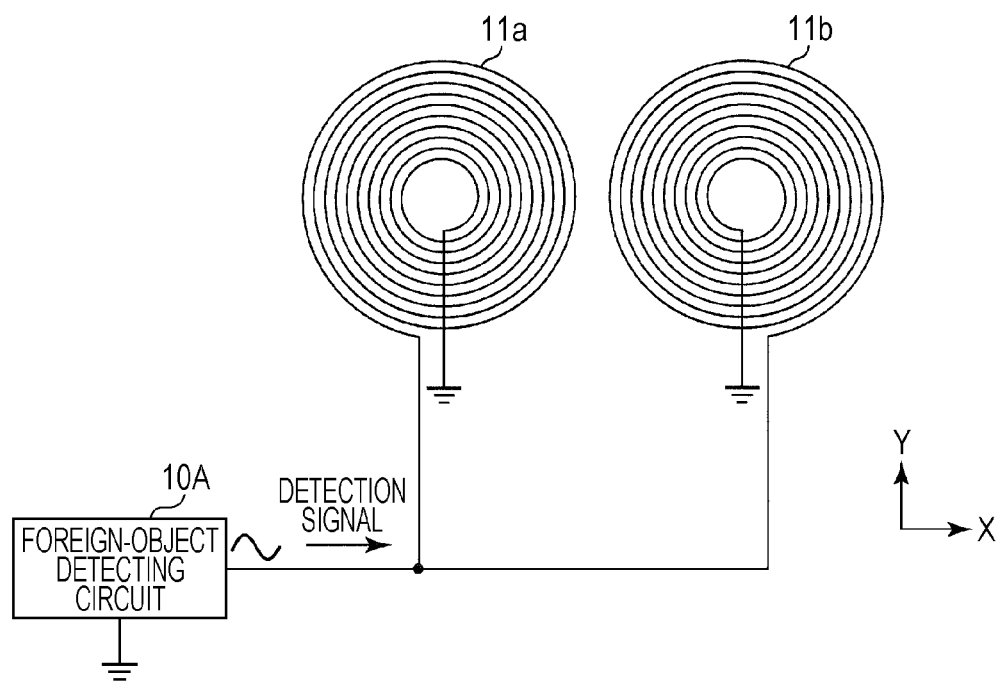
FIG. 5 is a diagram illustrating a foreign-object detecting device according to a third modification of the first embodiment.

FIG. 5 is a diagram illustrating a foreign-object detecting device according to a third modification of the first embodiment. Two mutually adjacent detection coils 11a and 11b have winding directions that are different from each other on one plane. The foreign-object detecting circuitry 10A generates one detection signal, transmits the detection signal to one of the two mutually adjacent detection coils 11a and 11b as a first detection signal, and transmits the same detection signal to the other of the two mutually adjacent detection coils 11a and 11b as a second detection signal. According to the foreign-object detecting device illustrated in FIG. 5, since the detection coils 11a and 11b have winding directions that are different from each other on one plane, the detection signals in the directions that are opposite to each other flow to the two mutually adjacent detection coils 11a and 11b. According to the foreign-object detecting device illustrated in FIG. 5, the detection signal transmitted from the foreign-object detecting circuitry 10A is divided into two, and the same detection signal is transmitted to the two detection coils 11a and 11b to thereby generate a combined magnetic field between the detection coils 11a and 11b, and a foreign object that is present between the detection coils 11a and 11b is detected.

Figure 6:
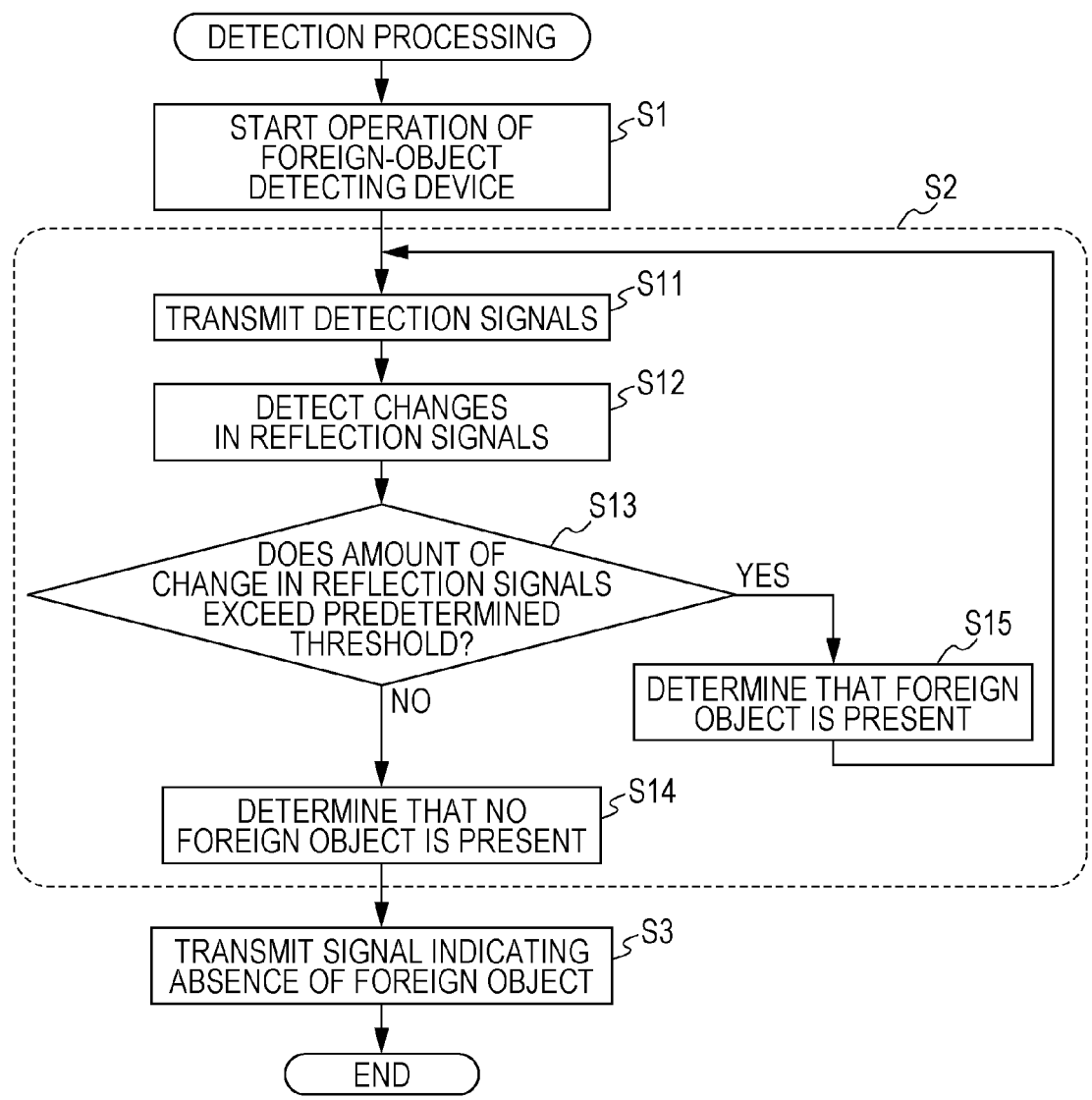
FIG. 6 is a flowchart illustrating the operation of the foreign-object detecting device according to the first embodiment.

The operation of the foreign-object detecting device according to the first embodiment will now be described as an example with reference to FIG. 6.

After the operation of the foreign-object detecting device is started (step S1), foreign-object detection processing is executed (step S2). In the foreign-object detection processing, a first detection signal and a second detection signal (including a case in which a first detection signal and a second detection signal are realized by one detection signal) are transmitted from the foreign-object detecting circuitry 10 to a first coil and a second coil. One of the first detection signal (also referred to as "detection signal 1") that flows to the first coil 11a and the second detection signal (also referred to as "detection signal 2") that flows to the second coil 11b is caused to flow clockwise, and the other detection signal 11a or 11b is caused to flow counterclockwise to generate a combined magnetic field between the first coil 11a and the second coil 11b (step S11: see the first embodiment as one example). The combined magnetic field changes depending on the presence or absence of a foreign object. Thus, reflection signals that return as a result of the transmission of the first detection signal and the second detection signal change in accordance with changes in the combined magnetic field.

The foreign-object detecting circuitry 10 detects changes in the reflection signals that change depending on the presence or absence of a foreign object (step S12).

Next, the foreign-object detecting circuitry 10 determines whether or not the amount of change in the reflection signals, the change corresponding to a change in the combined magnetic field which is caused by the presence or absence of a foreign object, exceeds a predetermined threshold (step S13). The "amount of change in the reflection signals" as used herein refers to a difference between the value of the frequency, the amplitude, or the like of the reflection signal when no foreign object is present within the combined magnetic field across the center of the first coil and the center of the second coil and the value of the frequency, the amplitude, or the like of the reflection signal detected by the foreign-object detecting circuitry 10. Next, if the amount of change in the reflection signals exceeds the predetermined threshold, the foreign-object detecting circuitry 10 determines that a foreign object is present within the combined magnetic field across the center of the first coil and the center of the second coil (step S15); otherwise, the foreign-object detecting circuitry 10 determines that no foreign object is present (step S14).

If the amount of change in the reflection signals does not exceed the predetermined threshold, the foreign-object detecting circuitry 10 transmits, for example, a signal indicating the absence of a foreign object to an electric-power transmitting device in a wireless electric-power transmission apparatus (step S3). Although a signal indicating the absence of a foreign object is transmitted to an electric-power transmitting device, equipment to which the signal is to be transmitted is not particularly limited to an electric-power transmitting device and may be any equipment that needs information about the presence or absence of a foreign object.

According to the foreign-object detecting devices illustrated in FIGS. 3 to 5, the number of detection signals output from the foreign-object detecting circuitry 10A can be made to be one, which offers an advantage that the circuitry can be simplified. According to the foreign-object detecting devices illustrated in FIGS. 3 and 4, the detection coils 11a and 11b can be configured with a single component, which offers an advantage that the product fabrication cost can be kept low. Also, according to the foreign-object detecting devices illustrated in FIGS. 3 and 5, it is possible to configure a foreign-object detecting device so that detection signals in directions that are opposite to each other flow to the two mutually adjacent detection coils 11a and 11b, without using a phase shifter. According to the foreign-object detecting device illustrated in FIG. 5, when the cost of preparing detection coils having different winding directions is lower than the cost of preparing a phase shifter, there is an advantage that the fabrication cost of a foreign-object detecting device can be kept low without using a phase shifter.

Next, advantages of the foreign-object detecting device according to the first embodiment will be described with reference to FIGS. 7 to 9.

Figure 7:
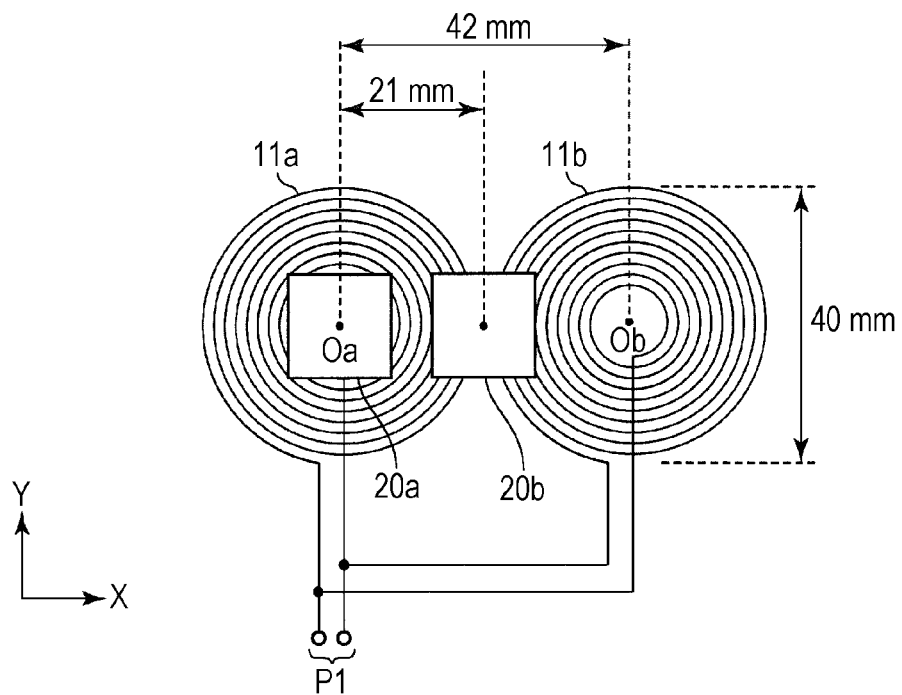
FIG. 7 is a top view illustrating the detection coils of the foreign-object detecting device according to an implementation example of the first embodiment.

FIG. 7 is a top view illustrating detection coils 11a and 11b in a foreign-object detecting device according to an implementation example of the first embodiment. The foreign-object detecting device illustrated in FIG. 7 is an implementation example of the foreign-object detecting device illustrated in FIG. 3. The detection coils 11a and 11b had the same winding direction on one plane, and the diameter of the circumference of each of the detection coils 11a and 11b was 40 mm. The number of turns of each of the detection coils 11a and 11b was 14. The detection coils 11a and 11b were arranged with a gap of 42 mm interposed between the center Oa of the detection coil 11a and the center Ob of the detection coil 11b. A foreign object 20a or 20b, which was rectangular-parallelepiped iron and which had a size of 15 mm×15 mm×1 mm, was placed at the position of the center Oa of the detection coil 11a or at a position between the detection coils 11a and 11b. The distance between the top surfaces of the detection coils 11a and 11b and the bottom surface of the foreign object 20a or 20b was 4 mm. Ports P1 of the detection coils 11a and 11b were connected to a foreign-object detecting circuitry that generated one detection signal. The detection coils 11a and 11b were wired with the foreign-object detecting circuitry so that the detection signals in directions opposite to each other flowed to the two mutually adjacent detection coils 11a and 11b.

Figure 8:
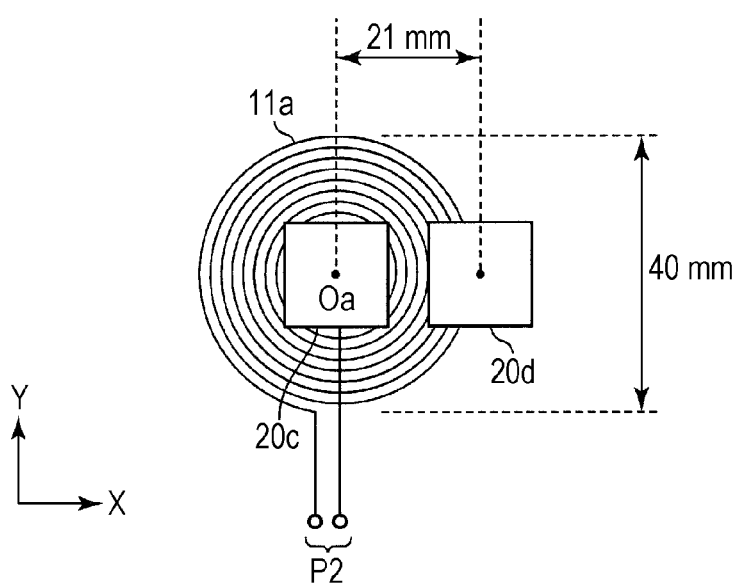
FIG. 8 is a top view illustrating a detection coil of a foreign-object detecting device according to a comparative example.

FIG. 8 is a top view illustrating a detection coil 11a in a foreign-object detecting device according to a comparative example. The foreign-object detecting device illustrated in FIG. 8 includes only the detection coil 11a illustrated in FIG. 7. A foreign object 20c or 20d, which was rectangular-parallelepiped iron and which had a size of 15 mm×15 mm×1 mm, was arranged at the position of the center Oa of the detection coil 11a or at a position on the circumference of the detection coil 11a. The distance between the upper surface of the detection coil 11a and the bottom surface of the foreign object 20c or 20d was 4 mm. Ports P2 of the detection coil 11a were connected to a foreign-object detecting circuitry that generated one detection signal.

Figure 9:
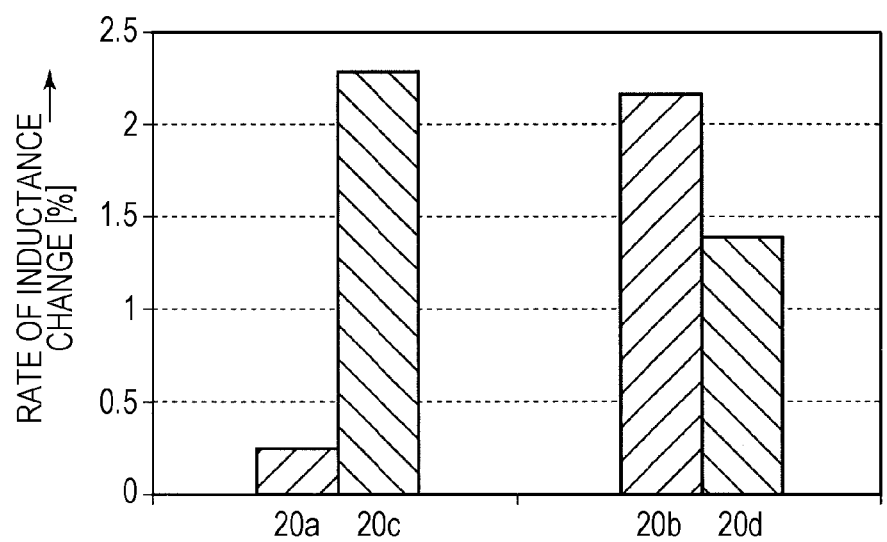
FIG. 9 is a graph illustrating rates of inductance change due to foreign objects illustrated in FIGS. 7 and 8.

FIG. 9 is a graph illustrating a rate of inductance change due to the foreign objects 20a to 20d illustrated in FIGS. 7 and 8. An inductance (a composite inductance) L1 of the detection coils 11a and 11b in FIG. 7 when the foreign object 20a or 20b was present was measured, and a rate of inductance change, $\Delta L1$, relative to an inductance L01 when no foreign object was present was calculated as:

$$\Delta L1 = (L1-L01)/L01 \times 100 \ [\%]$$

Similarly, an inductance L2 of the detection coil 11a illustrated in FIG. 8 was measured when the foreign object 20c or 20d was present, and a rate of inductance change, $\Delta L2$, relative to an inductance L02 when no foreign object was present was calculated as:

$$\Delta L2 = (L2-L02)/L02 \times 100 \ [\%]$$

The rate of inductance change, $\Delta L1$, due to the foreign object 20a was 0.24%. The rate of inductance change, $\Delta L1$, due to the foreign object 20b was 2.16%. The rate of inductance change, $\Delta L2$, due to the foreign object 20c was 2.28%. The rate of inductance change, $\Delta L2$, due to the foreign object 20d was 1.40%. It can be understood from FIG. 9 that, in the foreign-object detecting device illustrated in FIG. 7, the inductance change due to the foreign object 20a that is present at the position of the center Oa of the detection coil 11a is significantly small, whereas the inductance change due to the foreign object 20b that is present at a position between the detection coils 11a and 11b is large. This is because a combined magnetic field of the two detection coils 11a and 11b is generated across the two detection coils 11a and 11b, as illustrated in FIG. 2.

When each of the detection signals that flow to the two mutually adjacent detection coils 11a and 11b is a cyclic signal having a waveform whose phase is inverted between the first half and the second half of each cycle (e.g., an alternating-current signal having a sine wave or the like), it is possible to detect a foreign object that is present between the detection coils 11a and 11b by passing electrical current for the detection signals having substantially (180 degrees) opposite phases to the detection coils 11a and 11b. The "substantially (180 degrees) opposite phase" as used herein means a phase difference between the two detection signals in a range in which a foreign object between the two mutually adjacent detection coils 11a and 11b can be detected. Substantially the same advantages can be obtained when the phase difference between two detection signals is 180 degrees±90 degrees. A preferable range, however, is 180 degrees±45 degrees.

It can also be understood that, in the foreign-object detecting device illustrated in FIG. 8, an inductance change due to the foreign object 20c that is present at the position of the center Oa of the detection coil 11a is large, whereas the inductance change due to the foreign object 20d that is present at the position on the circumference of the detection coil 11a is small. Thus, although it is possible to detect a foreign object that is present at the position of the center Oa of the detection coil 11a, it is difficult to detect a foreign object that is present at a position on the circumference of the detection coil 11a. Accordingly, combining the method that uses one detection coil to detect a foreign object that is present at the center of the detection coil and the method that uses two detection coils to detect a foreign object between the detection coils makes it possible to reliably detect a foreign object, such as metal.

As described above, according to the foreign-object detecting device according to the first embodiment, it is possible to provide a foreign-object detecting device that more reliably detects a foreign object that is present at a position between two mutually adjacent detection coils, while suppressing increases in the component count, the dimensions, and the manufacturing cost.

The foreign-object detecting device according to the first embodiment can detect a foreign object (e.g., the foreign object 20b illustrated in FIG. 7) that is present at a position between two mutually adjacent detection coils or at a position that is above or below and adjacent to that position. In addition, transmitting a detection signal to each detection coil and determining the presence or absence of a foreign object for the detection coil makes it possible to detect a foreign object (e.g., the foreign object 20c illustrated in FIG. 8) that is present at the position of the center of a detection coil or at a position that is above or below and adjacent to that center. Use of both of the two foreign-object detection methods makes it possible to detect a foreign object in an entire region in which the foreign object can generate heat, the region including a region between the detection coils and the center of each detection coil. When applied to a wireless electric-power transmitting device or wireless electric-power transmission system having one or more electric-power transmission coils (an array of electric-power transmission coils or one or more large-size electric-power transmission coils), the foreign-object detecting device according to the first embodiment has a superior configuration that can reliably detect a foreign object, as described below in second and third embodiments.

The foreign-object detecting device may have three or more detection coils, as described below with reference to FIGS. 10 to 12.

Figure 10:
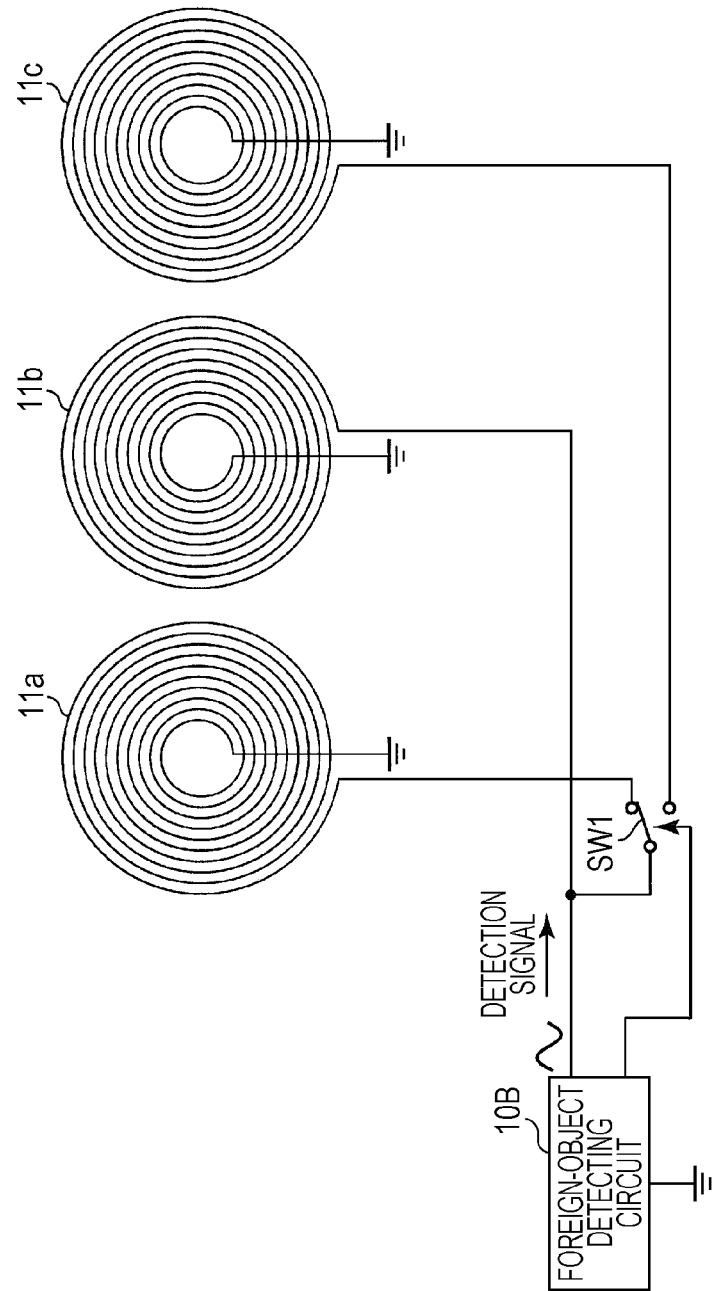
FIG. 10 is a diagram illustrating a foreign-object detecting device according to a fourth modification of the first embodiment.

FIG. 10 is a diagram illustrating a foreign-object detecting device according to a fourth modification of the first embodiment. The foreign-object detecting device illustrated in FIG. 10 includes three detection coils 11a to 11c, a foreign-object detecting circuitry 10B, and a switch SW1. The three detection coils 11a to 11c are wound in close proximity to each other on one plane. In order that detection signals in directions that are opposite to each other flow to the two mutually adjacent detection coils 11a and 11b or 11b and 11c of the detection coils 11a to 11c, for example, the detection coil 11b has a winding direction that is different from those of the detection coils 11a and 11c. The foreign-object detecting circuitry 10B generates one detection signal, similarly to the foreign-object detecting circuitry 10A illustrated in FIGS. 3 to 5, and further controls the switch SW1. The switch SW1 selectively connects the foreign-object detecting circuitry 10B to the two mutually adjacent detection coils of the detection coils 11a to 11c. In this case, the detection coil 11b is always connected to the foreign-object detecting circuitry 10B, and the switch SW1 selectively connects the foreign-object detecting circuitry 10B to one of the detection coils 11a and 11c. More specifically, when the switch SW1 connects the foreign-object detecting circuitry 10B to the detection coil 11a, the presence or absence of a foreign object between the detection coils 11a and 11b is detected, and when the switch SW1 connects the foreign-object detecting circuitry 10B to the detection coil 11c, the presence or absence of a foreign object between the detection coils 11b and 11c is detected.

Figure 11:
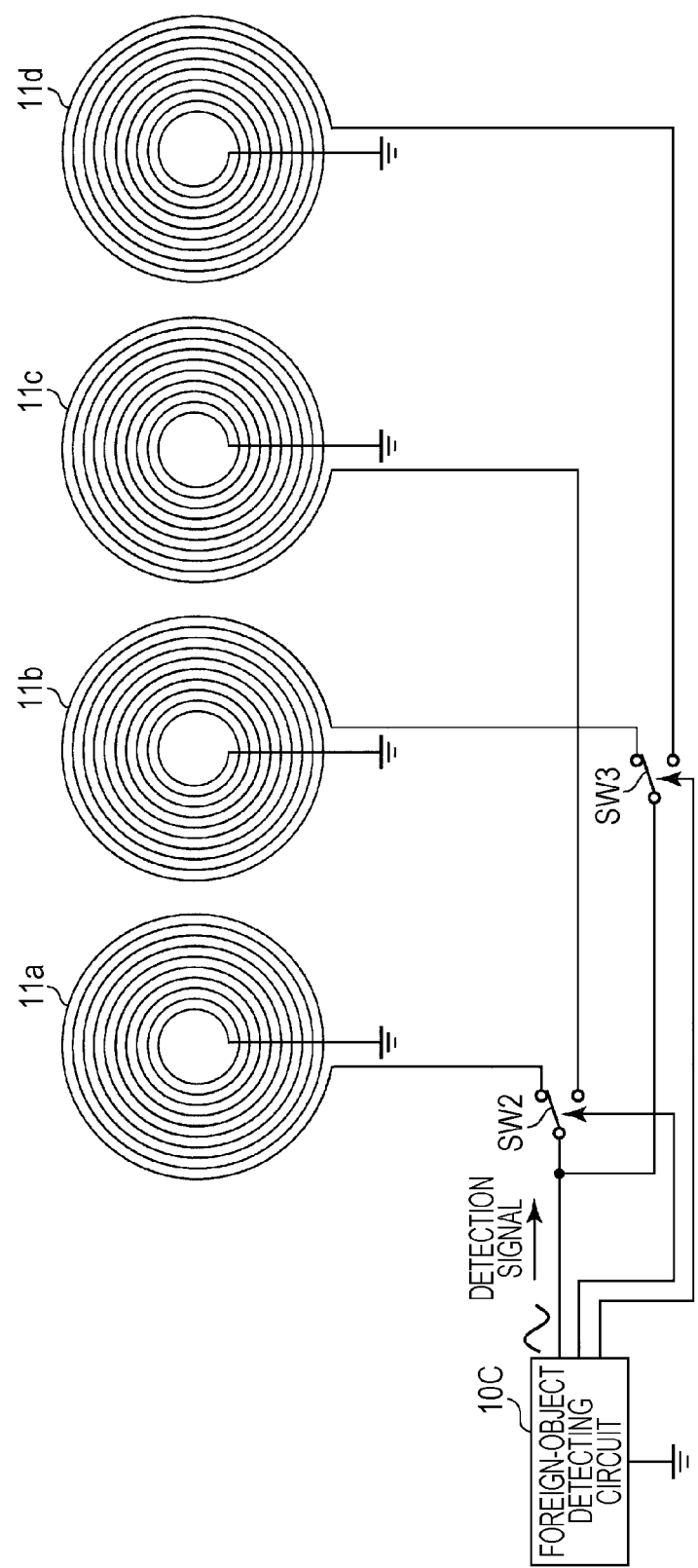
FIG. 11 is a diagram illustrating a foreign-object detecting device according to a fifth modification of the first embodiment.

FIG. 11 is a diagram illustrating a foreign-object detecting device according to a fifth modification of the first embodiment. The foreign-object detecting device illustrated in FIG. 11 includes four detection coils 11a to 11d, a foreign-object detecting circuitry 10C, and switches SW2 and SW3. The four detection coils 11a to 11d are wound in close proximity to each other on one plane. In order that detection signals in directions that are opposite to each other flow to the two mutually adjacent detection coils 11a and 11b, 11b and 11c, or 11c and 11d of the detection coils 11a to 11d, for example, the detection coils 11b and 11d have winding directions that are different from those of the detection coils 11a and 11c. The foreign-object detecting circuitry 10C generates one detection signal, similarly to the foreign-object detecting circuitry 10A illustrated in FIGS. 3 to 5, and further controls the switches SW2 and SW3. The switches SW2 and SW3 selectively connect the foreign-object detecting circuitry 10C to the two mutually adjacent detection coils of the detection coils 11a to 11d. When the foreign-object detecting circuitry 10C is connected to the detection coils 11a and 11b, the presence or absence of a foreign object between the detection coils 11a and 11b is detected; when the foreign-object detecting circuitry 10C is connected to the detection coils 11b and 11c, the presence or absence of a foreign object between the detection coils 11b and 11c is detected; and when the foreign-object detecting circuitry 10C is connected to the detection coils 11c and 11d, the presence or absence of a foreign object between the detection coils 11c and 11d is detected.

Figure 12:
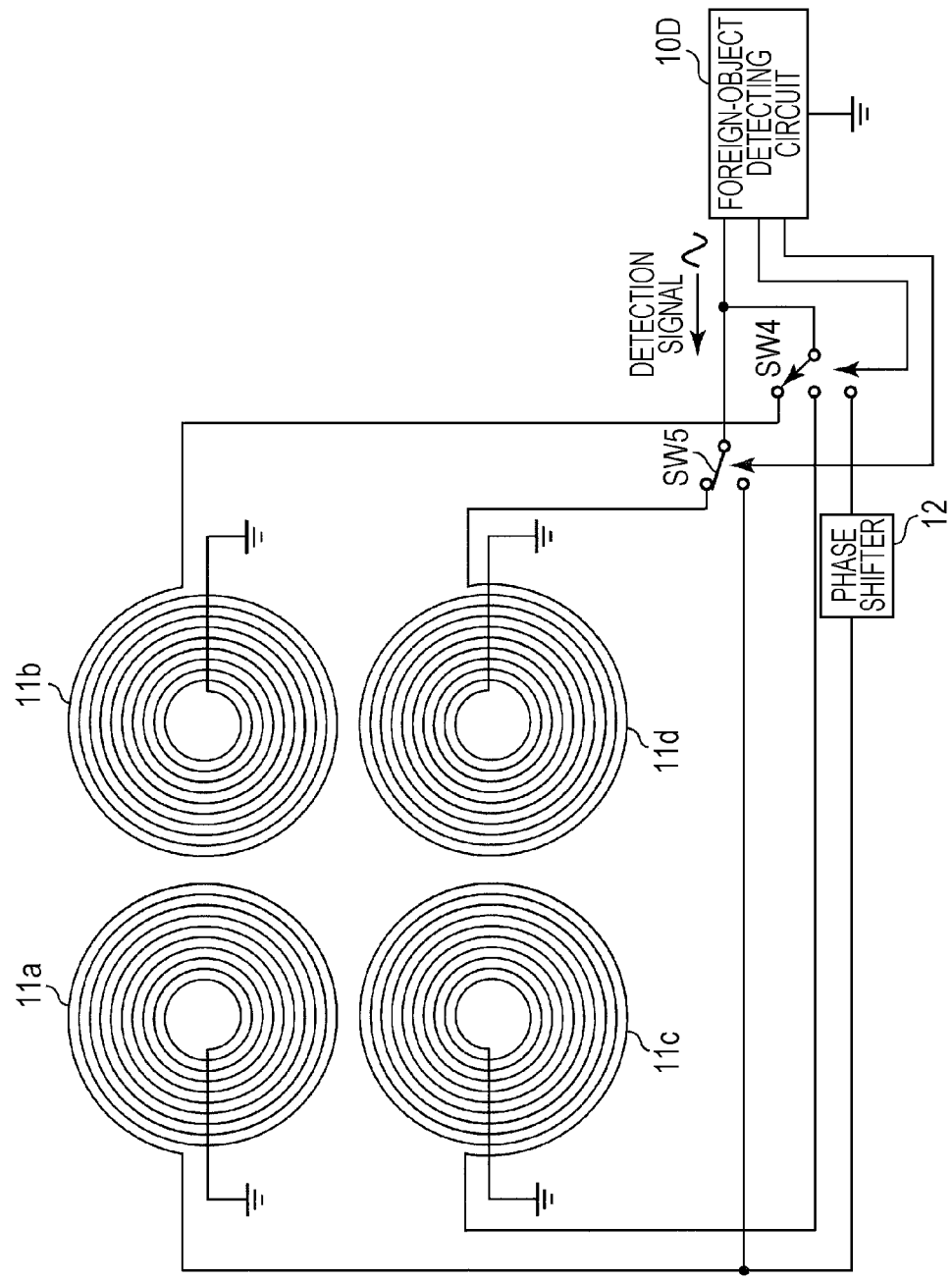
FIG. 12 is a diagram illustrating a foreign-object detecting device according to a sixth modification of the first embodiment.

FIG. 12 is a diagram illustrating a foreign-object detecting device according to a sixth modification of the first embodiment. The detection coils do not necessarily have to be one-dimensionally arranged as illustrated in FIGS. 10 and 11 and may be two-dimensionally arranged as illustrated in FIG. 12. The foreign-object detecting device illustrated in FIG. 12 includes four detection coils 11a to 11d, a foreign-object detecting circuitry 10D, switches SW4 and SW5, and a phase shifter 12. The four detection coils 11a to 11d are wound in close proximity to each other on one plane. In order that detection signals in directions that are opposite to each other flow to two mutually adjacent detection coils of the detection coils 11a to 11d, for example, the detection coils 11b and 11d have winding directions that are different from those of the detection coils 11a and 11c. The foreign-object detecting circuitry 10D generates one detection signal, similarly to the foreign-object detecting circuitry 10A illustrated in FIGS. 3 to 5, and further controls the switches SW4 and SW5. The foreign-object detecting circuitry 10D generates a cyclic detection signal having a waveform whose phase is inverted between the first half and the second half of each cycle (e.g., an alternating-current signal having a sine wave or the like). The switches SW4 and SW5 selectively connect the foreign-object detecting circuitry 10D to the two mutually adjacent detection coils 11a and 11b, 11a and 11c, 11b and 11d, 11c and 11d, or 11a and 11d of the detection coils 11a to 11d. When the foreign-object detecting circuitry 10D is connected to the detection coils 11a and 11d, the detection signal transmitted to the detection coil 11a has a phase that is substantially (180 degrees) opposite to that of the detection signal transmitted to the other detection coil 11d, the opposite phase being provided by the phase shifter 12. According to the foreign-object detecting device illustrated in FIG. 12, the switches SW4 and SW5 can selectively connect the foreign-object detecting circuitry 10D to the two mutually adjacent detection coils of the detection coils 11a to 11d to allow detection of the presence or absence of a foreign object in the vicinity of the two mutually adjacent detection coils. According to the foreign-object detecting device illustrated in FIG. 12, the positions where a foreign object can be detected (i.e., positions between the two mutually adjacent detection coils) are distributed two-dimensionally.

According to the foreign-object detecting devices illustrated in FIGS. 10 to 12, when three or more detection coils are arranged, a foreign object between two mutually adjacent detection coils of a plurality of detection coils can be detected with a simple configuration through use of at least one switch.

According to the foreign-object detecting device illustrated in FIG. 12, a foreign object between two mutually adjacent detection coils of a plurality of detection coils can be two-dimensionally detected with a simple configuration.

When the foreign-object detecting device has five or more detection coils, increasing the number of detection coils connected to the switch(es) makes it possible to selectively connect the foreign-object detecting circuitry to two mutually adjacent detection coils of the plurality of detection coils, as in the foreign-object detecting devices illustrated in FIGS. 11 and 12. For example, a first switch (the switch SW2 in FIG. 11 or the switch SW5 in FIG. 12) may switch a detection coil having a first winding direction (the detection coils 11a and 11c in FIG. 11 or the detection coils 11a and 11d in FIG. 12), and a second switch (the switch SW3 in FIG. 11 and the switch SW4 in FIG. 12) may switch a detection coil having a second winding direction (the detection coils 11b and 11d in FIG. 11 or the detection coils 11b and 11c in FIG. 12). Alternatively, the foreign-object detecting device may have three or more switches, as appropriate.

According to the foreign-object detecting devices illustrated in FIGS. 10 to 12, the winding direction(s) of one or more of the detection coils is (are) different from the winding direction(s) of the other detection coil(s) so that detection signals in directions that are opposite to each other flow to the two mutually adjacent detection coils of the plurality of detection coils. However, the present disclosure is not limited to the above-described configuration. To this end, it is possible to use the case illustrated in FIG. 1 (when the foreign-object detecting circuitry generates a plurality of detection signals having polarities that are different from each other), the case illustrated in FIG. 3 (when the wiring of one detection coil with the foreign-object detecting circuitry and the wiring of another detection coil with the foreign-object detecting circuitry are made different from each other), the case illustrated in FIG. 4 (when the phase shifter is used), or a combination thereof.

Second Embodiment

Figure 13:
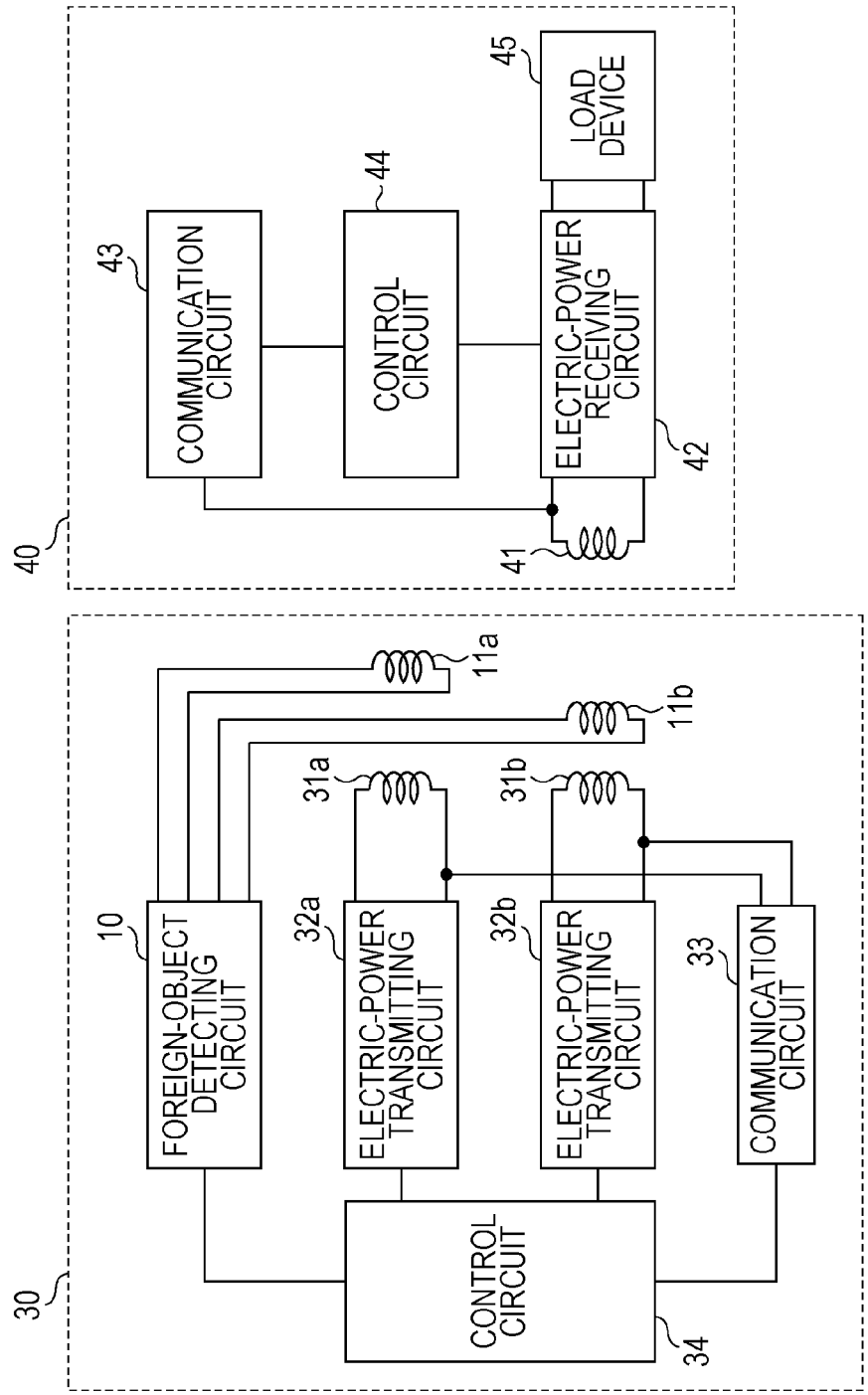
FIG. 13 is a block diagram illustrating a wireless electric-power transmission system according to a second embodiment.

FIG. 13 is a block diagram illustrating a wireless electric-power transmission system according to a second embodiment. The wireless electric-power transmission system illustrated in FIG. 13 includes an electric-power transmitting device 30 and an electric-power receiving device 40. The electric-power transmitting device 30 has a foreign-object detecting circuitry 10, detection coils 11a and 11b, electric-power transmission coils 31a and 31b, electric-power transmitting circuits 32a and 32b, a communication circuit 33, and a control circuit 34. The electric-power transmitting circuits 32a and 32b generate high-frequency electric power. The control circuit 34 in the electric-power transmitting device 30 controls the foreign-object detecting circuitry 10, the electric-power transmitting circuits 32a and 32b, and the communication circuit 33. The electric-power receiving device 40 has an electric-power reception coil 41, an electric-power receiving circuit 42, a communication circuit 43, a control circuit 44, and a load device 45. The control circuit 44 in the electric-power receiving device 40 controls the electric-power receiving circuit 42 and the communication circuit 43. The electric-power transmitting device 30 has the foreign-object detecting device (the foreign-object detecting circuitry 10 and the detection coils 11a and 11b) illustrated in FIG. 1, thus making it possible to detect a foreign object in the vicinity of the electric-power transmission coils 31a and 31b.

Figure 14:
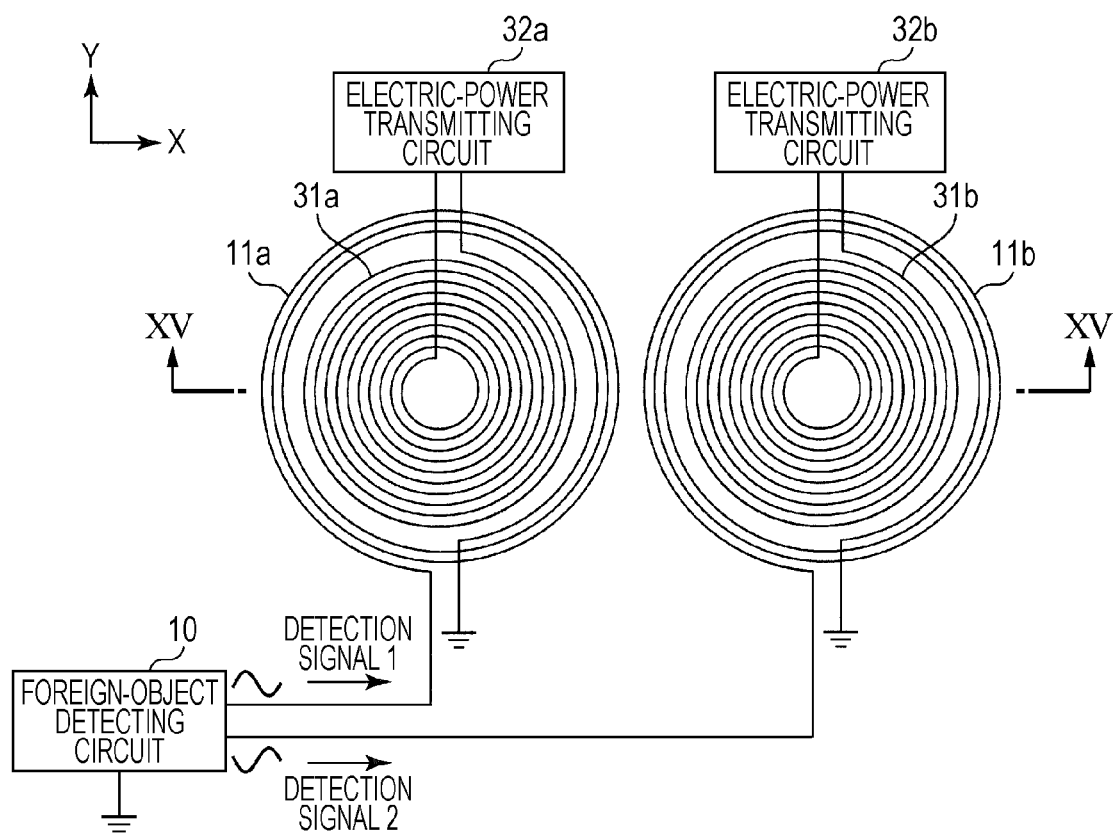
FIG. 14 is a diagram illustrating a portion of the electric-power transmitting device illustrated in FIG. 13.
Figure 15:
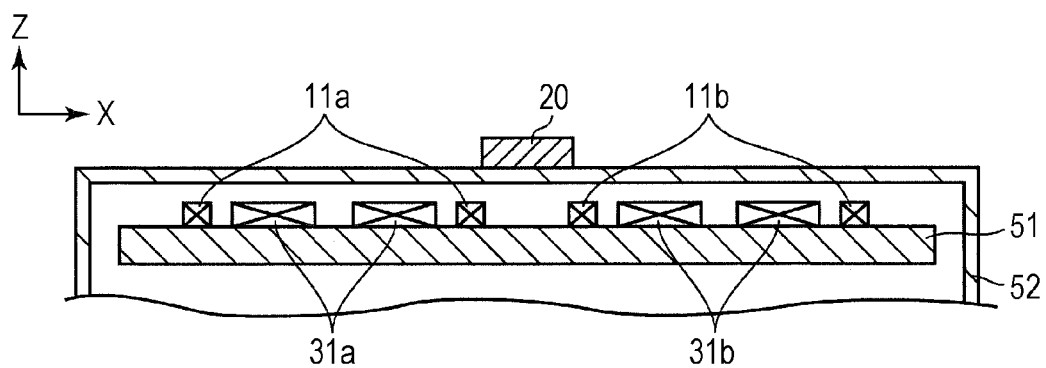
FIG. 15 is a view illustrating a cross section of the detection coils and the electric-power transmission coils, taken along XV-XV in FIG. 14.

FIG. 14 is a diagram illustrating a portion of the electric-power transmitting device 30 illustrated in FIG. 13. FIG. 14 illustrates a positional relationship of the detection coils 11a and 11b and the electric-power transmission coils 31a and 31b on an XY plane. FIG. 15 is a view illustrating a cross section of the detection coils 11a and 11b and the electric-power transmission coils 31a and 31b, taken along XV-XV in FIG. 14. As illustrated in FIG. 15, the detection coils 11a and 11b and the electric-power transmission coils 31a and 31b may be provided on a magnetic-substance substrate 51, and the electric-power transmitting device 30 may be provided in a housing 52. The housing 52 is formed of material, such as plastic, that transmits an electromagnetic field. For simplicity of illustration, the magnetic-substance substrate 51, the housing 52, and other circuits are not illustrated in FIG. 14, and circuits in the electric-power transmitting device 30 are not illustrated in FIG. 15. In the electric-power transmitting device 30 illustrated in FIG. 13, for example, the detection coil 11a is provided outside the circumference of the electric-power transmission coil 31a, and the detection coil 11b is provided outside the circumference of the electric-power transmission coil 31b. That is, one electric-power transmission coil has one detection coil. This makes it possible to reliably detect a foreign object 20 that can generate heat in the vicinity of the electric-power transmission coils 31a and 31b. Since the detection coils 11a and 11b and the electric-power transmission coils 31a and 31b are provided on the same plane, there is an advantage that the thickness of the electric-power transmitting device 30 can be reduced. In addition, according to the configuration illustrated in FIG. 13, since the electric-power transmission coils and the detection coils are separately provided, a foreign object 20 can be detected independently of the electric-power transmission operation. That is, there is an advantage that a foreign object 20 can be detected during electric-power transmission.

The frequencies of the detection signals 1 and 2 may be different from or the same as the frequency for electric-power transmission. When the frequency for electric-power transmission is, for example, 100 kHz to 200 kHz, the frequencies of the detection signals 1 and 2 may be the same as or higher than the frequency for electric-power transmission, for example, 100 kHz to 2 MHz.

Although an example in which the detection coils 11a and 11b and the electric-power transmission coils 31a and 31b are arranged on the same plane has been described in FIGS. 14 and 15, the present disclosure is not limited thereto, and the detection coils 11a and 11b may be provided on the electric-power transmission coils 31a and 31b (e.g., between the electric-power transmission coils 31a and 31b and the housing 52). This offers an advantage that the sensitivity for detecting a foreign object improves. Also, the detection coils 11a and 11b may be provided below the electric-power transmission coils 31a and 31b (e.g., between the electric-power transmission coil 31a and the magnetic-substance substrate 51). This offers an advantage that the efficiency of the wireless electric-power transmission performed by the electric-power transmission coils 31a and 31b improves.

Although an example in which two electric-power transmission coils 31a and 31b are provided has been illustrated in FIGS. 13 to 15, the present disclosure is not limited thereto, and the electric-power transmitting device may have three or more electric-power transmission coils.

Figure 16:
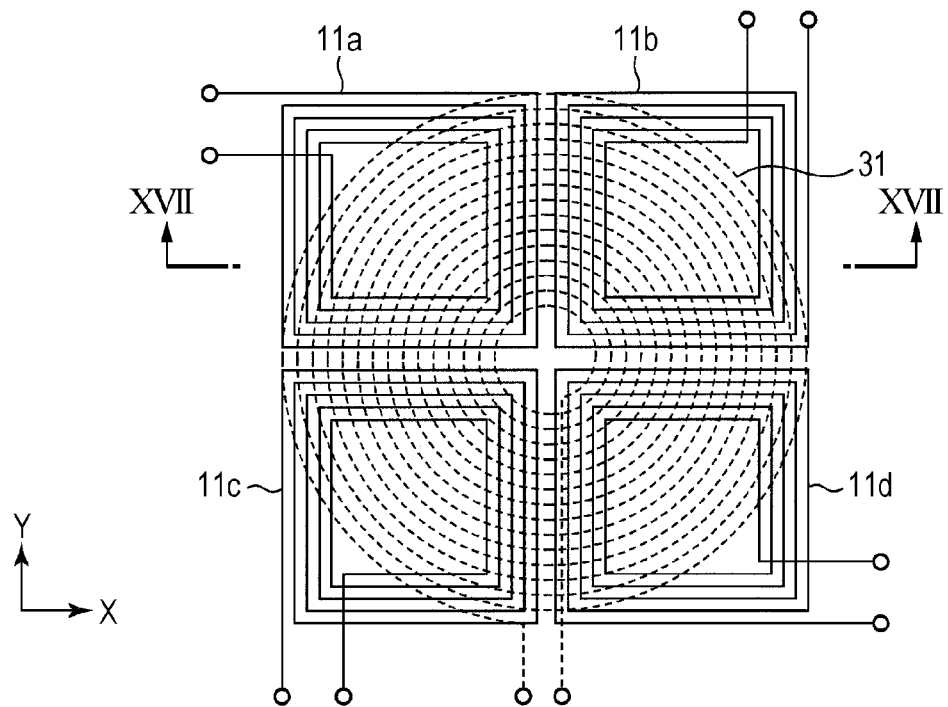
FIG. 16 is a diagram illustrating arrangement of detection coils and an electric-power transmission coil in a wireless electric-power transmission system according to a first modification of the second embodiment.
Figure 17:
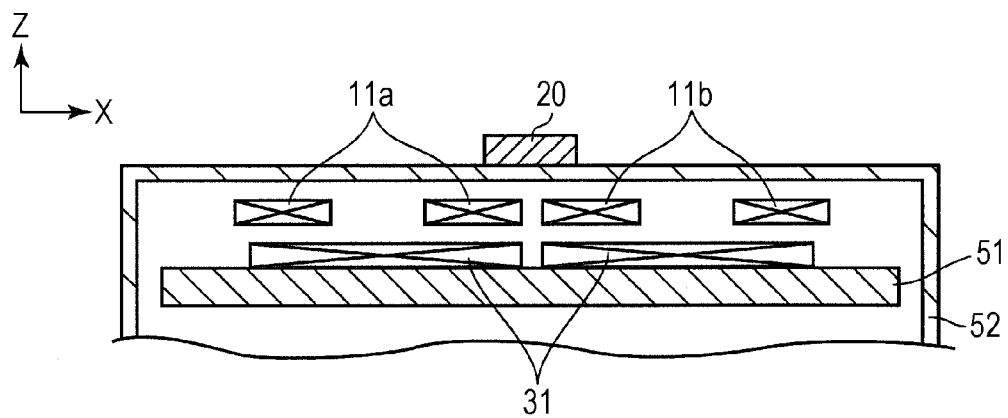
FIG. 17 is a view illustrating a cross section of the detection coils and the electric-power transmission coil, taken along line XVII-XVII in FIG. 16.

FIG. 16 is a diagram illustrating arrangement of detection coils 11a to 11d and an electric-power transmission coil 31 in a wireless electric-power transmission system according to a first modification of the second embodiment. FIG. 16 illustrates a positional relationship of the detection coils 11a to 11d and the electric-power transmission coil 31 on an XY plane. FIG. 17 is a view illustrating a cross section of the detection coils 11a to 11d and the electric-power transmission coil 31, taken along line XVII-XVII in FIG. 16. For simplicity of illustration, the magnetic-substance substrate 51, the housing 52, and other circuits are not illustrated in FIG. 16, and circuits in the electric-power transmitting device are not illustrated in FIG. 17. FIGS. 16 and 17 illustrate an example in which the detection coils 11a to 11d are arranged on one large-size electric-power transmission coil 31, each of the detection coils 11a to 11d being smaller than the electric-power transmission coil 31. In this case, the detection coils 11a to 11d are arranged on one plane that is above the electric-power transmission coil 31 and that is parallel to the electric-power transmission coil 31. The use of the detection coils 11a to 11d that are smaller than the electric-power transmission coil 31, as described above, offers an advantage that it is possible to detect a foreign object 20 that is small relative to the electric-power transmission coil 31. In addition, according to the configuration illustrated in FIGS. 16 and 17, separately providing the electric-power transmission coil and the detection coils allows a foreign object 20 to be detected independently of the electric-power transmission operation, as in FIG. 13. That is, there is an advantage that a foreign object 20 can be detected during electric-power transmission.

Figure 18:
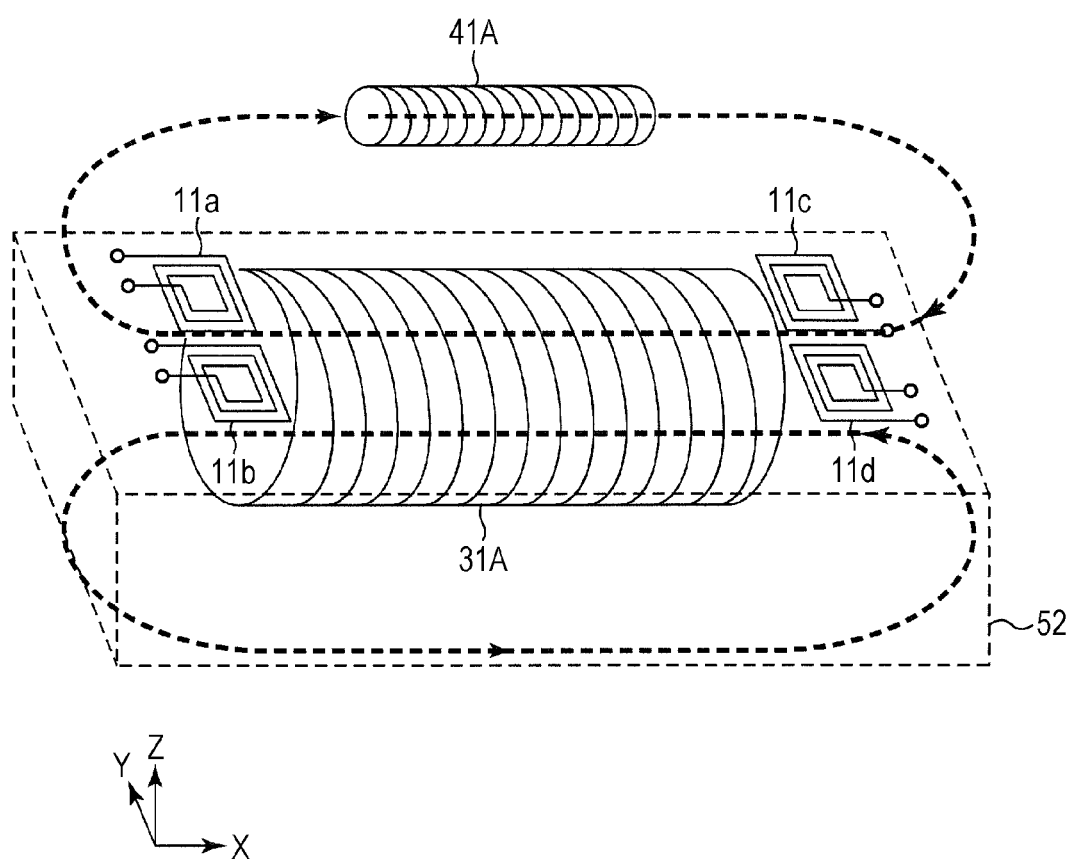
FIG. 18 is a view illustrating arrangement of detection coils, an electric-power transmission coil, and an electric-power reception coil in a wireless electric-power transmission system according to a second modification of the second embodiment.

FIG. 18 is a view illustrating arrangement of detection coils 11a to 11d, an electric-power transmission coil 31A, and an electric-power reception coil 41A in a wireless electric-power transmission system according to a second modification of the second embodiment. The electric-power transmission coil 31A (and the electric-power reception coil 41) is not limited to a coil wound on a plane, unlike those illustrated in FIGS. 14 to 17. The electric-power transmitting device and the electric-power receiving device may have the electric-power transmission coil 31A and the electric-power reception coil 41A, respectively, which are, for example, coils (solenoid coils) wound in cylindrical shapes, as illustrated in FIG. 18. For simplicity of illustration, in FIG. 18, constituent elements other than the detection coils 11a to 11d, the electric-power transmission coil 31A, and the housing 52 of the electric-power transmitting device are not illustrated, and constituent elements other than the electric-power reception coil 41A in the electric-power receiving device are not illustrated. The electric-power transmission coil 31A and the electric-power reception coil 41A are provided longitudinally parallel to each other along the X-axis and are electromagnetically coupled to each other. The detection coils 11a to 11d are arranged on one plane that is in contact with an upper end of the electric-power transmission coil 31A (at an upper end in the +Z direction). Since the electric-power transmission coil 31A is a solenoid coil, electromagnetic fields at two opposite ends of the electric-power transmission coil 31A in the direction along the X-axis are strengthened. Consequently, there is a possibility that a foreign object that is present at each of the two opposite ends of the electric-power transmission coil 31A generates heat. Conversely, even when a foreign object is present in the vicinity of the center of the electric-power transmission coil 31A in a direction along the X-axis, the foreign object does not generate much heat. Accordingly, as illustrated in FIG. 18, the detection coils 11a to 11d are arranged at the two opposite ends of the electric-power transmission coil 31A, and no detection coil may be provided at a place other than the two opposite ends. The arrangement of the detection coils 11a to 11d, as illustrated in FIG. 18, offers an advantage that it is possible to reliably detect a foreign object that can generate heat, while reducing the number of detection coils, thus leading to a reduction in the cost. As in the example illustrated in FIGS. 16 and 17, the use of the smaller detection coils 11a to 11d than the electric-power transmission coil 31A offers an advantage that it is possible to detect a foreign object 20 that is small relative to the electric-power transmission coil 31A. In addition, according to the configuration illustrated in FIG. 18, separately providing the electric-power transmission coil and the detection coils allows a foreign object to be detected independently of the electric-power transmission operation, as in FIG. 13. That is, there is an advantage that a foreign object can also be detected during electric-power transmission.

Although, in the second embodiment, the detection coils 11a to 11d are provided along the upper surface of the housing 52 of the electric-power transmitting device, the detection coils 11a to 11d may be provided at arbitrary positions where a magnetic field generated by the electric-power transmission coil 31A passes, for example, may be wound along an arbitrary position on a plane that surrounds the electric-power transmission coil 31A.

In the electric-power transmitting device, during electric-power transmission, sensing a foreign object by using the foreign-object detecting device in the present embodiment offers an advantage that the danger is prevented.

Figure 19:
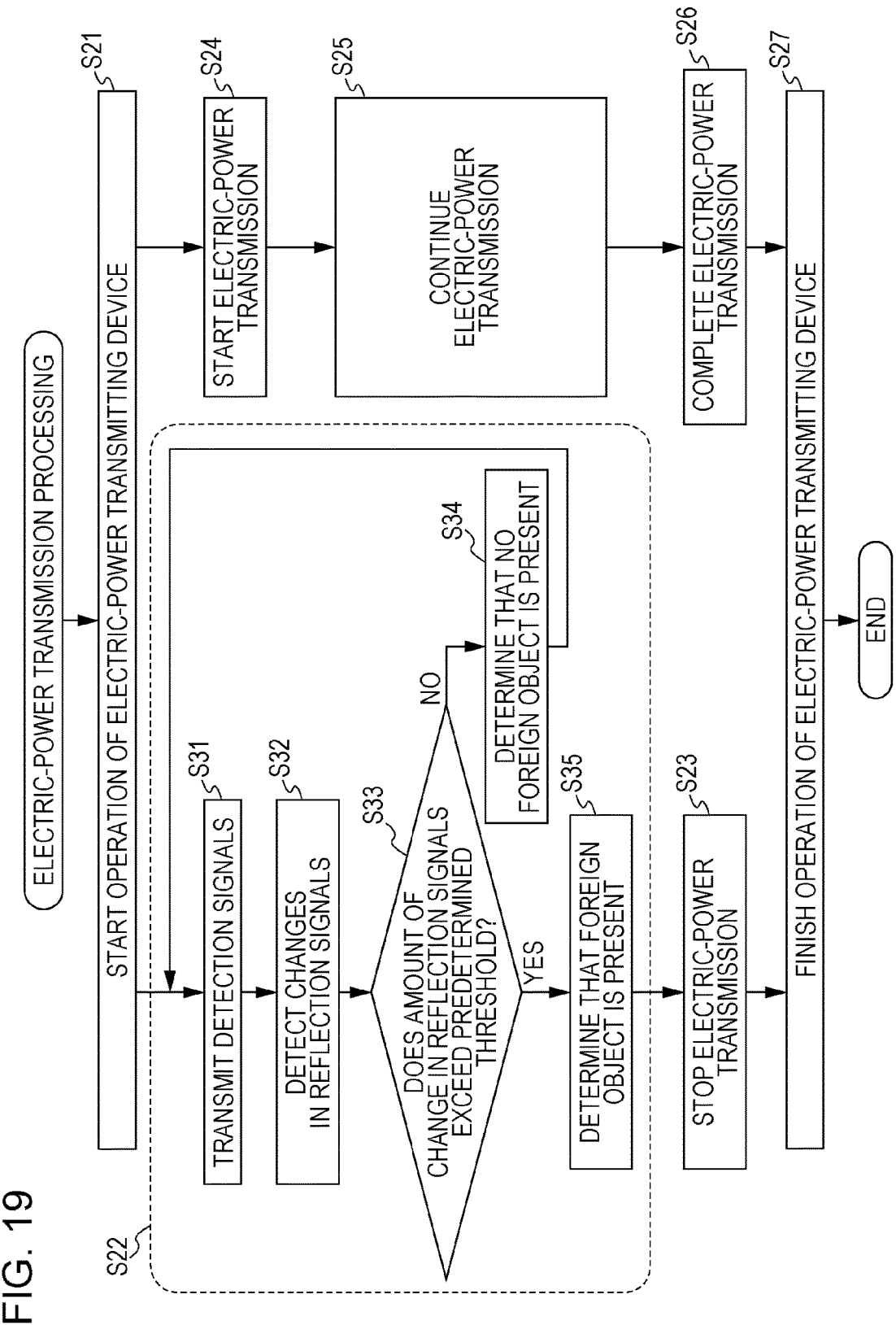
FIG. 19 is a flowchart illustrating the operation of the electric-power transmitting device according to the second embodiment.

The operation of the foreign-object detecting device according to the second embodiment will be described as one example with reference to FIG. 19.

After the operation of the electric-power transmitting device is started (step S21), electric power is transmitted (steps S24 and S25), during which during-electric power-transmission foreign-object detection processing is executed (step S22). In the during-electric power-transmission foreign-object detection processing, first, the foreign-object detecting circuitry 10 transmits detection signals (step S31), detects changes in reflection signals by using the method described in the first embodiment (step S32), and determines whether or not the amount of change in the reflection signals exceeds a predetermined threshold (step S33). If it is determined that a foreign object is present (step S35), the electric-power transmission is stopped (step S23), and the operation of the electric-power transmitting device is finished (step S27). Also, if it is determined that no foreign object is present (step S34), the during-electric power-transmission foreign-object detection processing (step S22) is continued until it is determined in step S33 in the during-electric power-transmission foreign-object detection processing (in step S22) that a foreign object is present (until a foreign object is detected and the electric-power transmission is stopped) or until the electric-power transmission operation is completed (step S26) and the power of the electric-power transmitting device is turned off. The detection signals may also be transmitted (step S31) when a predetermined time is waited for after it is determined that no foreign object is present (step S34). This makes it possible to reduce unnecessary electric power consumption.

When it is determined again that no foreign object is present after the above-described electric-power transmission is finished, the electrical connection between the foreign-object detecting circuitry and the first and second electric-power transmission coils (first and second coils) may be switched to the electrical connection between the electric-power transmitting circuit and at least one of the first and second electric-power transmission coils to resume the electric-power transmission.

Also, when it is determined again that no foreign object is present after the above-described electric-power transmission is finished, the electric-power transmission can also be started using two adjacently arranged electric-power transmission coils (which may be the first coil and the second coil described above). This offers an advantage that it is possible to transmit electric power to a larger electric-power reception coil than that in a case in which one electric-power transmission coil is used. In this case, it is desirable that the directions in which alternating-current electric powers flow to the two electric-power transmission coils be the same.

Third Embodiment

Figure 20:
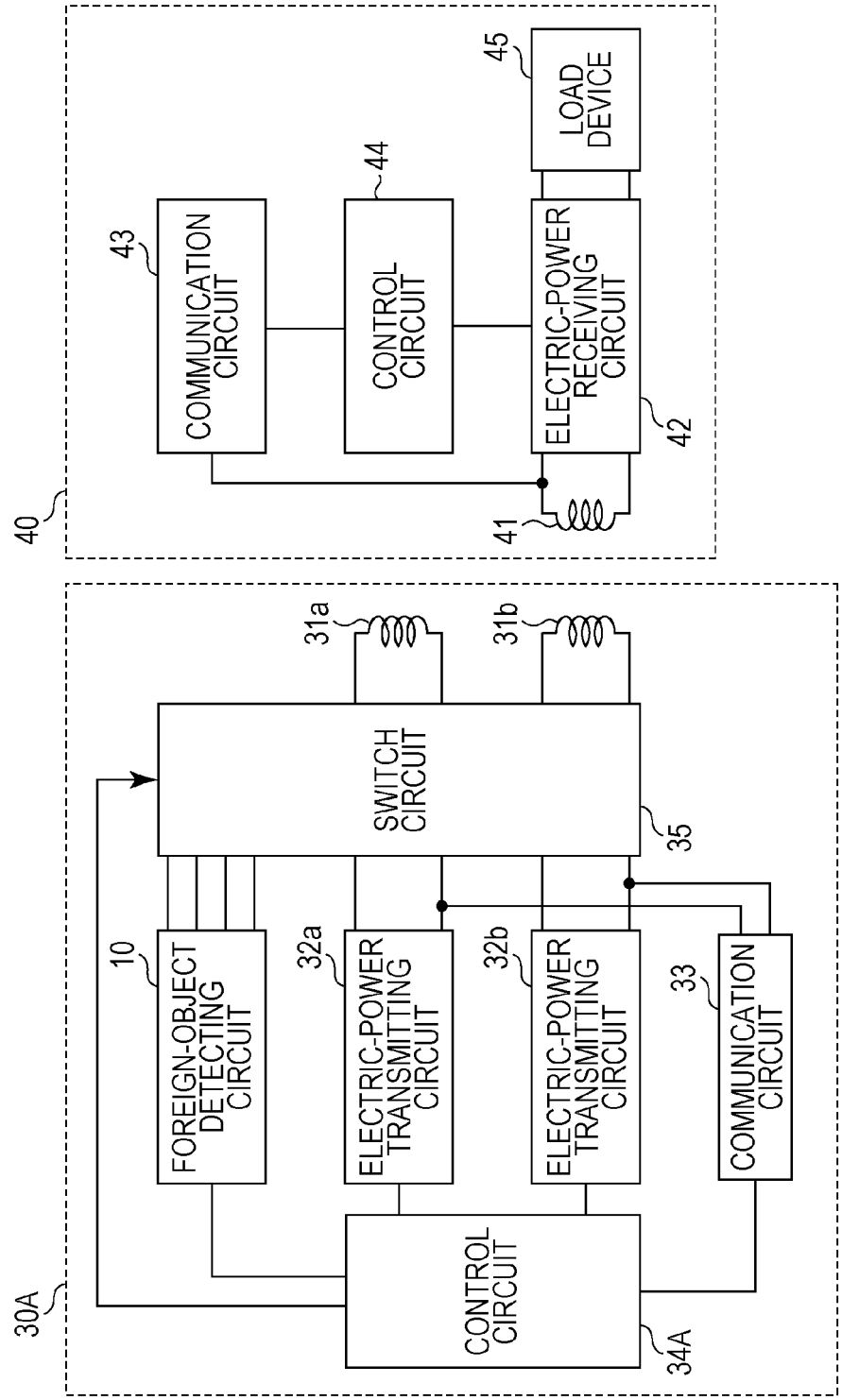
FIG. 20 is a block diagram illustrating a wireless electric-power transmission system according to a third embodiment.

FIG. 20 is a block diagram illustrating a wireless electric-power transmission system according to a third embodiment. The wireless electric-power transmission system illustrated in FIG. 20 includes an electric-power transmitting device 30A and an electric-power receiving device 40. The electric-power transmitting device 30A includes a foreign-object detecting circuitry 10, electric-power transmission coils 31a and 31b, electric-power transmitting circuits 32a and 32b, a communication circuit 33, a control circuit 34A, and a switch circuit 35. The control circuit 34A in the electric-power transmitting device 30A controls the foreign-object detecting circuitry 10, the electric-power transmitting circuits 32a and 32b, the communication circuit 33, and the switch circuit 35. The electric-power receiving device 40 illustrated in FIG. 20 is similar to the electric-power receiving device 40 illustrated in FIG. 13. The electric-power transmitting device 30A causes the electric-power transmission coils 31a and 31b to operate as the detection coils 11a and 11b illustrated in FIG. 13. That is, the electric-power transmission coils 31a and 31b are used both for electric-power transmission and for foreign-object detection. The switch circuit 35 connects at least one of the electric-power transmitting circuits 32a and 32b to at least one of the electric-power transmission coils 31a and 31b or connects the foreign-object detecting circuitry 10 to the two adjacent electric-power transmission coils 31a and 31b. When at least one of the electric-power transmitting circuits 32a and 32b is connected to at least one of the electric-power transmission coils 31a and 31b, electric power can be transmitted from the electric-power transmitting device 30A to the electric-power receiving device 40. When the foreign-object detecting circuitry 10 is connected to the two adjacent electric-power transmission coils 31a and 31b, it is possible to detect a foreign object between the two adjacent electric-power transmission coils. This makes it possible to eliminate the detection coils 11a and 11b in FIG. 13, thus reducing the component count, which offers an advantage that the cost can be reduced. In addition, since the coils, which are relatively large components, can be shared, there are advantages that it is possible to provide a miniaturized, lightweight, low-profile electric-power transmitting device, and the freedom of design increases.

Figure 21:
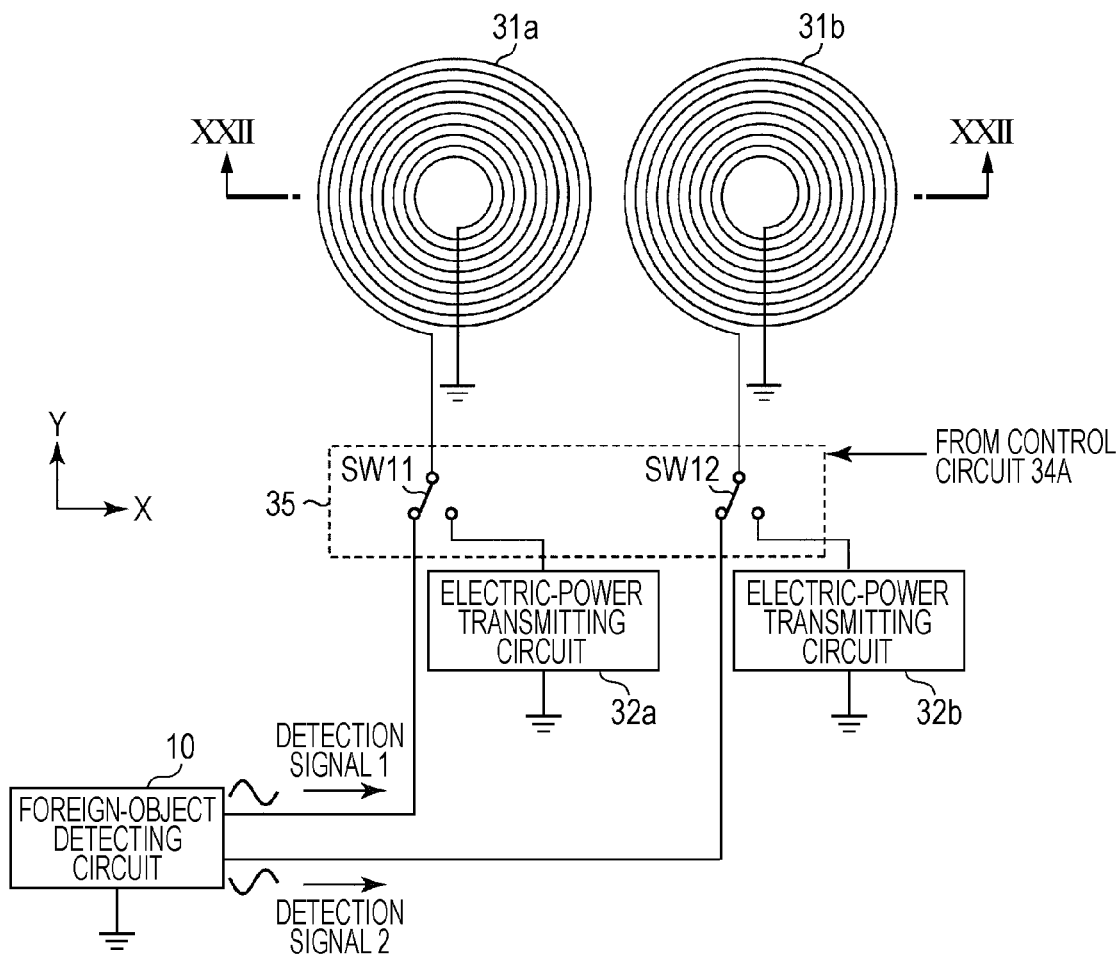
FIG. 21 is a diagram illustrating a portion of an electric-power transmitting device illustrated in FIG. 20.
Figure 22:
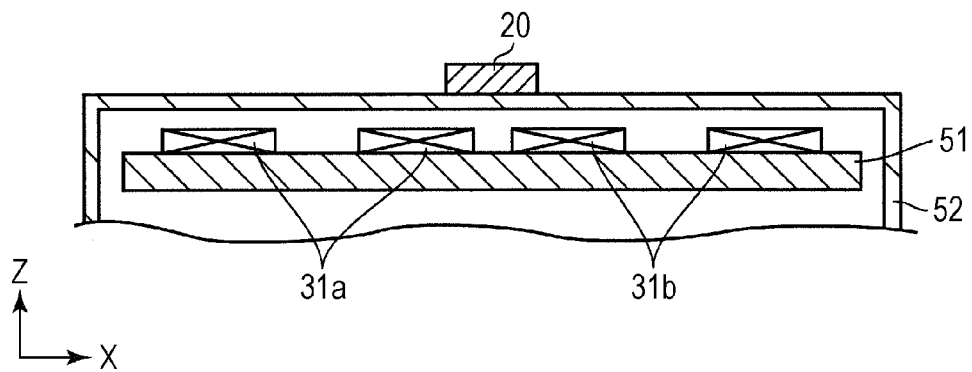
FIG. 22 is a view illustrating a cross section of the electric-power transmission coils, taken along line XXII-XXII in FIG. 21.

FIG. 21 is a diagram illustrating a portion of the electric-power transmitting device 30A illustrated in FIG. 20. FIG. 21 illustrates a positional relationship of the electric-power transmission coils 31a and 31b on an XY plane. FIG. 22 is a view illustrating a cross section of the electric-power transmission coils 31a and 31b, taken along line XXII-XXII in FIG. 21. For simplicity of illustration, the magnetic-substance substrate 51, the housing 52, and other circuits are not illustrated in FIG. 21, and circuits in the electric-power transmitting device 30A are not illustrated in FIG. 22. The electric-power transmission coils 31a and 31b are wound in close proximity to each other in the same winding direction on one plane. The foreign-object detecting circuitry 10 generates the detection signals 1 and 2 having predetermined waveforms. For example, when the detection signals 1 and 2 are sine waves, the foreign-object detecting circuitry 10 generates detection signals 1 and 2 so that they have, for example, a phase difference of 180 degrees. The phase difference between the two detection signals transmitted from the foreign-object detecting circuitry 10 is set to 180 degrees to thereby form a combined magnetic field between the two detection coils, thus making it possible to detect a foreign object that is present between the electric-power transmission coils 31a and 31b. The switch circuit 35 includes switches SW11 and SW12. The switch SW11 connects the electric-power transmission coil 31a to the electric-power transmitting circuit 32a or the foreign-object detecting circuitry 10. That is, the switch SW11 connects the electric-power transmission coil 31a to the foreign-object detecting circuitry 10 during foreign-object detection and connects the electric-power transmission coil 31a to the electric-power transmitting circuit 32a during electric-power transmission. Similarly, the switch SW12 connects the electric-power transmission coil 31b to the foreign-object detecting circuitry 10 during foreign-object detection and connects the electric-power transmission coil 31b to the electric-power transmitting circuit 32b during electric-power transmission. This allows the electric-power transmission coils 31a and 31b to be used both for electric-power transmission and for foreign-object detection. Thus, according to the configuration illustrated in FIGS. 20 to 22, the detection coil and the electric-power transmission coil can be configured with a single component, thus offering an advantage that the fabrication cost of the electric-power transmitting device and the wireless electric-power transmission system can be kept low.

When the electric-power transmission coils 31a and 31b are used for foreign-object detection, the foreign-object detecting circuitry 10A that generates one detection signal can be used, similarly to the foreign-object detecting devices illustrated in FIGS. 3 to 5, in order that detection signals in directions that are opposite to each other flow to the two adjacent electric-power transmission coils 31a and 31b.

Figure 23:
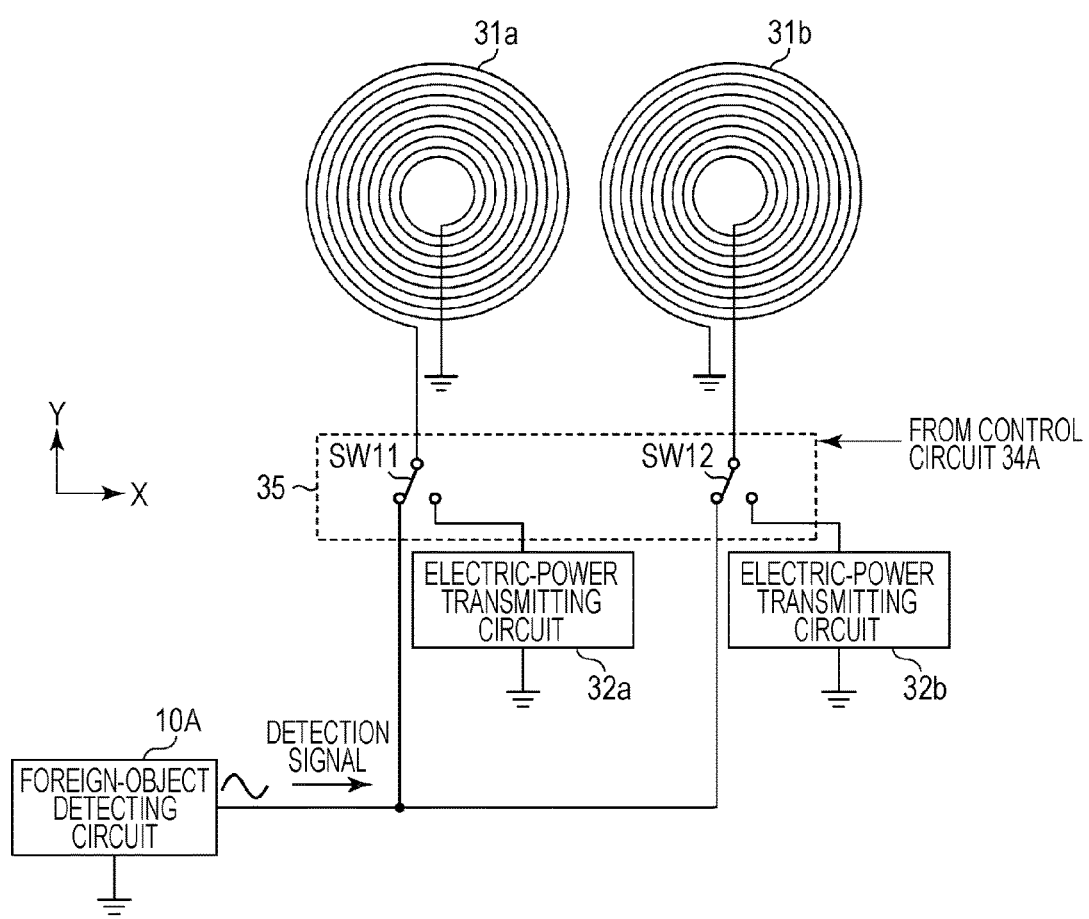
FIG. 23 is a diagram illustrating a portion of an electric-power transmitting device in a wireless electric-power transmission system according to a first modification of the third embodiment.

FIG. 23 is a diagram illustrating a portion of an electric-power transmitting device in a wireless electric-power transmission system according to a first modification of the third embodiment. A foreign-object detecting circuitry 10A and electric-power transmission coils 31a and 31b in FIG. 23 are configured in the same manner as the foreign-object detecting circuitry 10A and the detection coils 11a and 11b illustrated in FIG. 3. The electric-power transmission coils 31a and 31b have the same winding direction on one plane. The two adjacent electric-power transmission coils 31a and 31b are wired with the foreign-object detecting circuitry 10A via the switch circuit 35 so that, when one of first and second detection signals flows clockwise on a plane including the electric-power transmission coils 31a and 31b, the other of the first and second detection signals flows counterclockwise on the plane including the electric-power transmission coils 31a and 31b. According to the electric-power transmitting device illustrated in FIG. 23, the wiring of the electric-power transmission coil 31a with the foreign-object detecting circuitry 10A and the wiring of the electric-power transmission coil 31b with the foreign-object detecting circuitry 10A are made different from each other, so that detection signals in directions that are opposite to each other flow to the two adjacent electric-power transmission coils 31a and 31b. According to the electric-power transmitting device illustrated in FIG. 23, the detection signal transmitted from the foreign-object detecting circuitry 10A is divided into two, and the same detection signal is transmitted to the electric-power transmission coils 31a and 31b to thereby generate a combined magnetic field between the electric-power transmission coils 31a and 31b, and a foreign object that is present between the electric-power transmission coils 31a and 31b is detected.

Figure 24:
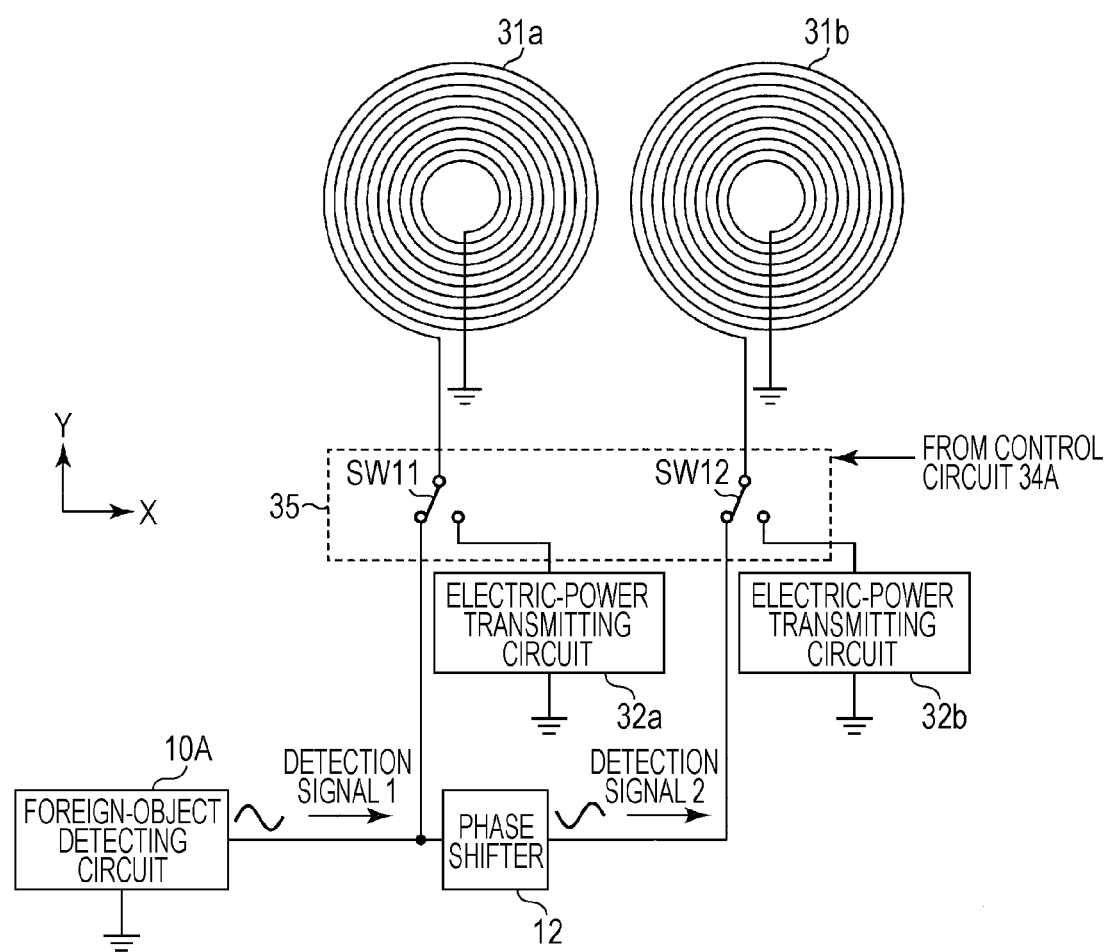
FIG. 24 is a diagram illustrating a portion of an electric-power transmitting device in a wireless electric-power transmission system according to a second modification of the third embodiment.

FIG. 24 is a diagram illustrating a portion of an electric-power transmitting device in a wireless electric-power transmission system according to a second modification of the third embodiment. A foreign-object detecting circuitry 10A, electric-power transmission coils 31a and 31b, and a phase shifter 12 illustrated in FIG. 24 are configured in the same manner as the foreign-object detecting circuitry 10A, the detection coils 11a and 11b, and the phase shifter 12 illustrated in FIG. 4. The electric-power transmission coils 31a and 31b have the same winding direction on one plane. The foreign-object detecting circuitry 10A generates one detection signal (detection signal 1) and directly transmits the detection signal to one of the two adjacent electric-power transmission coils 31a and 31b as a first detection signal and transmits the same detection signal to the other of the two adjacent electric-power transmission coils 31a and 31b via the phase shifter 12 as a second detection signal (detection signal 2). According to the electric-power transmitting device illustrated in FIG. 24, since the phase shifter 12 is used, detection signals in directions that are opposite to each other flow to the two adjacent electric-power transmission coils 31a and 31b. According to the electric-power transmitting device illustrated in FIG. 24, the detection signal transmitted from the foreign-object detecting circuitry 10A is divided into two, the detection signal whose phase is delayed by 180 degrees by the phase shifter 12 is transmitted to the electric-power transmission coil 31b to thereby form a combined magnetic field between the electric-power transmission coils 31a and 31b, and a foreign object that is present between the electric-power transmission coils 31a and 31b is detected.

Figure 25:
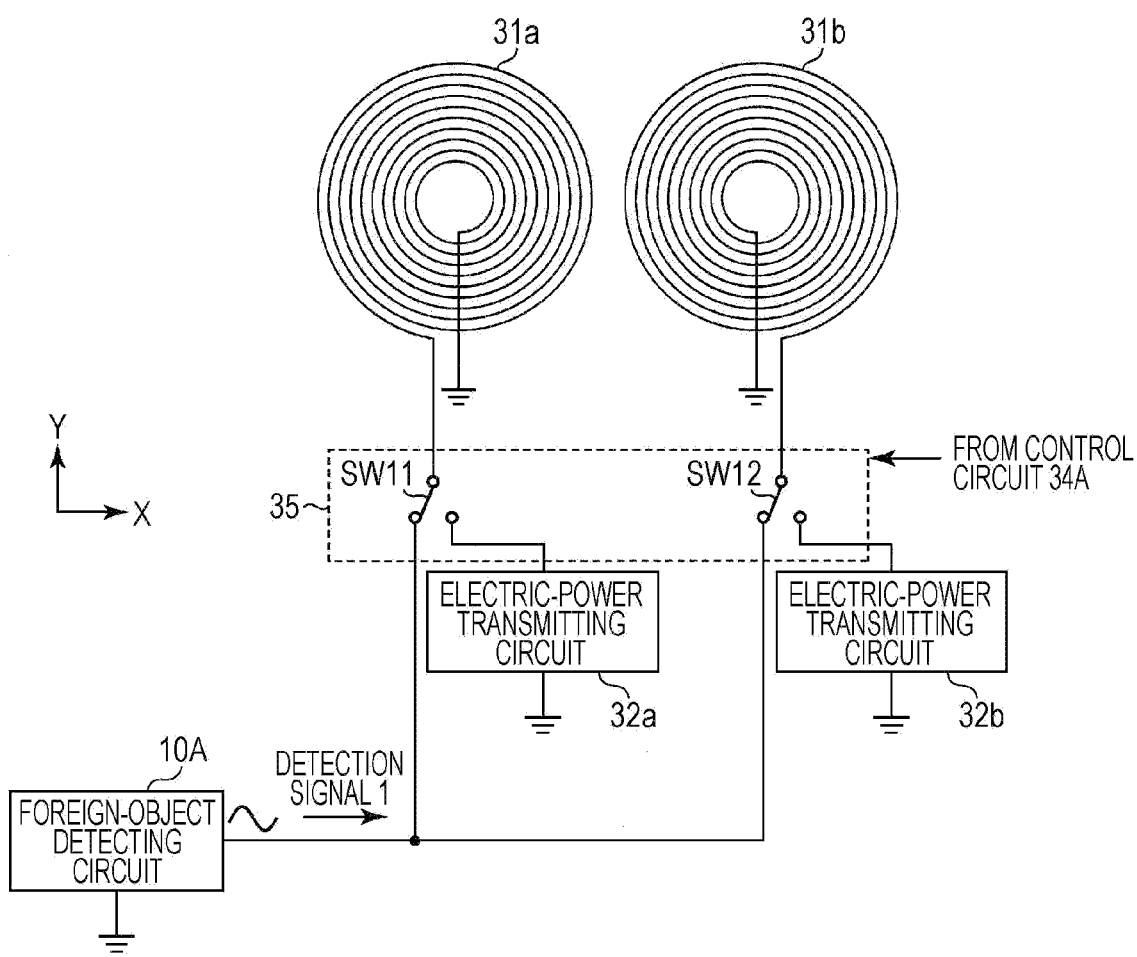
FIG. 25 is a diagram illustrating a portion of an electric-power transmitting device in a wireless electric-power transmission system according to a third modification of the third embodiment.

FIG. 25 is a diagram illustrating a portion of an electric-power transmitting device in a wireless electric-power transmission system according to a third modification of the third embodiment. The foreign-object detecting circuitry 10A and the electric-power transmission coils 31a and 31b illustrated in FIG. 25 are configured in the same manner as the foreign-object detecting circuitry 10A and the detection coils 11a and 11b illustrated in FIG. 5. The two adjacent electric-power transmission coils 31a and 31b have winding directions that are different from each other on one plane. The foreign-object detecting circuitry 10A generates one detection signal, transmits the detection signal to one of the two adjacent electric-power transmission coils 31a and 31b as a first detection signal, and transmits the same detection signal to the other of the two adjacent electric-power transmission coils 31a and 31b as a second detection signal. According to the electric-power transmitting device illustrated in FIG. 25, since the electric-power transmission coils 31a and 31b have winding directions that are different from each other on one plane, detection signals in directions that are opposite to each other flow to the two adjacent electric-power transmission coils 31a and 31b. According to the electric-power transmitting device illustrated in FIG. 25, the detection signal transmitted from the foreign-object detecting circuitry 10A is divided into two, and the same detection signal is transmitted to the electric-power transmission coils 31a and 31b to thereby generate a combined magnetic field between the electric-power transmission coils 31a and 31b, and a foreign object that is present between the electric-power transmission coils 31a and 31b is detected.

According to the electric-power transmitting devices illustrated in FIGS. 23 to 25, the number of detection signals to be output from the foreign-object detecting circuitry 10A can be made to one, thus providing an advantage that the circuitry can be simplified. According to the electric-power transmitting devices illustrated in FIGS. 23 to 25, the electric-power transmission coils 31a and 31b can be used both for electric-power transmission and for foreign-object detection, in the same manner as the electric-power transmitting device 30A illustrated in FIG. 20. According to the electric-power transmitting devices illustrated in FIGS. 23 to 25, the detection coil and the electric-power transmission coil can be configured with a single component, and the fabrication cost of the electric-power transmitting device and the wireless electric-power transmission system can be kept low, as in the electric-power transmitting device 30A illustrated in FIG. 20.

Figure 26:
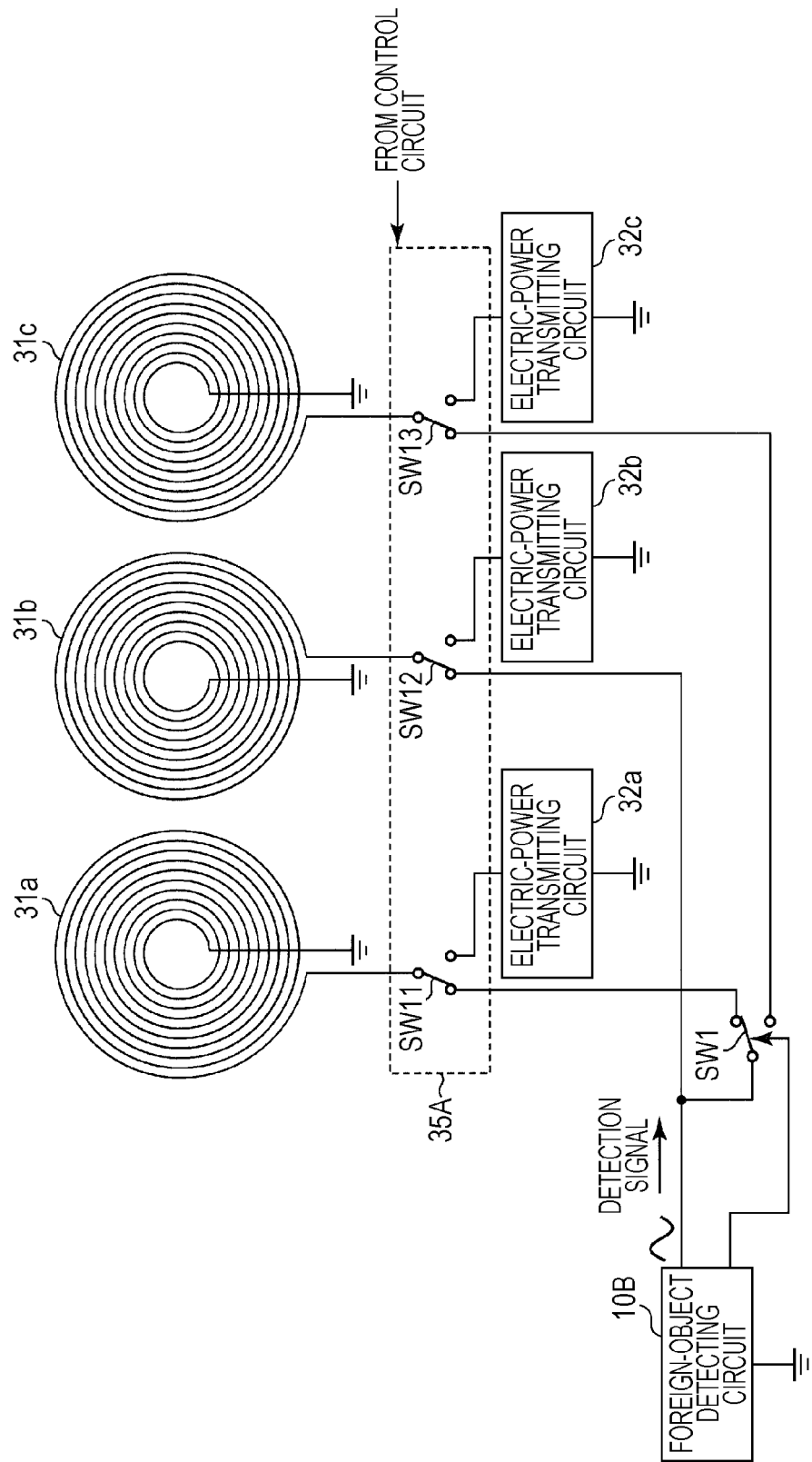
FIG. 26 is a diagram illustrating a portion of an electric-power transmitting device in a wireless electric-power transmission system according to a fourth modification of the third embodiment.

FIG. 26 is a diagram illustrating a portion of an electric-power transmitting device in a wireless electric-power transmission system according to a fourth modification of the third embodiment. The electric-power transmitting device according to the third embodiment may have three or more electric-power transmission coils in order to be used as detection coils, in the same manner as the foreign-object detecting devices illustrated in FIGS. 10 to 12. A foreign-object detecting circuitry 10B and electric-power transmission coils 31a to 31c illustrated in FIG. 26 are configured in the same manner as the foreign-object detecting circuitry 10B and the detection coils 11a to 11c illustrated in FIG. 10. In the electric-power transmitting device illustrated in FIG. 26, a switch circuit 35A includes three switch SW11 to SW13. The switch circuit 35A connects at least one of the electric-power transmission circuits 32a to 32c to at least one of the electric-power transmission coils 31a to 31c or connects the foreign-object detecting circuitry 10B to two adjacent electric-power transmission coils of the electric-power transmission coils 31a to 31c. According to the electric-power transmitting device illustrated in FIG. 26, the electric-power transmission coils 31a to 31c can be used both for electric-power transmission and for foreign-object detection, similarly to the electric-power transmitting device 30A illustrated in FIG. 20.

According to the foreign-object detecting device illustrated in FIG. 26, although the winding direction of one electric-power transmission coil is different from the winding directions of the other electric-power transmission coils in order to that the detection signals in directions that are opposite to each other flow to two adjacent electric-power transmission coils of the plurality of electric-power transmission coils, the present disclosure is not limited thereto. To this end, it is possible to use the case illustrated in FIG. 1 (when the foreign-object detecting circuitry generates a plurality of detection signals having polarities that are different from each other), the case illustrated in FIG. 3 (when the wiring of one transmission coil with the foreign-object detecting circuitry and the wiring of another transmission coil with the foreign-object detecting circuitry are made different from each other), the case illustrated in FIG. 4 (when the phase shifter is used), or a combination thereof.

In the electric-power transmitting device, the foreign-object detecting circuitry and the electric-power transmission coils may be configured in the same manner as the foreign-object detecting circuitry and the detection coils illustrated in FIG. 11 or 12.

When the foreign-object detecting device has five or more electric-power transmission coils, increasing the number of electric-power transmission coils connected to the switch(es) makes it possible to selectively connect the foreign-object detecting circuitry to two mutually adjacent electric-power transmission coils of the plurality of electric-power transmission coils, as in the foreign-object detecting devices illustrated in FIGS. 11 and 12. For example, an electric-power transmission coil having a first winding direction and an electric-power transmission coil having a second winding direction may be switched by a first switch and a second switch, respectively. Alternatively, the foreign-object detecting device may include three or more switches, as appropriate.

The modification in FIGS. 23 to 26 has a cross section (not illustrated) that is similar to the cross section illustrated in FIG. 22, and offers substantially the same advantages.

In the electric-power transmitting devices according to the second and third embodiments, sensing a foreign object by using the foreign-object detecting device in the present embodiment offers an advantage that the danger is prevented. A specific operation will be described as one example with reference to FIG. 27.

Figure 27:
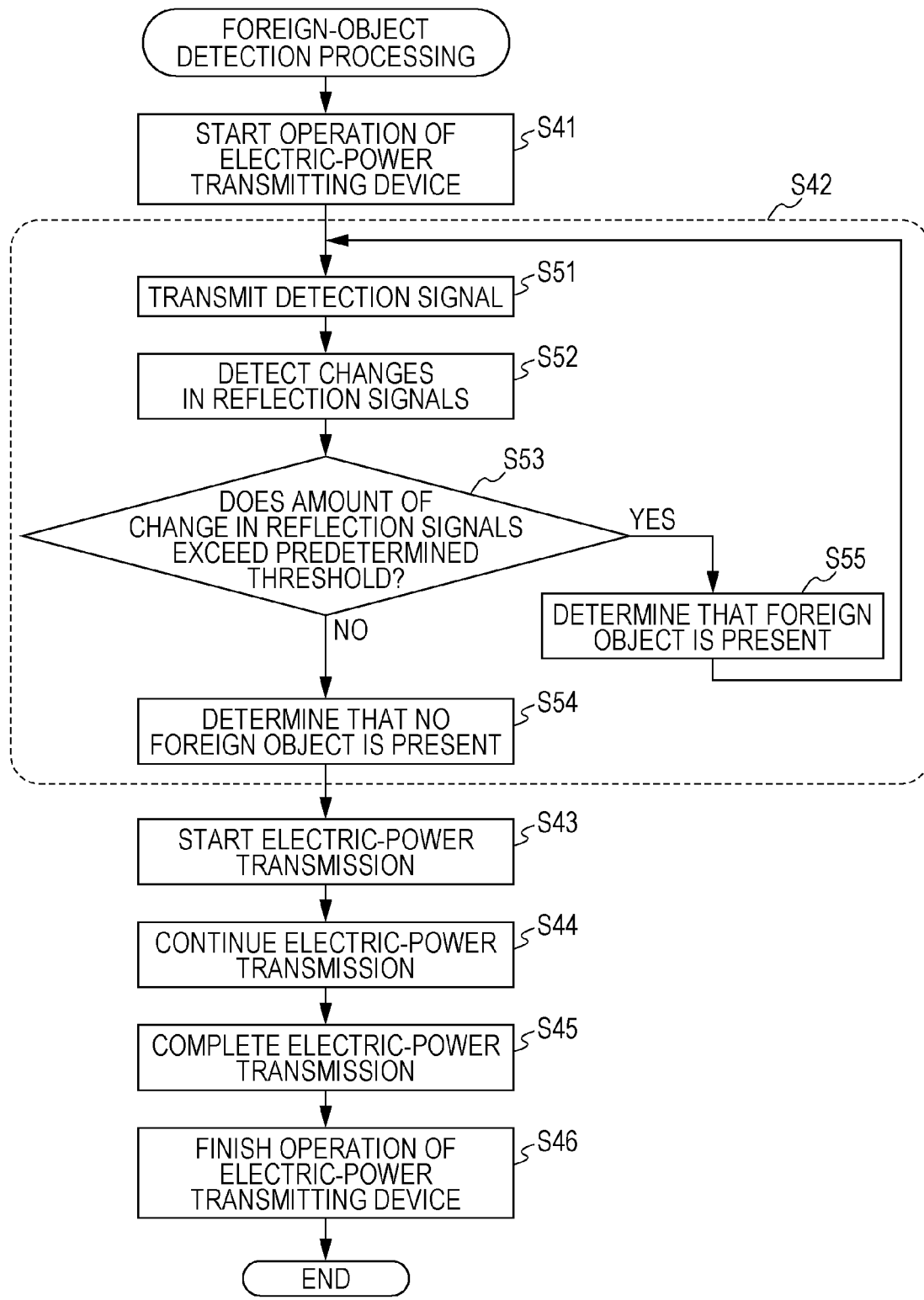
FIG. 27 is a flowchart illustrating the operation of the electric-power transmitting device according to each of the second and third embodiments.

After the operation of the electric-power transmitting device is started (step S41), pre-electric-power-transmission foreign-object detection processing (step S42) is executed. The pre-electric-power-transmission foreign-object detection processing illustrated in FIG. 27 is substantially the same as the foreign-object detection processing illustrated in FIG. 6. In the pre-electric-power-transmission foreign-object detection processing, first, a detection signal is transmitted from the foreign-object detecting circuitry 10 (step S51), and detection of changes in reflection signals (step S52) and a determination as to whether or not the amount of change in the reflection signals exceeds a predetermined threshold are performed (step S53) by using the method described in the first embodiment. If it is determined that no foreign object is present (step S54), the electric-power transmission is started (step S43), and the electric-power transmission is continued until it is finished (steps S43 to S46). Also, if it is determined that a foreign object is present (step S55), the pre-electric-power-transmission foreign-object detection processing (step S42) is continued until it is determined in the pre-electric-power-transmission foreign-object detection processing (step S42) that no foreign object is present or the electric power of the electric-power transmitting device is turned off. If a foreign object is still present after the pre-electric-power-transmission foreign-object detection processing (step S42) is continued until a predetermined time, it is also possible to turn off the power of the electric-power transmitting device. This makes it possible to reduce unnecessary electric power consumption.

As described above, sensing a foreign object by using the foreign-object detecting device in the present embodiment offers an advantage that the danger is prevented.

In addition, when a foreign object is sensed before the electric-power transmitting device transmits electric power, and a foreign object is sensed during electric-power transmission, this offers an advantage that it is possible to prevent the danger. More specifically, an operation will be described as one example with reference to FIG. 28.

After the operation of the electric-power transmitting device is started (step S21), the pre-electric-power-transmission foreign-object detection processing is executed (step S61: which is substantially the same as step S42 in FIG. 27). Thereafter, the electric-power transmission is started (step S24), and the during-electric power-transmission foreign-object detection processing is executed (step S22: which is substantially the same as step S22 in FIG. 19). In this case, the operations of steps S21 to S27 in FIG. 28 are substantially the same as those of steps S21 to S27 in FIG. 19, the operation in step S61 in FIG. 28 is substantially the same as that in step S42 in FIG. 27, and descriptions thereof are not given hereinafter.

Figure 28:
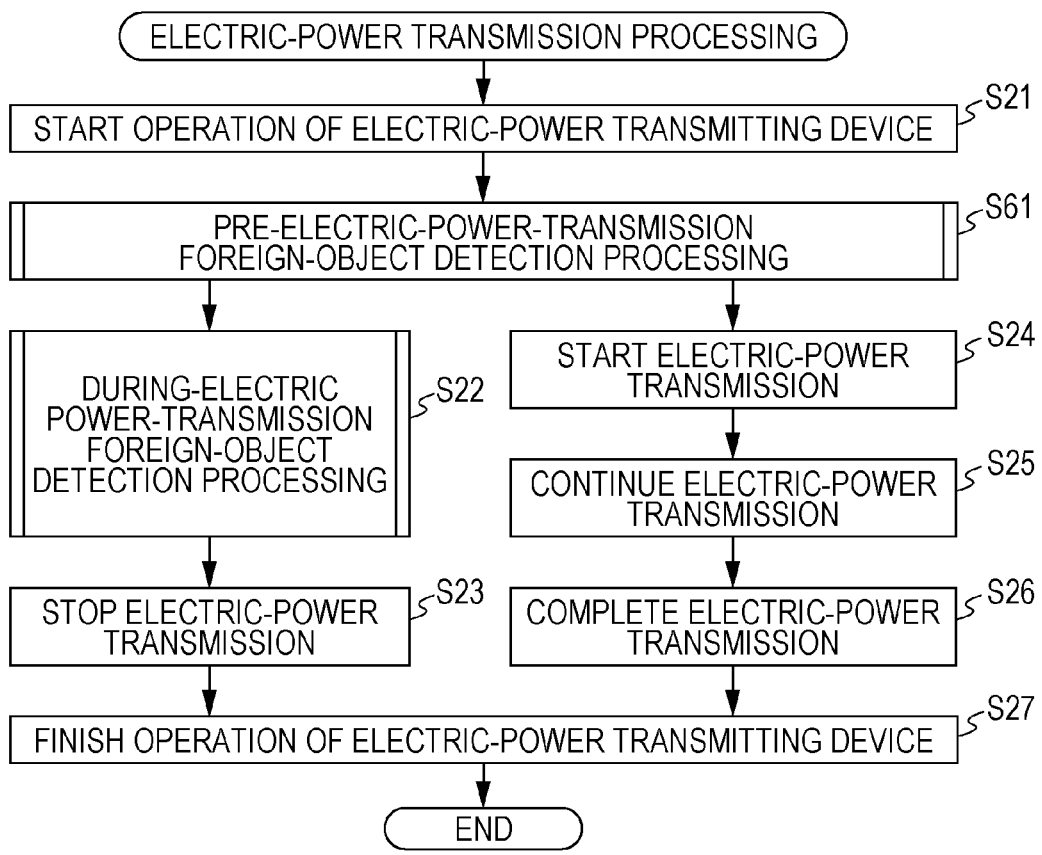
FIG. 28 is a flowchart illustrating the operation of an electric-power transmitting device that senses a foreign object before electric-power transmission and that also senses a foreign object during electric-power transmission.

According to the electric-power transmission processing in FIG. 28, before the electric-power transmission, a foreign object can be detected, and also, during the electric-power transmission, the presence of a foreign object can be sensed, and thus the electric-power transmission can be stopped. Thus, there is an advantage that the safety is further increased.

Modifications

Although each of the detection coils and the electric-power transmission coils has been illustrated in the appended drawings as being a circular coil or a quadrangular coil, each coil is not limited thereto and may have a square shape, a rectangular shape, an elongated circular shape, an elliptical shape, or another coil shape.

In addition, although the configuration in which each of the electric-power transmitting devices 30 and 30A has the communication circuit 33 and the configuration in which the electric-power receiving device 40 has the communication circuit 43 have been described by way of example in the second and third embodiments, the present disclosure is not limited thereto. When one of the electric-power transmitting device 30 and the electric-power receiving device 40 has a transmitting circuit, and the other one has a receiving circuit, it is also possible to realize a configuration that performs one-way communication. Since this can simplify the circuit configuration, there is also an advantage that the cost can be reduced. When electric power having a predetermined value is transmitted/received, communication is not necessary, and thus a configuration that does not include the communication circuits 33 and 43 is also possible. This can eliminate the communication circuit to provide an advantage of reducing the cost.

A configuration in which the communication circuit 33 in each of the electric-power transmitting devices 30 and 30A is connected to the electric-power transmission coils 31a and 31b and the electric-power transmission coils 31a and 31b are used to perform communication has been described in the second and third embodiments, the present disclosure is not limited thereto. For example, it is also possible to employ a configuration in which the communication circuit 33 is connected to an antenna or another coil. Also, although a configuration in which the electric-power receiving device 40 also uses the electric-power reception coil 41 to perform communication has been described above, the present disclosure is not limited thereto. For example, it is also possible to employ a configuration in which the communication circuit 43 is connected to another antenna or another coil.

Also, although an example in which the electric-power transmitting circuits 32a and 32b are connected to the respective electric-power transmission coils 31a and 31b has been described in the second and third embodiments, the present disclosure is not limited thereto, and a configuration in which one electric-power transmitting circuit is connected to both of the electric-power transmission coils 31a and 31b is also possible. This reduces the number of electric-power transmitting circuits, thus leading to a reduction in the cost. It is also possible to employ a configuration in which one electric-power transmitting circuit is selectively connected to one of the electric-power transmission coils 31a and 31b via a switch. With this configuration, supplying electric power to only an electric-power transmission coil that requires electric-power transmission offers an advantage that waste of energy is reduced, leading to an improvement in the transmission efficiency.

Also, in the second and third embodiments, the magnetic-substance substrate 51 has an area that is larger than the region in which the detection coils 11a and 11b and the electric-power transmission coils 31*a* and 31*b* are arranged. This provides an advantage that it is possible to reduce influences on the detection coils 11*a* and 11*b* and the electric-power transmission coils 31*a* and 31*b*, the influences being exerted by metal or the like (e.g., a metal-desk top plate) placed below the coils. Although an example in which one magnetic-substance substrate 51 having a large area has been described above with reference to FIG. 15, an individual magnetic-substance substrate may also be provided for each set of the electric-power transmission coil and the detection coil. This makes it possible to reduce the amount of the magnetic substance at an unnecessary portion, thus offering an advantage that the member cost can be reduced.

Other Embodiments

The technology according to the present disclosure is not limited to the above-described embodiments, and various modifications can be made thereto. The description below will be given of other embodiments of a wireless electric-power transmitting device having the above-described foreign-object detecting device and a wireless electric-power transmission system having the above-described wireless electric-power transmitting device and the above-described wireless electric-power receiving device.

Figure 29:
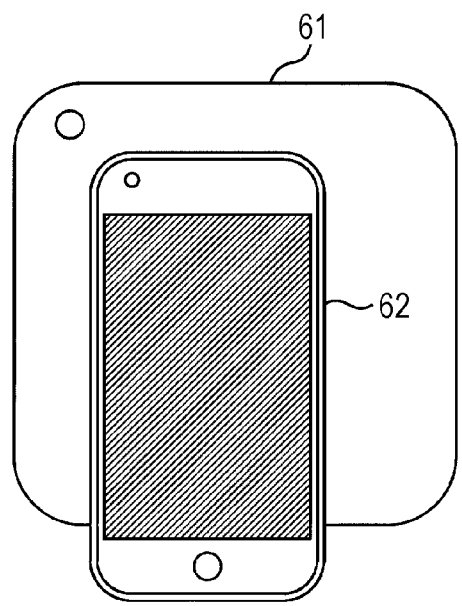
FIG. 29 is a view illustrating a state in which, for example, a smartphone having an electric-power receiving device is placed on an electric-power transmitting device.

FIG. 29 illustrates a state in which, for example, a smartphone 62 having an electric-power receiving device is placed on an electric-power transmitting device 61. The electric-power transmitting device 61 has the above-described foreign-object detecting device. Before starting electric-power transmission, the foreign-object detecting device determines the presence or absence of a foreign object on the electric-power transmitting device 61. Upon determining that no foreign object is present on the electric-power transmitting device 61, the electric-power transmitting circuit wirelessly transmits alternating-current electric power to the electric-power receiving device in the smartphone 62. The electric-power transmitting device 61 and the electric-power receiving device in the smartphone 62 constitute a wireless electric-power system.

With this arrangement, since a foreign object is sensed before the electric-power transmission is started, it is possible to prevent the danger that a foreign object generates heat.

Also, since the electric-power transmitting device described above senses a foreign object by using the foreign-object detecting device even during electric-power transmission, it is possible to prevent the danger.

Figure 30:
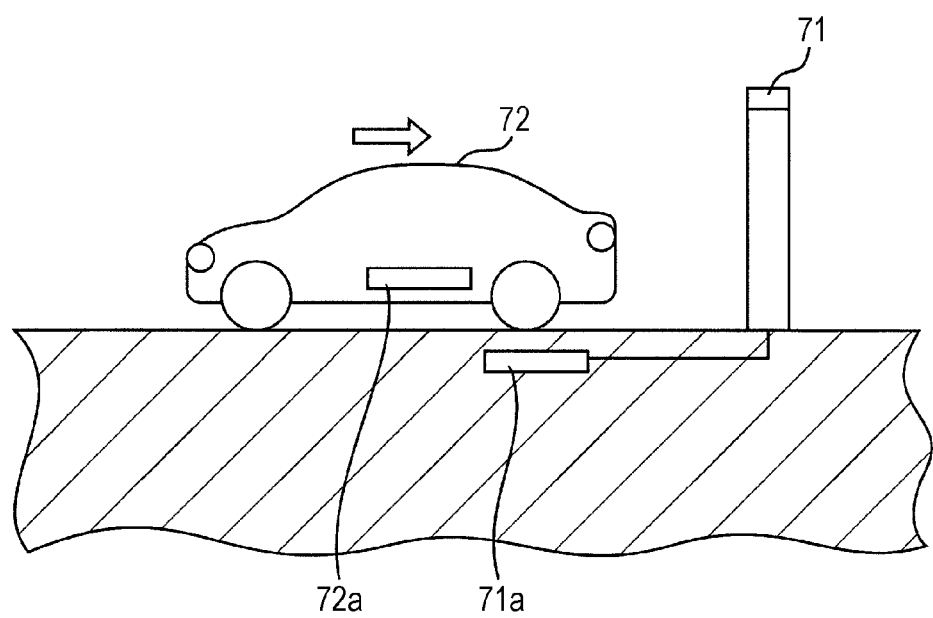
FIG. 30 is a diagram illustrating a parking lot equipped with a wireless electric-power system.

FIG. 30 is a diagram illustrating a parking lot equipped with a wireless electric-power system. A vehicle 72 is equipped with an electric-power receiving device having an electric-power reception coil 72*a*. Also, an electric-power transmitting device 71 is provided, for example, in a fence, which is a parking stop, generally vertically built on a road. The electric-power transmitting device 71 has the above-described foreign-object detecting device. An electric-power transmission coil 71*a* is embedded in the road and is connected to the electric-power transmitting device 71 through an electrical cable.

Before the electric-power transmitting device 71 starts electric-power transmission, the foreign-object detecting device determines the presence or absence of a foreign object on the electric-power transmission coil 71 a. When it is determined that no foreign object is present on the electric-power transmission coil 71*a,* and alignment of the electric-power reception coil 72*a* of the vehicle 72 with the electric-power transmission coil 71*a* is completed, high-frequency electric power is transmitted from the electric-power transmitting device 71 to the electric-power transmission coil 71*a* through the electrical cable. High-frequency electric power is then wirelessly transmitted from the electric-power transmission coil 71*a* to the electric-power reception coil 72*a*.

With this arrangement, since a foreign object is sensed before the electric-power transmission is started, it is possible to prevent the danger that a foreign object generates heat.

Since the electric-power transmitting device 71 uses the above-described foreign-object detecting device to sense a foreign object during electric-power transmission, it is possible to prevent the danger.

Figure 31:
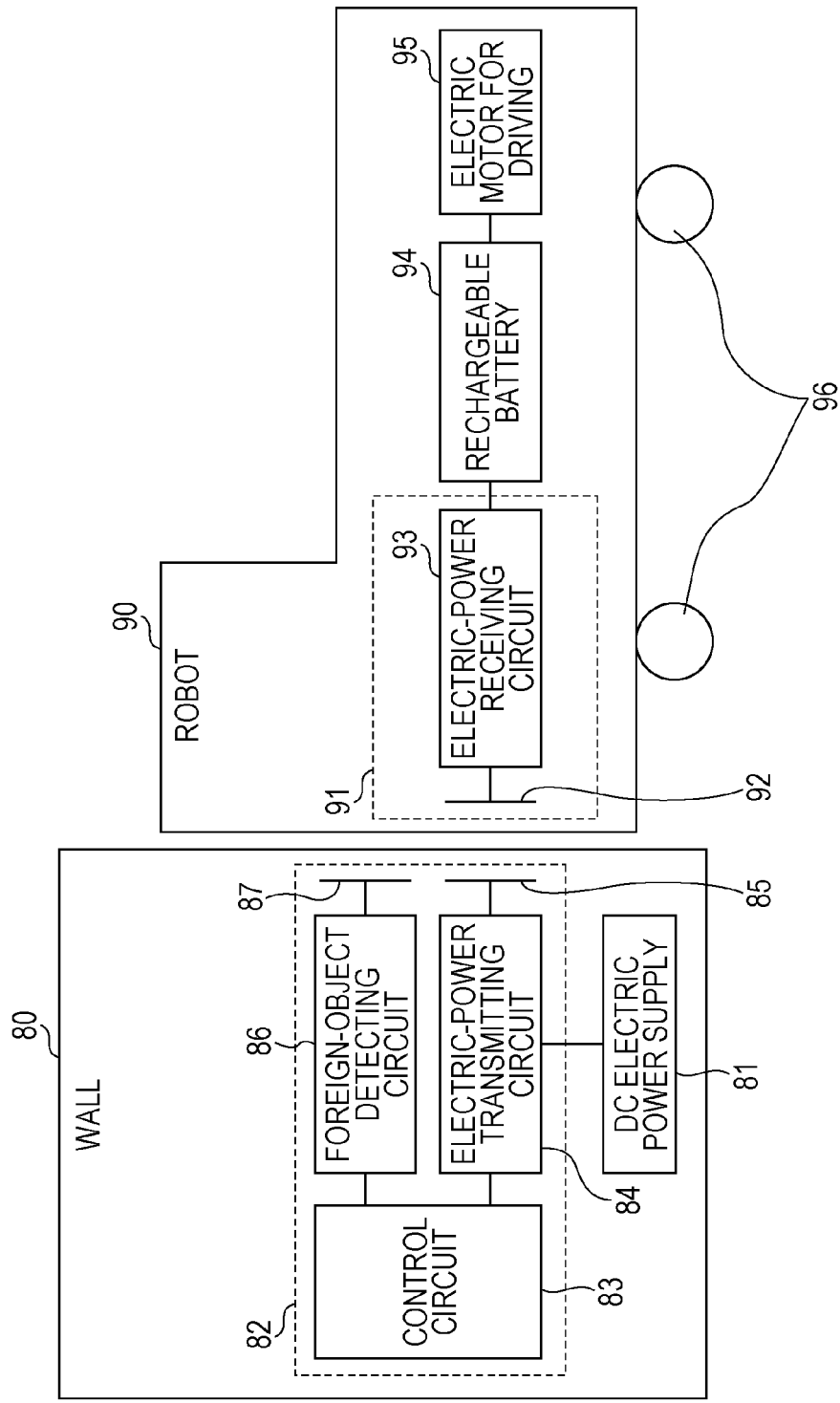
FIG. 31 is a block diagram illustrating an example configuration of a wireless electric-power transmission system in which electric power is transmitted from a wall to a robot in a hospital or the like in a contactless manner.

FIG. 31 is a block diagram illustrating an example configuration of a wireless electric-power transmission system in which electric power is transmitted in a contactless manner from a wall 80 to a robot 90 used in a hospital or the like. In this example, a direct-current (DC) electric power supply 81 and an electric-power transmitting device 82 are embedded in the wall 80. The electric-power transmitting device 82 has, for example, a control circuit 83, an electric-power transmitting circuit 84, an electric-power transmission coil 85, a foreign-object detecting circuitry 86, and a detection coil 87. The electric-power transmitting device 82 is configured, for example, in the same manner as the electric-power transmitting device 30 illustrated in FIG. 13. The robot 90 has an electric-power receiving device 91 including an electric-power reception coil 92 and an electric-power receiving circuit 93. The electric-power receiving device 91 may be configured, for example, in the same manner as the electric-power receiving device 40 illustrated in FIG. 13. The robot 90 further has a rechargeable battery 94, an electric motor 95 for driving, and a plurality of wheels 96 for traveling.

With such a system, for example, electric power is transmitted from the wall 80 to the robot 90 in a hospital or the like in a contactless manner to allow the robot 90 to be automatically charged without human help.

With the arrangement described above, since a foreign object is sensed before the electric-power transmission is started, it is possible to prevent the danger that a foreign object generates heat.

Also, since the electric-power transmitting device described above senses a foreign object by using the foreign-object detecting device even during electric-power transmission, it is possible to prevent the danger.

The embodiments disclosed herein are exemplary and illustrative in all respects and are not intended to be limiting. It is to be understood that the scope of the present disclosure is determined by the scope of the appended claims, not by the above description, and is intended to encompass all aspects including changes and modifications within meanings and a scope equivalent to the claims.

A foreign-object detecting device according to an aspect of the present disclosure and a wireless electric-power transmission system including a wireless electric-power transmitting device having a detection coil have the following configurations.

A foreign-object detecting device according to a first aspect of the present disclosure includes: a first coil having a first conducting wire that is wound and that has two terminals, one of the terminals being an outside terminal provided at an outer side and the other terminal being an inside terminal provided at an inner side; a second coil arranged adjacent to the first coil and having a second conducting wire that is wound in the same direction as a winding direction of the first coil and that has two terminals, one of the terminals being an outside terminal provided at an outer side and the other terminal being an inside terminal provided at an inner side; and a foreign-object detecting circuitry. The foreign-object detecting circuitry outputs a first detection signal to the outside terminal of the first coil and outputs a second detection signal to the outside terminal of the second coil or outputs a first detection signal to the inside terminal of the first coil and outputs a second detection signal to the inside terminal of the second coil, the first detection signal having a first predetermined waveform and the second detection signal having a second predetermined waveform having a polarity inverted relative to a polarity of the first predetermined waveform; causes one of the first detection signal output to the first coil and the second detection signal output to the second coil to flow clockwise and causes the other detection signal to flow counterclockwise to generate a combined magnetic field across a center of the first coil and a center of the second coil; measures an amount of change in an impedance value of one of the first coil and the second coil, the change corresponding to a change in the combined magnetic field which is caused by the presence or absence of a foreign object; and determines that a foreign object is present within the combined magnetic field across the center of the first coil and the center of the second coil, when the amount of change in the impedance value exceeds a predetermined value.

According to the aspect described above, the foreign-object detecting device includes the second coil that is arranged adjacent to the first coil and that is wound in the same direction as the winding direction of the first coil and the foreign-object detecting circuitry.

The foreign-object detecting circuitry outputs a first detection signal to the outside terminal of the first coil and outputs a second detection signal to the outside terminal of the second coil or outputs a first detection signal to the inside terminal of the first coil and outputs a second detection signal to the inside terminal of the second coil, the first detection signal having a first predetermined waveform and the second detection signal having a second predetermined waveform having a polarity inverted relative to a polarity of the first predetermined waveform. The foreign-object detecting circuitry causes one of the first detection signal output to the first coil and the second detection signal output to the second coil to flow clockwise and causes the other detection signal to flow counterclockwise.

The foreign-object detecting circuitry causes a combined magnetic field to be generated across a center of the first coil and a center of the second coil.

The foreign-object detecting circuitry measures an amount of change in an impedance value of one of the first coil and the second coil, the change corresponding to a change in the combined magnetic field which is caused by the presence or absence of a foreign object.

The foreign-object detecting circuitry determines that a foreign object is present within the combined magnetic field across the center of the first coil and the center of the second coil, when the amount of change in the impedance value exceeds a predetermined value.

As a result, it is possible to detect a foreign object that is present between the adjacent first and second coils, and it is possible to increase the range in which a foreign object can be detected with high accuracy.

In addition, since the first coil and second coil that have been used heretofore can be directly used, it is possible to suppress increases in the component count, the dimensions, and the manufacturing cost.

Also, since the first coil and the second coil can be configured with the same component, it is possible to keep the cost of the foreign-object detecting device low.

In the foreign-object detecting device according to the first aspect of the present disclosure, a foreign-object detecting device according to a second aspect of the present disclosure may have a feature that the first coil and the second coil may be arranged parallel to each other.

According to the aspect described above, since the first coil and the second coil are arranged parallel to each other, the distributions of magnetic fields released by the first coil and the second coil become uniform, thus allowing a foreign objects to be detected with high accuracy.

In the foreign-object detecting device according to one of the first aspect and the second aspect of the present disclosure, a foreign-object detecting device according to a third aspect of the present disclosure may have a feature that the first detection signal and the second detection signal are alternating-current signals or pulse signals.

According to the aspect described above, when alternating-current signals are used for the first detection signal and the second detection signal, the foreign-object detecting device is applied to a case in which the number of occurrences of foreign-object entry is relatively large and/or the device is used for a long time. Since the electric power for the alternating-current signals vary, the amount of load on the first coil and the second coil can be reduced when the foreign-object detecting device is continuously used for a long time. Also, when pulse signals are used for the first detection signal and the second detection signal, the foreign-object detecting device is applied to a case in which the number of occurrences of foreign-object entry is relatively small. It is easy to create intermittent signals by using the pulse signals, thus making it possible reduce the electric power consumption to detect a foreign object.

In the foreign-object detecting device according to one of the first to third aspects of the present disclosure, a foreign-object detecting device according to a fourth aspect of the present disclosure may have a feature that the foreign-object detecting circuitry simultaneously outputs the first detection signal and the second detection signal to the first coil and the second coil, respectively.

According to the aspect described above, since the phase of the first detection signal and the phase of the second detection signal are not displaced from each other, the distributions of magnetic fields released by the first coil and the second coil become uniform, thus allowing a foreign objects to be detected with high accuracy.

In the foreign-object detecting device according to one of the first to fourth aspects of the present disclosure, a foreign-object detecting device according to a fifth aspect of the present disclosure may further include: one or more coils having the same structure as structures of the first coil and the second coil; and at least one switch that provides electrical connection between the foreign-object detecting circuitry and the first and second coils of the three or more coils including the first and second coils and the one or more coils. Before outputting the first detection signal and the second detection signal, the foreign-object detecting circuitry may select the first and second coils from among the three or more coils as two adjacent coils, by using the at least one switch.

According to the aspect described above, the three or more coils are arranged, and a combination of the first coil and the second coil can be freely selected from among the three or more coils, and thus, it is further increase the range in which a foreign object is detected.

In the foreign-object detecting device according to one of the first to fifth aspects of the present disclosure, a foreign-object detecting device according to a sixth aspect of the present disclosure may have a feature that the electric power for the first detection signal and the electric power for the second detection signal are 10 mW to 100 mW.

According to the aspect described above, a foreign object can be detected with a low electric power.

An electric-power transmitting device according to a seventh aspect of the present disclosure includes: the foreign-object detecting device according to one of the first to sixth aspects of the present disclosure; an electric-power transmission coil; and an electric-power transmitting circuit that transmits high-frequency electric power to the electric-power transmission coil.

According to the aspect described above, since the foreign-object detecting device that can increase the range in which a foreign object can be detected with high accuracy is provided, it is possible to increase the range in which the electric-power transmitting circuit transmits high-frequency electric power.

Also, since both the first and second coils and the electric-power transmission coil are provided, entry of a foreign object can be detected even when high-frequency electric power is transmitted. Thus, it is possible to prevent a foreign object from generating heat.

In the electric-power transmitting device according to the seventh aspect of the present disclosure, an electric-power transmitting device according to an eighth aspect of the present disclosure may further include a housing in which the electric-power transmission coil is provided. In addition, a circumference of each of the first coil and the second coil may be smaller than a circumference of the electric-power transmission coil, and the first coil and the second coil may be provided between a major surface of the housing and the electric-power transmission coil.

According to the aspect described above, since the circumference of each of the first coil and the second coil is smaller than the circumference of the electric-power transmission coil, it is possible to detect a foreign object that is relatively smaller than the electric-power transmission coil.

In the electric-power transmitting device according to the seventh aspect of the present disclosure, an electric-power transmitting device according to a ninth aspect of the present disclosure may have a feature that at least one of the first and second coils is used as the electric-power transmission coil.

According to the aspect described above, since at least one of the first and second coils is used as the electric-power transmission coil, the cost can be reduced. It is also possible to reduce the height and the weight of the device.

In the electric-power transmitting device according to one of the seventh to ninth aspects of the present disclosure, an electric-power transmitting device according to a tenth aspect of the present disclosure may have a feature that electric power for the first detection signal and electric power for the second detection signal are smaller than the high-frequency electric power.

In the electric-power transmitting device according to one of the seventh to tenth aspects of the present disclosure, an electric-power transmitting device according to an 11th aspect of the present disclosure may further include a control circuit that causes the electric-power transmitting circuit to transmit the high-frequency electric power, after the foreign-object detecting circuitry determines that no foreign object is present within the combined magnetic field across the center of the first coil and the center of the second coil.

A wireless electric-power transmission system according to a 12th aspect of the present disclosure includes: the wireless electric-power transmitting device according to one of the seventh to 11th aspects of the present disclosure; and a wireless electric-power receiving device.

A foreign-object detecting device according to a 13th aspect of the present disclosure includes: a first coil having a first conducting wire that is wound and that has two terminals, one of the two terminals being an outside terminal provided at an outer side and the other terminal being an inside terminal provided at an inner side; a second coil arranged adjacent to the first coil and having a second conducting wire that is wound in the same direction as a winding direction of the first coil and that has two terminals, one of the terminals being an outside terminal provided at an outer side and the other terminal being an inside terminal provided at an inner side; and a foreign-object detecting circuitry. The foreign-object detecting circuitry outputs a detection signal having a predetermined waveform to the outside terminal of the first coil and the inside terminal of the second coil or outputs a detection signal having a predetermined waveform to the inside terminal of the first coil and the outside terminal of the second coil; causes one of the detection signal output to the first coil and the detection signal output to the second coil to flow clockwise and causes the other detection signal to flow counterclockwise to generation a combined magnetic field across a center of the first coil and a center of the second coil; measures an amount of change in an impedance value of one of the first coil and the second coil, the amount of change corresponding to a change in the combined magnetic field which is caused by the presence or absence of a foreign object, and determines that a foreign object is present within the combined magnetic field across the center of the first coil and the center of the second coil, when the amount of change in the impedance value exceeds a predetermined value.

According to the aspect described above, the foreign-object detecting device includes the second coil that is arranged adjacent to the first coil and that is wound in the same direction as the winding direction of the first coil and the foreign-object detecting circuitry.

The foreign-object detecting circuitry outputs a detection signal having a predetermined waveform to the outside terminal of the first coil and the inside terminal of the second coil or outputs a detection signal having a predetermined waveform to the inside terminal of the first coil and the outside terminal of the second coil.

The foreign-object detecting circuitry causes one of the first detection signal output to the first coil and the second detection signal output to the second coil to flow clockwise and causes the other detection signal to flow counterclockwise.

The foreign-object detecting circuitry causes a combined magnetic field to be generated across a center of the first coil and a center of the second coil.

The foreign-object detecting circuitry measures an amount of change in an impedance value of one of the first coil and the second coil, the amount of change corresponding to a change in the combined magnetic field which is caused by the presence or absence of a foreign object.

When the amount of change in the impedance value exceeds a predetermined value, the foreign-object detecting circuitry determines that a foreign object is present within the combined magnetic field across the center of the first coil and the center of the second coil.

As a result, it is possible to detect a foreign object that is present between the adjacent first and second coils, and it is possible to increase the range in which a foreign object can be detected with high accuracy.

Also, since the first coil and the second coil that have been used heretofore can be used, it is possible to suppress increases in the component count, the dimensions, and the manufacturing cost.

Also, since the first coil and the second coil can be configured with the same component, it is possible to keep the cost of the foreign-object detecting device low.

In addition, since the number of detection signals to be output to the first coil and the second coil may be one, it is possible to simplify the circuitry.

In the foreign-object detecting device according to the 13th aspect of the present disclosure, a foreign-object detecting device according to a 14th aspect of the present disclosure may have a feature that the first coil and the second coil are arranged parallel to each other.

According to the aspect described above, it is possible to offer advantages that are similar to those of the second aspect.

In the foreign-object detecting device according to one of the 13th and 14th aspects of the present disclosure, a foreign-object detecting device according to a 15th aspect of the present disclosure may have a feature that the detection signal that flows to the first coil and the detection signal that flows to the second coil are alternating-current signals or pulse signals.

According to the aspect described above, it is possible to offer advantages that are similar to those of the third aspect.

In the foreign-object detecting device according to one of the 13th to 15th of the present disclosure, a foreign-object detecting device according to a 16th aspect of the present disclosure may further include: one or more coils having the same structure as structures of the first coil and the second coil; and at least one switch that provides electrical connection between the foreign-object detecting circuitry and the first and second coils of the three or more coils including the first and second coils and the one or more coils. Before outputting the detection signal, the foreign-object detecting circuitry may select the first and second coils from among the three or more coils as two adjacent coils, by using the at least one switch.

According to the aspect described above, it is possible to offer advantages that are similar to those of the fifth aspect.

In the foreign-object detecting device according to one of the 13th to 16th aspects of the present disclosure, a foreign-object detecting device according to a 17th aspect of the present disclosure may have a feature that the electric power of the detection signal is 10 mW to 100 mW.

According to the aspect described above, it is possible to offer advantages that are similar to those of the sixth aspect.

An electric-power transmitting device according to an 18th aspect of the present disclosure includes: the foreign-object detecting device according to one of the 13th to 17th aspects of the present disclosure; an electric-power transmission coil; and an electric-power transmitting circuit that transmits high-frequency electric power to the electric-power transmission coil.

According to the aspect described above, it is possible to offer advantages that are similar to those of the seventh aspect.

In the electric-power transmitting device according to the 18th aspect of the present disclosure, an electric-power transmitting device according to a 19th aspect of the present disclosure may further include a housing in which the electric-power transmission coil is provided. In addition, a circumference of each of the first coil and the second coil may be smaller than a circumference of the electric-power transmission coil, and the first coil and the second coil may be provided between a major surface of the housing and the electric-power transmission coil.

According to the aspect described above, it is possible to offer advantages that are similar to those of the eighth aspect.

In the electric-power transmitting device according to the 18th aspect of the present disclosure, an electric-power transmitting device according to a 20th aspect of the present disclosure may have a feature that at least one of the first and second coils is used as the electric-power transmission coil.

According to the aspect described above, it is possible to offer advantages that are similar to those of the ninth aspect.

In the electric-power transmitting device according to one of the 18th to 20th aspects of the present disclosure, an electric-power transmitting device according to a 21st aspect of the present disclosure may have a feature that electric power for the first detection signal and electric power for the second detection signal are smaller than the high-frequency electric power.

In the electric-power transmitting device according to one of the 18th to 21st aspects of the present disclosure, an electric-power transmitting device according to a 22nd aspect of the present disclosure may further include: a control circuit that causes the electric-power transmitting circuit to transmit the high-frequency electric power, after the foreign-object detecting circuitry determines that no foreign object is present within the combined magnetic field across the center of the first coil and the center of the second coil.

A wireless electric-power transmission system according to a 23rd aspect of the present disclosure includes: the wireless electric-power transmitting device according to one of the 18th to 22nd aspects of the present disclosure; and a wireless electric-power receiving device.

A foreign-object detecting device according to a 24th aspect of the present disclosure includes: a first coil having a first conducting wire that is wound and that has two terminals, one of the terminals being an outside terminal provided at an outer side and the other terminal being an inside terminal provided at an inner side; a second coil arranged adjacent to the first coil and having a second conducting wire that is wound in a direction opposite to a winding direction of the first coil and that has two terminals, one of the terminals being an outside terminal provided at an outer side and the other terminal being an inside terminal provided at an inner side; and a foreign-object detecting circuitry. The foreign-object detecting circuitry outputs a detection signal having a predetermined waveform to the outside terminal of the first coil and the outside terminal of the second coil or outputs a detection signal having a predetermined waveform to the inside terminal of the first coil and the inside terminal of the second coil; causes one of the detection signal output to the first coil and the detection signal output to the second coil to flow clockwise and causes the other detection signal to flow counterclockwise to generation a combined magnetic field across a center of the first coil and a center of the second coil; measures an amount of change in an impedance value of one of the first coil and the second coil, the impedance value corresponding to a change in the combined magnetic field which is caused by the presence or absence of a foreign object; and determines that a foreign object is present within the combined magnetic field across the center of the first coil and the center of the second coil, when the amount of change in the impedance value exceeds a predetermined value.

According to the aspect described above, the foreign-object detecting device includes the second coil that is provided adjacent to the first coil and that has a winding direction opposite to that of the first coil and the foreign-object detecting circuitry.

The foreign-object detecting circuitry outputs a detection signal having a predetermined waveform to the outside terminal of the first coil and the outside terminal of the second coil or outputs a detection signal having a predetermined waveform to the inside terminal of the first coil and the inside terminal of the second coil.

The foreign-object detecting circuitry causes one of the first detection signal output to the first coil and the second detection signal output to the second coil to flow clockwise and causes the other detection signal to flow counterclockwise.

The foreign-object detecting circuitry causes a combined magnetic field to be generated across a center of the first coil and a center of the second coil.

The foreign-object detecting circuitry measures an amount of change in an impedance value of one of the first coil and the second coil, the amount of change corresponding to a change in the combined magnetic field which is caused by the presence or absence of a foreign object.

The foreign-object detecting circuitry determines that a foreign object is present within the combined magnetic field across the center of the first coil and the center of the second coil, when the amount of change in the impedance value exceeds a predetermined value.

As a result, it is possible to detect a foreign object that is present between the adjacent first and second coils, and it is possible to increase the range in which a foreign object can be detected with high accuracy.

Also, since the first coil and the second coil that have been used heretofore can be used, it is possible to reduce increases in the component count, the dimensions, and the manufacturing cost.

In addition, since the number of detection signals to be output to the first coil and the second coil may be one, it is possible to simplify the circuitry.

In the foreign-object detecting device according to the 24th aspect of the present disclosure, a foreign-object detecting device according to a 25th aspect of the present disclosure may have a feature that the first coil and the second coil are arranged parallel to each other.

According to the aspect described above, it is possible to offer advantages that are similar to those of the second aspect.

In the foreign-object detecting device according to one of the 24th and 25th aspects of the present disclosure, a foreign-object detecting device according to a 26th aspect of the present disclosure may have a feature that the detection signal that flows to the first coil and the detection signal that flows to the second coil are alternating-current signals or pulse signals.

According to the aspect described above, it is possible to offer advantages that are similar to those of the third aspect.

In the foreign-object detecting device according to one of the 24th to 26th aspects of the present disclosure, a foreign-object detecting device according to a 27th aspect of the present disclosure may further include: one or more coils having the same structure as structures of the first coil and the second coil; and at least one switch that provides electrical connection between the foreign-object detecting circuitry and the first and second coils of the three or more coils including the first and second coils and the one or more coils. Before outputting the detection signal, the foreign-object detecting circuitry may select the first and second coils from among the three or more coils as two adjacent coils, by using the at least one switch.

According to the aspect described above, it is possible to offer advantages that are similar to those of the fifth aspect.

In the foreign-object detecting device according to one of the 24th to 27th aspects of the present disclosure, a foreign-object detecting device according to a 28th aspect of the present disclosure may have a feature that the electric power of the detection signal is 10 mW to 100 mW.

According to the aspect described above, it is possible to offer advantages that are similar to those of the sixth aspect.

An electric-power transmitting device according to a 29th aspect of the present disclosure includes: the foreign-object detecting device according to one of the 24th to 28th aspects of the present disclosure; an electric-power transmission coil; and an electric-power transmitting circuit that transmits high-frequency electric power to the electric-power transmission coil.

According to the aspect described above, it is possible to offer advantages that are similar to those of the seventh aspect.

In the electric-power transmitting device according to the 29th aspect of the present disclosure, an electric-power transmitting device according to a 30th aspect of the present disclosure may further include a housing in which the electric-power transmission coil is provided. In addition, a circumference of each of the first coil and the second coil may be smaller than a circumference of the electric-power transmission coil, and the first coil and the second coil may be provided between a major surface of the housing and the electric-power transmission coil.

According to the aspect described above, it is possible to offer advantages that are similar to those of the eighth aspect.

In the electric-power transmitting device according to the 29th aspect of the present disclosure, an electric-power transmitting device according to a 31st aspect of the present disclosure may have a feature that at least one of the first and second coils is used as the electric-power transmission coil.

According to the aspect described above, it is possible to offer advantages that are similar to those of the ninth aspect.

In the electric-power transmitting device according to one of the 29th to 31st aspects of the present disclosure, an electric-power transmitting device according to a 32nd aspect of the present disclosure may have a feature that electric power for the first detection signal and electric power for the second detection signal are smaller than the high-frequency electric power.

In the electric-power transmitting device according to one of the 29th to 32nd aspects of the present disclosure, an electric-power transmitting device according to a 33rd aspect of the present disclosure may further include a control circuit that causes the electric-power transmitting circuit to transmit the high-frequency electric power, after the foreign-object detecting circuitry determines that no foreign object is present within the combined magnetic field across the center of the first coil and the center of the second coil.

A wireless electric-power transmission system according to a 34th aspect of the present disclosure includes: the wireless electric-power transmitting device according to one of the 29th to 33rd of the present disclosure; and a wireless electric-power receiving device.

A foreign-object detecting device according to a 35th aspect of the present disclosure includes: a first coil having a first conducting wire that is wound and that has two terminals, one of the terminals being an outside terminal provided at an outer side and the other terminal being an inside terminal provided at an inner side; a second coil arranged adjacent to the first coil and having a second conducting wire that is wound in the same direction as a winding direction of the first coil and that has two terminals, one of the terminals being an outside terminal provided at an outer side and the other terminal being an inside terminal provided at an inner side; a foreign-object detecting circuitry that outputs a first detection signal having a first predetermined waveform to one of the outside terminal and the inside terminal of the first coil; and a phase shifter that converts the output first detection signal into a second detection signal having a second predetermined waveform having a polarity inverted relative to a polarity of the first predetermined waveform and that outputs the second detection signal to the outside terminal of the second coil when the first detection signal is output to the outside terminal of the first coil or outputs the second detection signal to the inside terminal of the second coil when the first detection signal is output to the inside terminal of the first coil. In addition, one of the first detection signal that flows to the first coil and the second detection signal that flows to the second coil flows clockwise, the other detection signal flows counterclockwise, and a combined magnetic field is generated across a center of the first coil and a center of the second coil.

The foreign-object detecting circuitry measures an amount of change in an impedance value of one of the first coil and the second coil, the amount of change corresponding to a change in the combined magnetic field which is caused by the presence or absence of a foreign object, and determines that a foreign object is present within the combined magnetic field across the center of the first coil and the center of the second coil, when the amount of change in the impedance value exceeds a predetermined value.

According to the aspect described above, the foreign-object detecting device includes the second coil that is arranged adjacent to the first coil and that is wound in the same direction as the winding direction of the first coil.

Also, the foreign-object detecting device includes a foreign-object detecting circuitry that outputs a first detection signal having a first predetermined waveform to one of the outside terminal and the inside terminal of the first coil.

Also, the foreign-object detecting device includes a phase shifter that converts the output first detection signal into a second detection signal having a second predetermined waveform having a polarity inverted relative to a polarity of the first predetermined waveform and that outputs the second detection signal to the outside terminal of the second coil when the first detection signal is output to the outside terminal of the first coil or outputs the second detection signal to the inside terminal of the second coil when the first detection signal is output to the inside terminal of the first coil.

The foreign-object detecting circuitry causes one of the first detection signal output to the first coil and the second detection signal output to the second coil to flow clockwise and causes the other detection signal to flow counterclockwise. The foreign-object detecting circuitry causes a combined magnetic field to be generated across a center of the first coil and a center of the second coil.

The foreign-object detecting circuitry measures an amount of change in an impedance value of one of the first coil and the second coil, the amount of change corresponding to a change in the combined magnetic field which is caused by the presence or absence of a foreign object.

The foreign-object detecting circuitry determines that a foreign object is present within the combined magnetic field across the center of the first coil and the center of the second coil, when the amount of change in the impedance value exceeds a predetermined value.

As a result, it is possible to detect a foreign object that is present between the adjacent first and second coils, and it is possible to increase the range in which a foreign object can be detected with high accuracy.

Also, since the first coil and the second coil that have been used heretofore can be used, it is possible to reduce increases in the component count, the dimensions, and the manufacturing cost.

Also, since the first coil and the second coil can be configured with the same component, it is possible to keep the cost of the foreign-object detecting device low.

Also, the second detection signal is obtained by the phase shifter inverting the polarity of the first detection signal. Thus, since the signal output from the foreign-object detecting circuitry is only the first detection signal, it is possible to simplify the circuitry.

In the foreign-object detecting device according to the 35th aspect of the present disclosure, a foreign-object detecting device according to a 36th aspect of the present disclosure may have a feature that the first coil and the second coil are arranged parallel to each other.

According to the aspect described above, it is possible to offer advantages that are similar to those of the second aspect.

In the foreign-object detecting device according to one of the 35th and 36th aspects of the present disclosure, a foreign-object detecting device according to a 37th aspect of the present disclosure may have a feature that the first detection signal and the second detection signal are alternating-current signals or pulse signals.

According to the aspect described above, it is possible to offer advantages that are similar to those of the third aspect.

In the foreign-object detecting device according to one of the 35th to 37th of the present disclosure, a foreign-object detecting device according to a 38th aspect of the present disclosure may have a feature that the number of sets of the first coil, the second coil, and the phase shifter is at least one, and the foreign-object detecting device may further include at least one switch that provides electrical connection between the at least one set and the foreign-object detecting circuitry. Before outputting the detection signal, the foreign-object detecting circuitry may select the at least one set from the plurality of coils by using the at least one switch.

According to the aspect described above, it is possible to further increase the range in which a foreign object is detected, by operating the switch.

In the foreign-object detecting device according to one of the 35th to 38th aspects of the present disclosure, a foreign-object detecting device according to a 39th aspect of the present disclosure may have a feature that the electric power of the detection signal is 10 mW to 100 mW.

According to the aspect described above, it is possible to offer advantages that are similar to those of the sixth aspect.

An electric-power transmitting device according to a 40th aspect of the present disclosure includes: the foreign-object detecting device according to one of the 35th to 39th aspects of the present disclosure; an electric-power transmission coil; and an electric-power transmitting circuit that transmits high-frequency electric power to the electric-power transmission coil.

According to the aspect described above, it is possible to offer advantages that are similar to those of the seventh aspect.

In the electric-power transmitting device according to the 40th aspect of the present disclosure, an electric-power transmitting device according to a 41st aspect of the present disclosure may further include a housing in which the electric-power transmission coil is provided. In addition, a circumference of each of the first coil and the second coil may be smaller than a circumference of the electric-power transmission coil, and the first coil and the second coil may be provided between a major surface of the housing and the electric-power transmission coil.

According to the aspect described above, it is possible to offer advantages that are similar to those of the eighth aspect.

In the electric-power transmitting device according to the 40th aspect of the present disclosure, an electric-power transmitting device according to a 42nd aspect of the present disclosure may further include a housing in which the electric-power transmission coil is provided. In addition, a circumference of each of the first coil and the second coil may be smaller than a circumference of the electric-power transmission coil, and the first coil and the second coil may be provided between a major surface of the housing and the electric-power transmission coil.

According to the aspect described above, it is possible to offer advantages that are similar to those of the eighth aspect.

In the electric-power transmitting device according to the 40th aspect of the present disclosure, an electric-power transmitting device according to a 43rd aspect of the present disclosure may have a feature that at least one of the first and second coils is is used as the electric-power transmission coil.

According to the aspect described above, it is possible to offer advantages that are similar to those of the ninth aspect.

In the electric-power transmitting device according to one of the 40th to 43rd aspects of the present disclosure, an electric-power transmitting device according to a 44th aspect of the present disclosure may have a feature that electric power for the first detection signal and electric power for the second detection signal are smaller than the high-frequency electric power.

In the electric-power transmitting device according to one of the 40th to 44th of the present disclosure, an electric-power transmitting device according to a 45th aspect of the present disclosure may further include a control circuit that causes the electric-power transmitting circuit to transmit the high-frequency electric power, after the foreign-object detecting circuitry determines that no foreign object is present within the combined magnetic field across the center of the first coil and the center of the second coil.

A wireless electric-power transmission system according to a 46th aspect of the present disclosure includes: the wireless electric-power transmitting device according to one of the 40th to 45th aspects of the present disclosure; and a wireless electric-power receiving device.

A foreign-object detecting device according to a 47th aspect of the present disclosure includes: a first coil having a conducting wire that is wound; a second coil arranged adjacent to the first coil and having a conducting wire that is wound; a foreign-object detecting circuitry. The foreign-object detecting circuitry outputs a first detection signal having a first predetermined waveform to the first coil, outputs a second detection signal having a second predetermined waveform to the second coil, causes one of the first detection signal output to the first coil and the second detection signal output to the second coil to flow clockwise, and causes the other detection signal to flow counterclockwise to generate a combined magnetic field across a center of the first coil and a center of the second coil; measures an amount of change in an impedance value of one of the first coil and the second coil, the amount of change corresponding to a change in the combined magnetic field which is caused by the presence or absence of a foreign object; and determines that a foreign object is present within the combined magnetic field across the center of the first coil and the center of the second coil, when the amount of change in the impedance value exceeds a predetermined value.

According to the aspect described above, the foreign-object detecting device includes a second coil that has a wound conducting wire and that is arranged adjacent to the first coil having a wound conducting wire.

The foreign-object detecting circuitry outputs the first detection signal having the first predetermined waveform to the first coil and outputs the second detection signal having the second predetermined waveform to the second coil.

The foreign-object detecting circuitry causes one of the first detection signal output to the first coil and the second detection signal output to the second coil to flow clockwise and causes the other detection signal to flow counterclockwise.

The foreign-object detecting circuitry generates a combined magnetic field across a center of the first coil and a center of the second coil.

The foreign-object detecting circuitry measures an amount of change in an impedance value of one of the first coil and the second coil, the amount of change corresponding to a change in the combined magnetic field which is caused by the presence or absence of a foreign object.

The foreign-object detecting circuitry determines that a foreign object is present within the combined magnetic field across the center of the first coil and the center of the second coil, when the amount of change in the impedance value exceeds a predetermined value.

As a result, it is possible to detect a foreign object that is present between the adjacent first and second coils, and it is possible to increase the range in which a foreign object can be detected with high accuracy.

Also, since the first coil and the second coil that have been used heretofore can be used, it is possible to suppress increases in the component count, the dimensions, and the manufacturing cost.

In the foreign-object detecting device according to the 47th aspect of the present disclosure, a foreign-object detecting device according to a 48th aspect of the present disclosure may have a feature that the first coil and the second coil are arranged parallel to each other.

According to the aspect described above, since the first coil and the second coil are arranged parallel to each other, the distributions of magnetic fields released by the first coil and the second coil become uniform, thus allowing a foreign objects to be detected with high accuracy.

In the foreign-object detecting device according to one of the 47th and 48th aspects of the present disclosure, a foreign-object detecting device according to a 49th aspect of the present disclosure may have a feature that the first detection signal and the second detection signal are alternating-current signals or pulse signals.

According to the aspect described above, when alternating-current signals are used for the first detection signal and the second detection signal, the foreign-object detecting device is applied to a case in which the number of occurrences of foreign-object entry is relatively large and/or the device is used for a long time. Since the electric power for the alternating-current signals vary, the amount of load on the first coil and the second coil can be reduced when the foreign-object detecting device is continuously used for a long time. Also, when pulse signals are used for the first detection signal and the second detection signal, the foreign-object detecting device is applied to a case in which the number of occurrences of foreign-object entry is relatively small. It is easy to create intermittent signals by using the pulse signals, thus making it possible reduce the electric power consumption to detect a foreign object.

In the foreign-object detecting device according to one of the 47th to 49th aspects of the present disclosure, a foreign-object detecting device according to a 50th aspect of the present disclosure may have a feature that the foreign-object detecting circuitry simultaneously outputs the first detection signal and the second detection signal to the first coil and the second coil, respectively.

According to the aspect described above, since the phase of the first detection signal and the phase of the second detection signal are not displaced from each other, the distributions of magnetic fields released by the first coil and the second coil become uniform, thus allowing a foreign objects to be detected with high accuracy.

In the foreign-object detecting device according to one of the 47th to 50th aspects of the present disclosure, a foreign-object detecting device according to a 51st aspect of the present disclosure may further include: one or more coils having the same structure as structures of the first coil and the second coil; and at least one switch that provides electrical connection between the foreign-object detecting circuitry and the first and second coils of the three or more coils including the first and second coils and the one or more coils.

Before outputting the first detection signal and the second detection signal, the foreign-object detecting circuitry may select the first and second coils from among the three or more coils as two adjacent coils, by using the at least one switch.

According to the aspect described above, the three or more coils are arranged, and a combination of the first coil and the second coil can be freely selected from among the three or more coils, and thus, it is further increase the range in which a foreign object is detected.

In the foreign-object detecting device according to one of the 47th to 51st aspects of the present disclosure, a foreign-object detecting device according to a 52nd aspect of the present disclosure may have a feature that the electric power for the first detection signal and the electric power for the second detection signal are 10 mW to 100 mW.

According to the aspect described above, a foreign object can be detected with a low electric power.

In the foreign-object detecting device according to one of the 47th to the 52nd of the present disclosure, an electric-power transmitting device according to a 53rd aspect of the present disclosure includes: an electric-power transmission coil; and an electric-power transmitting circuit that transmits high-frequency electric power to the electric-power transmission coil.

According to the aspect described above, since the foreign-object detecting device that can increase the range in which a foreign object can be detected with high accuracy is provided, it is possible to increase the range in which the electric-power transmitting circuit transmits high-frequency electric power.

Also, since both the first and second coils and the electric-power transmission coil are provided, entry of a foreign object can be detected even when high-frequency electric power is transmitted. Thus, it is possible to prevent a foreign object from generating heat.

In the electric-power transmitting device according to the 53rd aspect of the present disclosure, an electric-power transmitting device according to a 54th aspect of the present disclosure may further include a housing in which the electric-power transmission coil is provided. In addition, a circumference of each of the first coil and the second coil may be smaller than a circumference of the electric-power transmission coil, and the first coil and the second coil may be provided between a major surface of the housing and the electric-power transmission coil.

According to the aspect described above, since the circumference of each of the first coil and the second coil is smaller than the circumference of the electric-power transmission coil, it is possible to detect a foreign object that is relatively smaller than the electric-power transmission coil.

In the electric-power transmitting device according to the 53rd aspect of the present disclosure an electric-power transmitting device according to a 55th aspect of the present disclosure may have a feature that at least one of the first and second coils is used as the electric-power transmission coil.

According to the aspect described above, since at least one of the first and second coils is used as the electric-power transmission coil, the cost can be reduced. It is also possible to reduce the height and the weight of the device.

In the electric-power transmitting device according to one of the 53rd to 55th aspects of the present disclosure, an electric-power transmitting device according to a 56th aspect of the present disclosure may have a feature that electric power for the first detection signal and electric power for the second detection signal are smaller than the high-frequency electric power.

In the electric-power transmitting device according to one of the 53rd to 56th aspects of the present disclosure, an electric-power transmitting device according to a 57th aspect of the present disclosure may further include a control circuit that causes the electric-power transmitting circuit to transmit the high-frequency electric power, after the foreign-object detecting circuitry determines that no foreign object is present within the combined magnetic field across the center of the first coil and the center of the second coil.

A wireless electric-power transmission system according to a 58th aspect of the present disclosure includes: the wireless electric-power transmitting device according to one of the 53rd to 57th aspects of the present disclosure; and a wireless electric-power receiving device.

A foreign-object detecting device according to a 59th aspect of the present disclosure is a foreign-object detecting device including a plurality of coils and a foreign-object detecting circuitry. The plurality of coils are wound in close proximity to each other on one plane.

The foreign-object detecting circuitry transmits a detection signal having a predetermined waveform to two mutually adjacent coils of the plurality of coils.

The foreign-object detecting circuitry receives reflection signals resulting from reflection of the detection signal by the two mutually adjacent coils.

The foreign-object detecting circuitry determines the presence or absence of a foreign object in the vicinity of the two mutually adjacent coils, based on the reflection signals.

The detection signal includes a first detection signal that flows to one of the two mutually adjacent coils and a second detection signal that flows to the other of the two mutually adjacent coils, and when one of the first and second detection signals flows clockwise on the plane, the other of the first and second detection signals flows counterclockwise on the plane.

In the foreign-object detecting device according to the 59th aspect of the present disclosure, a foreign-object detecting device according to a 60th aspect of the present disclosure may have a feature that the first and second detection signals are alternating-current signals.

in the foreign-object detecting device according to the 59th aspect, a foreign-object detecting device according to a 61st aspect of the present disclosure may have a feature that the first and second detection signals are pulse signals.

In the foreign-object detecting device according to one of the 59th to 61st aspects, a foreign-object detecting device according to a 62nd aspect of the present disclosure may have a feature that the plurality of coils have the same winding direction on the plane, the first and second detection signals have polarities that are inverted relative to each other, and the foreign-object detecting circuitry generates the first and second detection signals and transmits the first and second detection signals to the two mutually adjacent coils.

In the foreign-object detecting device according to the 59th to 61st aspects, a foreign-object detecting device according to a 63rd aspect of the present disclosure may have a feature that the plurality of coils have the same winding direction on the plane; the foreign-object detecting circuitry generates one detection signal, transmits the detection signal to one of the two mutually adjacent coils as the first detection signal, and transmits the detection signal to the other of the two mutually adjacent coils as the second detection signal; and the two mutually adjacent coils are wired to the foreign-object detecting circuitry so that, when one of the first and second detection signals flows clockwise on the plane, the other of the first and second detection signals flows counterclockwise on the plane.

In the foreign-object detecting device according to one of the 59th to 61st aspects, a foreign-object detecting device according to a 64th aspect of the present disclosure may have a feature that the foreign-object detecting device further includes at least one phase shifter; the plurality of coils have the same winding direction on the plane; and the foreign-object detecting circuitry generates one cyclic detection signal having a waveform whose phase is inverted between the first half and the second half of each cycle, directly transmits the detection signal to one of the two mutually adjacent coils as a first detection signal, and transmits the same detection signal to the other of the two mutually adjacent coils via the phase shifter as a second detection signal.

In the foreign-object detecting device according to the 59th to 61st aspects, a foreign-object detecting device according to a 65th aspect of the present disclosure may have a feature that two mutually adjacent coils of the plurality of coils have winding directions that are different from each other on the plane, and the foreign-object detecting circuitry generates one detection signal, transmits the detection signal to one of the two mutually adjacent coils as the first detection signal, and transmits the detection signal to the other of the two mutually adjacent coils as the second detection signal.

In the foreign-object detecting device according to the 59th to 65th aspects, a foreign-object detecting device according to a 66th aspect of the present disclosure may have a feature that the foreign-object detecting device further includes at least one first switch that selectively connects the foreign-object detecting circuitry to two mutually adjacent coils of the plurality of coils.

A wireless electric-power transmitting device according to a 67th aspect of the present disclosure includes the foreign-object detecting device according to one of the 59th to 65th aspects.

In the wireless electric-power transmitting device according to the 67th aspect, a wireless electric-power transmitting device according to a 68th aspect of the present disclosure may further include: at least one electric-power transmitting circuit that generates high-frequency electric power; a second switch that connects the at least one electric-power transmitting circuit to at least one of the plurality of coils or connects the foreign-object detecting circuitry to two mutually adjacent coils of the plurality of coils; and a control circuit that controls the second switch.

A wireless electric-power transmission system according to a 69th aspect of the present disclosure includes: the wireless electric-power transmitting device according to the 67th or 68th aspect; and a wireless electric-power receiving device.

The foreign-object detecting device, the wireless electric-power transmitting device, and the wireless electric-power transmission system according to the present disclosure are useful for reliably detecting a foreign object in the vicinity of an electric-power transmission coil or an electric-power reception coil when electric power is wirelessly transmitted to mobile equipment, an electric vehicle (EV), or the like.

What is claimed is:

1. A foreign-object detecting device, comprising:
   a first coil having a first conducting wire that is wound in a winding direction and that has two terminals, one of the two terminals being an outside terminal of the first coil and the other of the two terminals being an inside terminal of the first coil;
   a second coil arranged adjacent to the first coil and having a second conducting wire that is wound in the same direction as the winding direction of the first coil and that has two terminals, one of the two terminals being an outside terminal of the second coil and the other of the two terminals being an inside terminal of the second coil; and
   foreign-object detecting circuitry operative to:
   i) output a first detection signal to the outside terminal of the first coil and a second detection signal to the outside terminal of the second coil, or ii) output the first detection signal to the inside terminal of the first coil and the second detection signal to the inside terminal of the second coil, the first detection signal having a first predetermined waveform, and the second detection signal having a second predetermined waveform having a polarity inverted relative to a polarity of the first predetermined waveform;
   i) cause one of the first detection signal and the second detection signal to flow clockwise into one of the first coil and the second coil and ii) cause the other of the first detection signal and the second detection signal to flow counterclockwise into the other of the first coil and the second coil, to generate a combined magnetic field across a center of the first coil and a center of the second coil;
   measure an amount of change in an impedance value of one of the first coil and the second coil, the amount of change corresponding to a change in the combined magnetic field which is caused by the presence or absence of a foreign object within the combined magnetic field across the center of the first coil and the center of the second coil; and determine that a foreign object is present within the combined magnetic field across the center of the first coil and the center of the second coil, when the amount of change in the impedance value exceeds a predetermined value.

2. The foreign-object detecting device according to claim 1, further comprising:
one or more coils having the same structure as structures of the first coil and the second coil; and
at least one switch that electrically connects the foreign-object detecting circuitry to the first coil and the second coil among the three or more coils including the first coil, the second coil and the one or more coils,
wherein, before outputting the first detection signal and the second detection signal, the foreign-object detecting circuitry selects the first coil and the second coil among the three or more coils, by using the at least one switch.

3. A wireless electric-power transmitting device, comprising:
the foreign-object detecting device according to claim 1;
an electric-power transmission coil; and
electric-power transmitting circuitry that transmits high-frequency electric power to the electric-power transmission coil.

4. The wireless electric-power transmitting device according to claim 3, further comprising:
a housing in which the electric-power transmission coil is provided,
wherein a circumference of each of the first coil and the second coil is smaller than a circumference of the electric-power transmission coil, and
the first coil and the second coil are provided between the electric-power transmission coil and a major surface of the housing.

5. The wireless electric-power transmitting device according to claim 3,
wherein at least one of the first coil and the second coil is used as the electric-power transmission coil.

6. The wireless electric-power transmission device according to claim 3,
wherein a first electric power for the first detection signal and a second electric power for the second detection signal are smaller than the high-frequency electric power.

7. A wireless electric-power transmission system, comprising:
the wireless electric-power transmitting device according to claim 3, and
a wireless electric-power receiving device.

8. A foreign-object detecting device, comprising:
a first coil having a first conducting wire that is wound in a winding direction and that has two terminals, one of the two terminals being an outside terminal provided at an outer side of the first coil and the other terminal being an inside terminal provided at an inner side of the second coil;
a second coil arranged adjacent to the first coil and having a second conducting wire that is wound in the same direction as the winding direction of the first coil and that has two terminals, one of the terminals being an outside terminal provided at an outer side of the second coil and the other terminal being an inside terminal provided at an inner side of the second coil; and foreign-object detecting circuitry operative to:
i) output a detection signal having a predetermined waveform to one of the outside terminal of the first coil and the inside terminal of the second coil and ii) output the same detection signal to the other of the inside terminal of the first coil and the outside terminal of the second coil;
cause the detection signal to flow clockwise into one of the first coil and the second coil and cause the detection signal to flow counterclockwise into the other of the first coil and the second coil, to generation a combined magnetic field across a center of the first coil and a center of the second coil;
measure an amount of change in an impedance value of one of the first coil and the second coil, the amount of change corresponding to a change in the combined magnetic field which is caused by the presence or absence of a foreign object within the combined magnetic field across the center of the first coil and the center of the second coil; and
determine that a foreign object is present within the combined magnetic field across the center of the first coil and the center of the second coil, when the amount of change in the impedance value exceeds a predetermined value.

9. The foreign-object detecting device according to claim 8, further comprising:
one or more coils having the same structure as structures of the first coil and the second coil; and
at least one switch that electrically connects the foreign-object detecting circuitry to the first coil and the second coil among the three or more coils including the first coil, the second coil and the one or more coils,
wherein, before outputting the detection signal, the foreign-object detecting circuitry selects the first coil and the second coil among the three or more coils, by using the at least one switch.

10. A wireless electric-power transmitting device, comprising:
the foreign-object detecting device according to claim 8;
an electric-power transmission coil; and
electric-power transmitting circuitry that transmits high-frequency electric power to the electric-power transmission coil.

11. The wireless electric-power transmitting device according to claim 10, further comprising:
a housing in which the electric-power transmission coil is provided; and
a circumference of each of the first coil and the second coil is smaller than a circumference of the electric-power transmission coil,
wherein the first coil and the second coil are provided between the electric-power transmission coil and a major surface of the housing.

12. The wireless electric-power transmitting device according to claim 10,
wherein at least one of the first coil and the second coil is is used as the electric-power transmission coil.

13. The wireless electric-power transmitting device according to claim 10,
wherein an electric power for the detection signal is smaller than the high-frequency electric power.

14. A wireless electric-power transmission system, comprising:
- the wireless electric-power transmitting device according to claim 10; and
- a wireless electric-power receiving device.

15. A foreign-object detecting device, comprising:
- a first coil having a first conducting wire that is wound in a winding direction and that has two terminals, one of the two terminals being an outside terminal of the first coil and the other terminal being an inside terminal of the first coil;
- a second coil arranged adjacent to the first coil and having a second conducting wire that is wound in a direction opposite to the winding direction of the first coil and that has two terminals, one of the terminals being an outside terminal of the second coil and the other terminal being an inside terminal of the second coil; and
- foreign-object detecting circuitry operative to:
  - i) output a detection signal having a predetermined waveform to the outside terminal of the first coil and the outside terminal of the second coil or ii) output the same detection signal to the inside terminal of the first coil and the inside terminal of the second coil:
  - cause the detection signal to flow clockwise into one of the first coil and the second coil and cause the detection signal to flow counterclockwise to the other of the first coil and the second coil, to generation a combined magnetic field across a center of the first coil and a center of the second coil;
  - measure an amount of change in an impedance value of one of the first coil and the second coil, the amount of change corresponding to a change in the combined magnetic field which is caused by the presence or absence of a foreign object within the combined magnetic field across the center of the first coil and the center of the second coil; and
  - determine that a foreign object is present within the combined magnetic field across the center of the first coil and the center of the second coil, when the amount of change in the impedance value exceeds a predetermined value.

16. The foreign-object detecting device according to claim 15, further comprising:
- one or more coils each having the same structure as a structure of one of the first and second coils, wherein, of the three or more coils including the first and second coils and the one or more coils, the coils having the same structure as the first coil and having the same structure as the second coil are alternately arranged; and
- at least one switch that provides electrical connection between the foreign-object detecting circuitry and the first and the second coil of the three or more coils,
- wherein, before outputting the detection signal, the foreign-object detecting circuitry selects the first coil and the second coil from among the three or more coils, by using the at least one switch.

17. A wireless electric-power transmitting device, comprising:
- the foreign-object detecting device according to claim 15;
- an electric-power transmission coil; and
- electric-power transmitting circuitry that transmits high-frequency electric power to the electric-power transmission coil.

18. The wireless electric-power transmitting device according to claim 17, further comprising:
- a housing in which the electric-power transmission coil is provided,
- wherein a circumference of each of the first coil and the second coil is smaller than a circumference of the electric-power transmission coil, and
- the first coil and the second coil are provided between the electric-power transmission coil and a major surface of the housing.

19. The wireless electric-power transmitting device according to claim 17,
- wherein at least one of the first coil and the second coil is used as the electric-power transmission coil.

20. The wireless electric-power transmitting device according to claim 17,
- wherein the first electric power for the detection signal is smaller than the high-frequency electric power.

21. A wireless electric-power transmission system, comprising:
- the wireless electric-power transmitting device according to claim 17; and
- a wireless electric-power receiving device.

22. A foreign-object detecting device, comprising:
- a first coil having a wound conducting wire;
- a second coil arranged adjacent to the first coil and having a wound conducting wire; and
- foreign-object detecting circuitry operative to:
  - output a first detection signal having a first predetermined waveform to the first coil and output a second detection signal having a second predetermined waveform to the second coil;
  - cause the first detection signal to flow clockwise into one of the first coil and the second coil and cause the second detection signal to flow counterclockwise into the other of the first coil and the second coil, to generate a combined magnetic field across a center of the first coil and a center of the second coil;
  - measure an amount of change in an impedance value of one of the first coil and the second coil, the amount of change corresponding to a change in the combined magnetic field which is caused by the presence or absence of a foreign object within the combined magnetic field across the center of the first coil and the center of the second coil; and
  - determine that a foreign object is present within the combined magnetic field across the center of the first coil and the center of the second coil, when the amount of change in the impedance value exceeds a predetermined value.

* * * * *